US008982904B2

(12) United States Patent
Binder

(10) Patent No.: US 8,982,904 B2
(45) Date of Patent: *Mar. 17, 2015

(54) NETWORK COMBINING WIRED AND NON-WIRED SEGMENTS

(75) Inventor: Yehuda Binder, Hod Hasharon (IL)

(73) Assignee: Conversant Intellectual Property Management Inc. (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/627,702

(22) Filed: Nov. 30, 2009

(65) Prior Publication Data
US 2010/0135480 A1 Jun. 3, 2010

Related U.S. Application Data

(60) Division of application No. 11/128,229, filed on May 13, 2005, now Pat. No. 7,633,966, which is a continuation of application No. 10/998,015, filed on Nov. 29, 2004, now Pat. No. 7,933,297, which is a
(Continued)

(51) Int. Cl.
H04L 12/66 (2006.01)
H04L 5/16 (2006.01)
(Continued)

(52) U.S. Cl.
CPC ............ H04L 12/2838 (2013.01); H04B 3/542 (2013.01); H04L 12/28 (2013.01); H04L 12/2803 (2013.01); H04L 12/2832 (2013.01);
(Continued)

(58) Field of Classification Search
USPC .......................... 370/352–356, 463, 465–467; 375/222–223
See application file for complete search history.

(56) References Cited

U.S. PATENT DOCUMENTS 404,721 A 6/1889 Messer
2,032,360 A 3/1936 Green
(Continued)

FOREIGN PATENT DOCUMENTS

EP 0385695 A2 9/1990
EP 0 798 923 A2 10/1997
(Continued)

OTHER PUBLICATIONS

Cisco Systems, Inc. v. Mosaid Technology Inc., redacted, public version Complaint filed in the United States District Court for the District of Delaware, Aug. 16, 2010 (full version of the Complaint having been filed under seal and thus unavailable to the public).
(Continued)

Primary Examiner — Thai Hoang

(57) ABSTRACT

A local area network (60) within a residence or other building, including both wired (5) and non-wired segments (53). The wired segments are based on new or existing wires (5a, 5b, 5c, 5d, 5e) in the building, wherein access to the wires is provided by means of outlets (61a, 61d), such as a telephone system, electrical power distribution system, or cable television wiring system. The non-wired segments are based on communication using propagated waves such as radio, sound, or light (e.g. infrared). The wired and non-wired segments interface in the outlet, using a module (50) that serves as mediator between the segments. The module can be integrated into the outlet, partially housed in the outlet, or attached externally to the outlet. Such a network allows for integrated communication of data units (24b) connected by wires and data units (24a, 24d) connected without wires.

39 Claims, 8 Drawing Sheets

Related U.S. Application Data continuation of application No. 10/890,199, filed on Jul. 14, 2004, which is a continuation of application No. 09/552,564, filed on Apr. 19, 2000, now Pat. No. 6,842,459.

(51) Int. Cl.
 H04L 12/28 (2006.01)
 H04B 3/54 (2006.01)
 H04L 12/64 (2006.01)
 H04W 4/04 (2009.01)
 H04W 4/18 (2009.01)
 *H04W 16/20* (2009.01)
 *H04W 80/00* (2009.01)
 *H04W 84/12* (2009.01)
 *H04W 84/14* (2009.01)
 *H04W 92/02* (2009.01)

(52) U.S. Cl.
 CPC ............ *H04L 12/6418* (2013.01); *H04L 12/66* (2013.01); *H04W 4/04* (2013.01); *H04W 4/18* (2013.01); *H04B 2203/5445* (2013.01); *H04L 2012/2841* (2013.01); *H04L 2012/2843* (2013.01); *H04L 2012/2845* (2013.01); *H04W 16/20* (2013.01); *H04W 80/00* (2013.01); *H04W 84/12* (2013.01); *H04W 84/14* (2013.01); *H04W 92/02* (2013.01); *Y02B 70/325* (2013.01); *Y04S 20/228* (2013.01)
 USPC ............................ 370/463; 370/355; 375/222

(56) References Cited

U.S. PATENT DOCUMENTS

| | | |
|---|---|---|
| 2,264,396 A | 12/1941 | Moore, Hilbert R. |
| 2,289,435 A | 10/1942 | Tunick |
| 2,298,435 A | 10/1942 | Tunick, Harry |
| 2,411,786 A | 11/1946 | Halstead |
| 2,568,342 A | 9/1951 | Koehler et al. |
| 2,577,731 A | 12/1951 | Berger |
| 3,045,066 A | 7/1962 | Beuscher |
| 3,280,259 A | 10/1966 | Cotter |
| 3,334,340 A | 8/1967 | McConnell |
| 3,369,078 A | 2/1968 | Stradley |
| 3,406,344 A | 10/1968 | Hopper |
| 3,508,243 A | 4/1970 | Nyfeler et al. |
| 3,509,537 A | 4/1970 | Haberly |
| 3,511,936 A | 5/1970 | Saltzberg |
| 3,529,088 A | 9/1970 | Hauer |
| 3,539,727 A | 11/1970 | Pasternack |
| 3,540,030 A | 11/1970 | Hartz |
| 3,590,271 A | 6/1971 | Peters |
| 3,594,584 A | 7/1971 | Woods |
| 3,651,471 A | 3/1972 | Hasselwood et al. |
| 3,654,605 A | 4/1972 | Honda et al. |
| 3,656,112 A | 4/1972 | Paull |
| 3,662,366 A | 5/1972 | Neuville et al. |
| 3,683,343 A | 8/1972 | Feldman et al. |
| 3,689,886 A | 9/1972 | Durkee |
| 3,699,523 A | 10/1972 | Percher |
| 3,702,460 A | 11/1972 | Blose |
| 3,710,373 A | 1/1973 | Watanabe et al. |
| 3,714,451 A | 1/1973 | Whitney et al. |
| 3,717,858 A | 2/1973 | Hadden |
| 3,719,928 A | 3/1973 | Oishi et al. |
| 3,721,830 A | 3/1973 | Oishi et al. |
| 3,723,653 A | 3/1973 | Tatsuzawa |
| 3,730,980 A | 5/1973 | Kirk, Jr. |
| 3,733,586 A | 5/1973 | Lusk et al. |
| 3,771,069 A | 11/1973 | Levacher et al. |
| 3,796,920 A | 3/1974 | Hedrick et al. |
| 3,805,265 A | 4/1974 | Lester |
| 3,810,096 A | 5/1974 | Kabat et al. |
| 3,818,481 A | 6/1974 | Dorfman et al. |
| 3,836,888 A | 9/1974 | Boenke et al. |
| 3,846,638 A | 11/1974 | Wetherell |
| 3,846,703 A | 11/1974 | Stewart et al. |
| 3,872,253 A | 3/1975 | Jurschak |
| 3,873,771 A | 3/1975 | Kleinerman et al. |
| 3,875,339 A | 4/1975 | Gruen et al. |
| 3,876,984 A | 4/1975 | Chertok |
| 3,886,454 A | 5/1975 | Oakley et al. |
| 3,898,566 A | 8/1975 | Switzer et al. |
| 3,909,618 A | 9/1975 | Fujii et al. |
| 3,909,821 A | 9/1975 | Jagoda et al. |
| 3,911,415 A | 10/1975 | Whyte |
| 3,922,664 A | 11/1975 | Wadsworth |
| 3,924,223 A | 12/1975 | Whyte et al. |
| 3,925,728 A | 12/1975 | Whyte |
| 3,925,763 A | 12/1975 | Wadhwani et al. |
| 3,937,889 A | 2/1976 | Bell, III et al. |
| 3,938,129 A | 2/1976 | Smither |
| 3,942,168 A | 3/1976 | Whyte |
| 3,942,170 A | 3/1976 | Whyte |
| 3,944,723 A | 3/1976 | Fong |
| 3,949,172 A | 4/1976 | Brown et al. |
| 3,962,547 A | 6/1976 | Pattantyus-Abraham |
| 3,964,048 A | 6/1976 | Lusk et al. |
| 3,967,264 A | 6/1976 | Whyte et al. |
| 3,973,087 A | 8/1976 | Fong |
| 3,973,240 A | 8/1976 | Fong |
| 3,980,954 A | 9/1976 | Whyte |
| 3,992,589 A | 11/1976 | Kuegler |
| 3,993,989 A | 11/1976 | Held et al. |
| 4,004,110 A | 1/1977 | Whyte |
| 4,008,369 A | 2/1977 | Theurer et al. |
| 4,008,467 A | 2/1977 | Pattantyus-Abraham et al. |
| 4,012,733 A | 3/1977 | Whyte |
| 4,012,734 A | 3/1977 | Jagoda et al. |
| 4,016,429 A | 4/1977 | Vercellotti et al. |
| 4,024,528 A | 5/1977 | Boggs et al. |
| 4,031,543 A | 6/1977 | Holz |
| 4,032,911 A | 6/1977 | Melvin, Jr. |
| 4,035,838 A | 7/1977 | Bassani et al. |
| 4,054,910 A | 10/1977 | Chou et al. |
| 4,057,793 A | 11/1977 | Johnson et al. |
| 4,058,678 A | 11/1977 | Dunn et al. |
| 4,060,735 A | 11/1977 | Pascucci et al. |
| 4,063,220 A | 12/1977 | Metcalfe et al. |
| 4,065,763 A | 12/1977 | Whyte et al. |
| 4,066,912 A | 1/1978 | Wetherell |
| 4,079,415 A | 3/1978 | Will |
| 4,085,678 A | 4/1978 | Heincker |
| 4,090,184 A | 5/1978 | Hamilton, II |
| 4,100,601 A | 7/1978 | Kaufman et al. |
| 4,106,077 A | 8/1978 | Furda |
| 4,130,861 A | 12/1978 | Laforest |
| 4,130,874 A | 12/1978 | Pai |
| 4,135,181 A | 1/1979 | Bogacki et al. |
| 4,136,319 A | 1/1979 | Bourde |
| 4,139,735 A | 2/1979 | Dorfman et al. |
| 4,142,178 A | 2/1979 | Whyte et al. |
| 4,161,027 A | 7/1979 | Russell |
| 4,161,720 A | 7/1979 | Bogacki |
| 4,163,218 A | 7/1979 | Wu |
| 4,171,467 A | 10/1979 | Evenchik |
| 4,173,714 A | 11/1979 | Bloch et al. |
| 4,173,754 A | 11/1979 | Feiker |
| 4,174,517 A | 11/1979 | Mandel |
| 4,188,619 A | 2/1980 | Perkins |
| 4,199,761 A | 4/1980 | Whyte et al. |
| 4,200,862 A | 4/1980 | Campbell et al. |
| 4,205,360 A | 5/1980 | Drucker |
| 4,206,320 A | 6/1980 | Keasler et al. |
| 4,210,901 A | 7/1980 | Whyte et al. |
| 4,216,543 A | 8/1980 | Cagle et al. |
| 4,222,035 A | 9/1980 | Lohoff |
| 4,245,215 A | 1/1981 | O'Connor et al. |
| 4,250,489 A | 2/1981 | Dudash et al. |
| 4,254,305 A | 3/1981 | Treiber |
| 4,254,403 A | 3/1981 | Perez-Cavero et al. |
| 4,270,206 A | 5/1981 | Hughes |

(56) References Cited

U.S. PATENT DOCUMENTS

| | | |
|---|---|---|
| 4,300,126 A | 11/1981 | Gajjar |
| 4,302,629 A | 11/1981 | Foulkes et al. |
| 4,302,750 A | 11/1981 | Wadhwani et al. |
| 4,303,993 A | 12/1981 | Panepinto, Jr. et al. |
| 4,307,380 A | 12/1981 | Gander |
| 4,311,964 A | 1/1982 | Boykin |
| 4,321,581 A | 3/1982 | Tappeiner et al. |
| 4,323,882 A | 4/1982 | Gajjar |
| 4,328,579 A | 5/1982 | Hashimoto et al. |
| 4,329,678 A | 5/1982 | Hatfield |
| 4,330,687 A | 5/1982 | Foulkes et al. |
| 4,332,980 A | 6/1982 | Reynolds et al. |
| 4,335,464 A | 6/1982 | Armstrong et al. |
| 4,339,750 A | 7/1982 | Delacruz |
| 4,339,816 A | 7/1982 | Reed |
| 4,343,042 A | 8/1982 | Schrock et al. |
| 4,344,066 A | 8/1982 | Beggs |
| 4,348,582 A | 9/1982 | Budek |
| 4,348,668 A | 9/1982 | Gurr et al. |
| 4,355,303 A | 10/1982 | Phillips et al. |
| 4,357,598 A | 11/1982 | Melvin, Jr. |
| 4,357,605 A | 11/1982 | Clements |
| 4,367,548 A | 1/1983 | Cotten, Jr. et al. |
| 4,371,867 A | 2/1983 | Gander |
| 4,377,804 A | 3/1983 | Suzuki |
| 4,378,470 A | 3/1983 | Murto et al. |
| 4,380,009 A | 4/1983 | Long et al. |
| 4,381,427 A | 4/1983 | Cheal et al. |
| 4,382,248 A | 5/1983 | Pai |
| 4,386,436 A | 5/1983 | Kocher et al. |
| 4,387,271 A | 6/1983 | Artom |
| 4,388,489 A | 6/1983 | Wigan et al. |
| 4,390,986 A | 6/1983 | Moses |
| 4,393,508 A | 7/1983 | Boudault |
| 4,400,688 A | 8/1983 | Johnston et al. |
| 4,402,059 A | 8/1983 | Kennon et al. |
| 4,408,185 A | 10/1983 | Rasmussen |
| 4,408,186 A | 10/1983 | Howell |
| 4,413,229 A | 11/1983 | Grant |
| 4,417,207 A | 11/1983 | Sato |
| 4,418,333 A | 11/1983 | Schwarzbach et al. |
| 4,419,758 A | 12/1983 | Dorey |
| 4,425,642 A | 1/1984 | Moses et al. |
| 4,427,968 A | 1/1984 | York |
| 4,429,299 A | 1/1984 | Kabat et al. |
| 4,430,639 A | 2/1984 | Bennett et al. |
| 4,433,212 A | 2/1984 | Moses et al. |
| 4,433,284 A | 2/1984 | Perkins |
| 4,433,326 A | 2/1984 | Howell |
| 4,438,519 A | 3/1984 | Bose |
| 4,442,319 A | 4/1984 | Treidl |
| 4,442,320 A | 4/1984 | James et al. |
| 4,442,540 A | 4/1984 | Allen |
| 4,443,662 A | 4/1984 | Nakhla |
| 4,444,999 A | 4/1984 | Sparrevohn |
| 4,449,218 A | 5/1984 | Strehl |
| 4,456,925 A | 6/1984 | Skerlos et al. |
| 4,456,985 A | 6/1984 | Carsten et al. |
| 4,456,986 A | 6/1984 | Carsten et al. |
| 4,458,236 A | 7/1984 | Perkins |
| 4,459,433 A | 7/1984 | Wortman |
| 4,459,434 A | 7/1984 | Benning et al. |
| 4,462,113 A | 7/1984 | Iwata |
| 4,467,140 A | 8/1984 | Fathauer et al. |
| 4,467,314 A | 8/1984 | Weikel et al. |
| 4,468,538 A | 8/1984 | Cripps |
| 4,468,792 A | 8/1984 | Baker et al. |
| 4,471,399 A | 9/1984 | Udren |
| 4,473,816 A | 9/1984 | Perkins |
| 4,473,817 A | 9/1984 | Perkins |
| 4,475,193 A | 10/1984 | Brown |
| 4,479,033 A | 10/1984 | Brown et al. |
| 4,479,215 A | 10/1984 | Baker |
| 4,481,501 A | 11/1984 | Perkins |
| 4,484,218 A | 11/1984 | Boland et al. |
| 4,485,400 A | 11/1984 | Lemelson et al. |
| 4,493,092 A | 1/1985 | Adams |
| 4,493,948 A | 1/1985 | Sues et al. |
| 4,500,751 A | 2/1985 | Darland et al. |
| 4,506,387 A | 3/1985 | Walter |
| 4,507,793 A | 3/1985 | Adams |
| 4,509,211 A | 4/1985 | Robbins |
| 4,510,611 A | 4/1985 | Dougherty |
| 4,512,025 A | 4/1985 | Frankel et al. |
| 4,512,033 A | 4/1985 | Schrock |
| 4,514,594 A | 4/1985 | Brown et al. |
| 4,521,881 A | 6/1985 | Stapleford et al. |
| 4,523,307 A | 6/1985 | Brown et al. |
| 4,528,422 A | 7/1985 | Cupani |
| 4,528,667 A | 7/1985 | Fruhauf |
| 4,534,039 A | 8/1985 | Dodds et al. |
| 4,535,447 A | 8/1985 | Rosanes et al. |
| 4,538,136 A | 8/1985 | Drabing |
| 4,538,174 A | 8/1985 | Gargini et al. |
| 4,543,450 A | 9/1985 | Brandt |
| 4,546,212 A | 10/1985 | Crowder, Sr. |
| 4,551,721 A | 11/1985 | Kozlik |
| 4,556,864 A | 12/1985 | Roy |
| 4,556,865 A | 12/1985 | Fukagawa et al. |
| 4,556,866 A | 12/1985 | Gorecki |
| 4,559,520 A | 12/1985 | Johnston |
| 4,561,020 A | 12/1985 | Matsuda |
| 4,564,940 A | 1/1986 | Yahata |
| 4,567,557 A | 1/1986 | Burns |
| 4,574,284 A | 3/1986 | Feldman et al. |
| 4,577,311 A | 3/1986 | Duquesne et al. |
| 4,577,314 A | 3/1986 | Chu et al. |
| 4,577,333 A | 3/1986 | Lewis et al. |
| 4,578,533 A | 3/1986 | Pierce |
| 4,578,535 A | 3/1986 | Simmons |
| 4,578,537 A | 3/1986 | Faggin et al. |
| 4,578,540 A | 3/1986 | Borg et al. |
| 4,580,276 A | 4/1986 | Andruzzi, Jr. et al. |
| 4,580,291 A | 4/1986 | Ab der Halden |
| 4,583,214 A | 4/1986 | Miyashita et al. |
| 4,584,690 A | 4/1986 | Cafiero et al. |
| 4,593,389 A | 6/1986 | Wurzburg et al. |
| 4,597,077 A | 6/1986 | Nelson et al. |
| 4,597,082 A | 6/1986 | Hill et al. |
| 4,599,598 A | 7/1986 | Komoda et al. |
| 4,602,240 A | 7/1986 | Perkins et al. |
| 4,604,741 A | 8/1986 | Barsellotti |
| 4,608,686 A | 8/1986 | Barsellotti |
| 4,609,839 A | 9/1986 | Howell |
| 4,611,274 A | 9/1986 | Machino et al. |
| 4,623,920 A | 11/1986 | Dufresne et al. |
| 4,633,217 A | 12/1986 | Akano |
| 4,633,218 A | 12/1986 | Palsgrove et al. |
| 4,636,771 A | 1/1987 | Ochs |
| 4,638,298 A | 1/1987 | Spiro |
| 4,638,299 A | 1/1987 | Campbell |
| 4,639,714 A | 1/1987 | Crowe |
| 4,641,126 A | 2/1987 | Crowe |
| 4,641,322 A | 2/1987 | Hasegawa |
| 4,642,607 A | 2/1987 | Strom et al. |
| 4,644,321 A | 2/1987 | Kennon |
| 4,644,526 A | 2/1987 | Wu |
| 4,646,289 A | 2/1987 | Tsiakas et al. |
| 4,646,296 A | 2/1987 | Bartholet et al. |
| 4,649,551 A | 3/1987 | Sander et al. |
| 4,651,316 A | 3/1987 | Kocan et al. |
| 4,656,655 A | 4/1987 | Hashimoto |
| 4,665,516 A | 5/1987 | Middleton et al. |
| 4,665,544 A | 5/1987 | Honda et al. |
| 4,668,934 A | 5/1987 | Shuey |
| 4,670,870 A | 6/1987 | Hewinson et al. |
| 4,670,874 A | 6/1987 | Sato et al. |
| 4,672,602 A | 6/1987 | Hargrave et al. |
| 4,672,605 A | 6/1987 | Hustig et al. |
| 4,675,648 A | 6/1987 | Roth et al. |
| 4,679,227 A | 7/1987 | Hughes-Hartogs |
| 4,686,382 A | 8/1987 | Shuey |
| 4,686,641 A | 8/1987 | Evans |
| 4,692,761 A | 9/1987 | Robinton |

(56) References Cited

U.S. PATENT DOCUMENTS

| | | |
|---|---|---|
| 4,697,166 A | 9/1987 | Warnagiris et al. |
| 4,701,945 A | 10/1987 | Pedigo |
| 4,703,306 A | 10/1987 | Barritt |
| 4,706,274 A | 11/1987 | Baker et al. |
| 4,709,412 A | 11/1987 | Seymour et al. |
| 4,714,912 A | 12/1987 | Roberts et al. |
| 4,731,821 A | 3/1988 | Jackson, III |
| 4,734,919 A | 3/1988 | Tae |
| 4,734,932 A | 3/1988 | Lott |
| 4,736,367 A | 4/1988 | Wroblewski et al. |
| 4,740,963 A | 4/1988 | Eckley |
| 4,742,572 A | 5/1988 | Yokoyama |
| 4,745,391 A | 5/1988 | Gajjar |
| 4,745,392 A | 5/1988 | Ise et al. |
| 4,746,809 A | 5/1988 | Coleman et al. |
| 4,746,897 A | 5/1988 | Shuey |
| 4,748,637 A | 5/1988 | Bishop et al. |
| 4,749,992 A | 6/1988 | Fitzemeyer et al. |
| 4,754,326 A | 6/1988 | Kram et al. |
| 4,755,792 A | 7/1988 | Pezzolo et al. |
| 4,757,495 A | 7/1988 | Decker et al. |
| 4,757,497 A | 7/1988 | Beierle et al. |
| 4,760,571 A | 7/1988 | Schwarz |
| 4,761,646 A | 8/1988 | Choquet et al. |
| 4,763,103 A | 8/1988 | Galula et al. |
| 4,763,104 A | 8/1988 | Inoue et al. |
| 4,764,922 A | 8/1988 | Dieter et al. |
| 4,766,402 A | 8/1988 | Crane |
| 4,766,414 A | 8/1988 | Shuey |
| 4,768,110 A | 8/1988 | Dunlap et al. |
| 4,768,206 A | 8/1988 | Van Gerwen |
| 4,769,837 A | 9/1988 | McCormick et al. |
| 4,772,870 A | 9/1988 | Reyes |
| 4,776,006 A | 10/1988 | Comerford et al. |
| 4,780,757 A | 10/1988 | Bryer et al. |
| 4,780,758 A | 10/1988 | Lin et al. |
| 4,782,322 A | 11/1988 | Lechner et al. |
| 4,782,482 A | 11/1988 | Kiatipov et al. |
| 4,785,448 A | 11/1988 | Reichert et al. |
| 4,785,472 A | 11/1988 | Shapiro |
| 4,789,895 A | 12/1988 | Mustafa et al. |
| 4,789,994 A | 12/1988 | Randall et al. |
| 4,799,213 A | 1/1989 | Fitzgerald |
| 4,800,363 A | 1/1989 | Braun et al. |
| 4,802,189 A | 1/1989 | Wedler |
| 4,807,225 A | 2/1989 | Fitch |
| 4,809,296 A | 2/1989 | Braun et al. |
| 4,813,066 A | 3/1989 | Holtz et al. |
| 4,815,106 A | 3/1989 | Propp et al. |
| 4,817,204 A | 3/1989 | Jannelli et al. |
| 4,821,319 A | 4/1989 | Middleton et al. |
| 4,823,124 A | 4/1989 | Beauchemin |
| 4,825,349 A | 4/1989 | Marcel |
| 4,825,435 A | 4/1989 | Amundsen et al. |
| 4,829,570 A | 5/1989 | Schotz |
| 4,835,517 A | 5/1989 | Van Der et al. |
| 4,837,799 A | 6/1989 | Prohs et al. |
| 4,839,743 A | 6/1989 | Best et al. |
| 4,841,281 A | 6/1989 | Melvin, Jr. |
| 4,845,466 A | 7/1989 | Hariton et al. |
| 4,847,903 A | 7/1989 | Schotz |
| 4,849,811 A | 7/1989 | Kleinerman |
| 4,850,009 A | 7/1989 | Zook et al. |
| 4,850,042 A | 7/1989 | Petronio et al. |
| 4,852,151 A | 7/1989 | Dittakavi et al. |
| 4,864,588 A | 9/1989 | Simpson et al. |
| 4,864,589 A | 9/1989 | Endo |
| 4,866,733 A | 9/1989 | Morishita |
| 4,866,757 A | 9/1989 | Nilssen |
| 4,872,197 A | 10/1989 | Pemmaraju |
| 4,882,747 A | 11/1989 | Williams |
| 4,885,563 A | 12/1989 | Johnson et al. |
| 4,885,564 A | 12/1989 | Vercellotti et al. |
| 4,885,747 A | 12/1989 | Foglia |
| 4,885,766 A | 12/1989 | Yasuoka et al. |
| 4,885,803 A | 12/1989 | Hermann et al. |
| 4,888,795 A | 12/1989 | Ando et al. |
| 4,890,089 A | 12/1989 | Shuey |
| 4,890,316 A | 12/1989 | Walsh et al. |
| 4,891,694 A | 1/1990 | Way |
| 4,893,326 A | 1/1990 | Duran et al. |
| 4,896,277 A | 1/1990 | Vercellotti et al. |
| 4,896,349 A | 1/1990 | Kubo et al. |
| 4,901,218 A | 2/1990 | Cornwell |
| 4,901,342 A | 2/1990 | Jones |
| 4,903,006 A | 2/1990 | Boomgaard |
| 4,903,292 A | 2/1990 | Dillon |
| 4,907,225 A | 3/1990 | Gulick et al. |
| 4,912,553 A | 3/1990 | Pal et al. |
| 4,912,721 A | 3/1990 | Pidgeon, Jr. et al. |
| 4,914,418 A | 4/1990 | Mak et al. |
| 4,914,688 A | 4/1990 | Kobayashi et al. |
| 4,918,688 A | 4/1990 | Krause et al. |
| 4,918,690 A | 4/1990 | Markkula, Jr. et al. |
| 4,922,503 A | 5/1990 | Leone |
| 4,924,492 A | 5/1990 | Gitlin et al. |
| 4,926,158 A | 5/1990 | Zeigler |
| 4,932,022 A | 6/1990 | Keeney et al. |
| 4,932,047 A | 6/1990 | Emmons et al. |
| 4,937,819 A | 6/1990 | King |
| 4,941,089 A | 7/1990 | Fischer |
| 4,945,404 A | 7/1990 | Miller |
| 4,947,483 A | 8/1990 | Dirr |
| 4,947,484 A | 8/1990 | Twitty et al. |
| 4,949,187 A | 8/1990 | Cohen |
| 4,949,334 A | 8/1990 | Bernhardt |
| 4,953,160 A | 8/1990 | Gupta |
| 4,954,886 A | 9/1990 | Elberbaum |
| 4,955,018 A | 9/1990 | Twitty et al. |
| 4,955,048 A | 9/1990 | Iwamura et al. |
| 4,962,496 A | 10/1990 | Vercellotti et al. |
| 4,963,853 A | 10/1990 | Mak |
| 4,968,970 A | 11/1990 | Laporte |
| 4,969,136 A | 11/1990 | Chamberlain et al. |
| 4,969,147 A | 11/1990 | Markkula, Jr. et al. |
| 4,973,940 A | 11/1990 | Sakai et al. |
| 4,975,896 A | 12/1990 | D'Agosto, III et al. |
| 4,975,903 A | 12/1990 | Wakerly et al. |
| 4,975,906 A | 12/1990 | Takiyasu et al. |
| 4,979,028 A | 12/1990 | Minematsu et al. |
| 4,979,183 A | 12/1990 | Cowart |
| 4,980,665 A | 12/1990 | Schotz |
| 4,985,892 A | 1/1991 | Camarata |
| 4,988,972 A | 1/1991 | Takagi |
| 4,989,081 A | 1/1991 | Miyagawa et al. |
| 4,994,908 A | 2/1991 | Kuban et al. |
| 4,996,709 A | 2/1991 | Heep et al. |
| 4,999,613 A | 3/1991 | Williamson et al. |
| 5,001,774 A | 3/1991 | Lee |
| 5,010,399 A | 4/1991 | Goodman et al. |
| 5,018,138 A | 5/1991 | Twitty et al. |
| 5,027,426 A | 6/1991 | Chiocca, Jr. |
| 5,029,334 A | 7/1991 | Braun et al. |
| 5,032,833 A | 7/1991 | Laporte |
| 5,033,062 A | 7/1991 | Morrow et al. |
| 5,033,112 A | 7/1991 | Bowling et al. |
| 5,034,882 A | 7/1991 | Eisenhard et al. |
| 5,034,883 A | 7/1991 | Donaldson et al. |
| 5,034,948 A | 7/1991 | Mizutani et al. |
| 5,036,513 A | 7/1991 | Greenblatt |
| 5,045,948 A | 9/1991 | Streck et al. |
| 5,049,876 A | 9/1991 | Kahle et al. |
| 5,051,720 A | 9/1991 | Kittirutsunetorn |
| 5,051,822 A | 9/1991 | Rhoades |
| 5,063,563 A | 11/1991 | Ikeda et al. |
| 5,065,133 A | 11/1991 | Howard |
| 5,066,939 A | 11/1991 | Mansfield, Jr. |
| 5,068,890 A | 11/1991 | Nilssen |
| 5,070,442 A | 12/1991 | Syron-Townson et al. |
| 5,070,522 A | 12/1991 | Nilssen |
| 5,089,886 A | 2/1992 | Grandmougin |
| 5,090,024 A | 2/1992 | Vander Mey et al. |
| 5,090,052 A | 2/1992 | Nakajima et al. |
| 5,093,828 A | 3/1992 | Braun et al. |

(56) References Cited

U.S. PATENT DOCUMENTS

| | | |
|---|---|---|
| 5,095,417 A | 3/1992 | Hagiwara et al. |
| 5,095,497 A | 3/1992 | Aman et al. |
| 5,099,444 A | 3/1992 | Wilson et al. |
| 5,109,222 A | 4/1992 | Welty |
| 5,111,497 A | 5/1992 | Bliven et al. |
| 5,113,498 A | 5/1992 | Evan et al. |
| 5,115,463 A | 5/1992 | Moldavsky et al. |
| 5,121,390 A | 6/1992 | Farrell et al. |
| 5,136,580 A | 8/1992 | Videlock et al. |
| 5,142,397 A | 8/1992 | Dockery |
| 5,144,544 A | 9/1992 | Jenneve et al. |
| 5,146,471 A | 9/1992 | Cowart et al. |
| 5,148,144 A | 9/1992 | Sutterlin et al. |
| 5,150,365 A | 9/1992 | Hirata et al. ............ 370/487 |
| 5,151,838 A | 9/1992 | Dockery |
| 5,155,466 A | 10/1992 | Go |
| 5,161,021 A | 11/1992 | Tsai |
| 5,168,510 A | 12/1992 | Hill |
| 5,179,586 A | 1/1993 | Lee |
| 5,181,240 A | 1/1993 | Sakuragi et al. |
| 5,185,591 A | 2/1993 | Shuey |
| 5,187,803 A | 2/1993 | Sohner et al. |
| 5,187,865 A | 2/1993 | Dolin, Jr. |
| 5,192,231 A | 3/1993 | Dolin, Jr. |
| 5,198,796 A | 3/1993 | Hessling, Jr. |
| 5,206,933 A | 4/1993 | Farrell et al. |
| 5,210,518 A | 5/1993 | Graham et al. |
| 5,210,519 A | 5/1993 | Moore |
| 5,210,749 A | 5/1993 | Firoozmand |
| 5,210,788 A | 5/1993 | Nilssen |
| 5,220,561 A | 6/1993 | Nuhn et al. |
| 5,230,086 A | 7/1993 | Saul |
| 5,235,619 A | 8/1993 | Beyers et al. |
| 5,239,540 A | 8/1993 | Rovira et al. |
| 5,241,283 A | 8/1993 | Sutterlin |
| 5,241,682 A | 8/1993 | Bryant et al. |
| 5,243,627 A | 9/1993 | Betts et al. |
| 5,247,347 A | 9/1993 | Litteral et al. |
| 5,255,267 A | 10/1993 | Hansen et al. |
| 5,255,268 A | 10/1993 | Cato et al. |
| 5,257,006 A | 10/1993 | Graham et al. |
| 5,262,755 A | 11/1993 | Mak et al. |
| 5,263,046 A | 11/1993 | Vander Mey |
| 5,264,823 A | 11/1993 | Stevens |
| 5,265,150 A | 11/1993 | Helmkamp et al. |
| 5,265,154 A | 11/1993 | Schotz |
| 5,268,666 A | 12/1993 | Michel et al. |
| 5,274,631 A | 12/1993 | Bhardwaj |
| 5,276,918 A | 1/1994 | Cornforth et al. |
| 5,278,836 A | 1/1994 | Iimura et al. |
| 5,278,862 A | 1/1994 | Vander Mey |
| 5,278,889 A | 1/1994 | Papanicolaou et al. |
| 5,283,637 A | 2/1994 | Goolcharan |
| 5,283,825 A | 2/1994 | Druckman et al. |
| 5,289,461 A | 2/1994 | De Nijs |
| 5,289,476 A | 2/1994 | Johnson et al. |
| 5,297,141 A | 3/1994 | Marum |
| 5,297,203 A | 3/1994 | Rose et al. |
| 5,299,193 A | 3/1994 | Szczepanek |
| 5,299,195 A | 3/1994 | Shah |
| 5,301,186 A | 4/1994 | Galuszka et al. |
| 5,311,114 A | 5/1994 | Sambamurthy et al. |
| 5,311,518 A | 5/1994 | Takato et al. |
| 5,319,634 A | 6/1994 | Bartholomew et al. |
| 5,321,736 A | 6/1994 | Beasley |
| 5,321,846 A | 6/1994 | Yokota et al. |
| 5,333,133 A | 7/1994 | Andrews et al. |
| 5,334,975 A | 8/1994 | Wachob et al. |
| 5,341,370 A | 8/1994 | Nuhn et al. |
| 5,341,415 A | 8/1994 | Baran |
| 5,343,240 A | 8/1994 | Yu |
| 5,343,514 A | 8/1994 | Snyder |
| 5,345,437 A | 9/1994 | Ogawa |
| 5,347,304 A | 9/1994 | Moura et al. |
| 5,347,549 A | 9/1994 | Baumann et al. |
| 5,349,640 A | 9/1994 | Dunn et al. |
| 5,349,644 A | 9/1994 | Massey et al. |
| 5,351,272 A | 9/1994 | Abraham |
| 5,352,957 A | 10/1994 | Werner |
| 5,353,334 A | 10/1994 | O'Sullivan |
| 5,355,114 A | 10/1994 | Sutterlin et al. |
| 5,356,311 A | 10/1994 | Liu |
| 5,363,432 A | 11/1994 | Martin et al. |
| 5,369,356 A | 11/1994 | Kinney et al. |
| 5,377,255 A | 12/1994 | Beasley |
| 5,379,005 A | 1/1995 | Aden et al. |
| 5,381,459 A | 1/1995 | Lappington |
| 5,381,462 A | 1/1995 | Larson et al. |
| 5,381,804 A | 1/1995 | Shambroom |
| 5,390,235 A | 2/1995 | Beasley |
| 5,391,932 A | 2/1995 | Small et al. |
| 5,400,246 A | 3/1995 | Wilson et al. |
| 5,404,127 A | 4/1995 | Lee et al. |
| 5,404,570 A | 4/1995 | Charas et al. |
| 5,406,248 A | 4/1995 | Le Van |
| 5,406,249 A | 4/1995 | Pettus |
| 5,406,260 A | 4/1995 | Cummings et al. |
| 5,408,260 A | 4/1995 | Arnon |
| 5,410,292 A | 4/1995 | Le Van Suu |
| 5,410,343 A | 4/1995 | Coddington et al. |
| 5,412,369 A | 5/1995 | Kirchner |
| 5,414,708 A | 5/1995 | Webber et al. |
| 5,418,559 A | 5/1995 | Blahut |
| 5,420,572 A | 5/1995 | Dolin, Jr. et al. |
| 5,420,886 A | 5/1995 | Ohmori |
| 5,421,030 A | 5/1995 | Baran |
| 5,422,929 A | 6/1995 | Hurst et al. |
| 5,424,710 A | 6/1995 | Baumann |
| 5,425,089 A | 6/1995 | Chan et al. |
| 5,428,608 A | 6/1995 | Freeman et al. |
| 5,430,726 A | 7/1995 | Moorwood et al. |
| 5,432,838 A | 7/1995 | Purchase et al. |
| 5,440,335 A | 8/1995 | Beveridge |
| 5,440,558 A | 8/1995 | Ban |
| 5,448,566 A | 9/1995 | Richter et al. |
| 5,448,593 A | 9/1995 | Hill |
| 5,448,635 A | 9/1995 | Biehl et al. |
| 5,452,289 A | 9/1995 | Sharma et al. |
| 5,452,344 A | 9/1995 | Larson |
| 5,454,008 A | 9/1995 | Baumann et al. |
| 5,457,629 A | 10/1995 | Miller et al. |
| 5,459,459 A | 10/1995 | Lee, Jr. |
| 5,461,629 A | 10/1995 | Sutterlin et al. |
| 5,463,616 A | 10/1995 | Kruse et al. |
| 5,467,011 A | 11/1995 | Hunt |
| 5,467,384 A | 11/1995 | Skinner, Sr. et al. |
| 5,471,190 A | 11/1995 | Zimmermann |
| 5,475,363 A | 12/1995 | Suzuki et al. |
| 5,475,687 A | 12/1995 | Markkula, Jr. et al. |
| 5,477,091 A | 12/1995 | Fiorina et al. |
| 5,479,400 A | 12/1995 | Dilworth et al. |
| 5,479,447 A | 12/1995 | Chow et al. |
| 5,481,249 A | 1/1996 | Sato |
| 5,485,040 A | 1/1996 | Sutterlin |
| 5,487,066 A | 1/1996 | McNamara et al. |
| 5,489,894 A | 2/1996 | Murray |
| 5,497,142 A | 3/1996 | Chaffanjon |
| 5,499,241 A | 3/1996 | Thompson et al. |
| 5,504,454 A | 4/1996 | Daggett et al. |
| 5,513,251 A | 4/1996 | Rochkind et al. |
| 5,517,172 A | 5/1996 | Chiu |
| 5,519,731 A | 5/1996 | Cioffi |
| 5,521,491 A | 5/1996 | Najam |
| 5,521,631 A | 5/1996 | Budow et al. |
| 5,526,344 A | 6/1996 | Diaz et al. |
| 5,528,507 A | 6/1996 | McNamara et al. |
| 5,530,737 A | 6/1996 | Bartholomew et al. |
| 5,530,748 A | 6/1996 | Ohmori |
| 5,533,101 A | 7/1996 | Miyagawa |
| 5,534,912 A | 7/1996 | Kostreski |
| 5,535,336 A | 7/1996 | Smith et al. |
| 5,535,338 A | 7/1996 | Krause et al. |
| 5,537,458 A | 7/1996 | Suomi et al. |
| 5,537,637 A | 7/1996 | Sugita et al. |

(56) References Cited

U.S. PATENT DOCUMENTS

| | | | |
|---|---|---|---|
| 5,539,449 A | 7/1996 | Blahut et al. |
| 5,539,821 A | 7/1996 | Blonder |
| 5,539,880 A | 7/1996 | Lakhani |
| 5,544,164 A | 8/1996 | Baran |
| 5,546,385 A | 8/1996 | Caspi et al. |
| 5,548,592 A | 8/1996 | Komarek et al. |
| 5,550,836 A | 8/1996 | Albrecht et al. |
| 5,550,900 A | 8/1996 | Ensor et al. |
| 5,553,063 A | 9/1996 | Dickson |
| 5,554,968 A | 9/1996 | Lee |
| 5,557,612 A | 9/1996 | Bingham |
| 5,559,377 A | 9/1996 | Abraham |
| 5,565,855 A | 10/1996 | Knibbe |
| 5,570,085 A | 10/1996 | Bertsch |
| 5,570,355 A | 10/1996 | Dail et al. |
| 5,572,182 A | 11/1996 | De Pinho Filho et al. |
| 5,572,575 A | 11/1996 | Yamamoto et al. |
| 5,574,748 A | 11/1996 | Vander Mey et al. |
| 5,574,964 A | 11/1996 | Hamlin |
| 5,579,221 A | 11/1996 | Mun |
| 5,579,335 A | 11/1996 | Sutterlin et al. |
| 5,579,486 A | 11/1996 | Oprescu et al. |
| 5,581,229 A | 12/1996 | Hunt |
| 5,581,555 A | 12/1996 | Dubberly et al. |
| 5,581,801 A | 12/1996 | Spriester et al. |
| 5,585,837 A | 12/1996 | Nixon |
| 5,586,121 A | 12/1996 | Moura et al. |
| 5,586,271 A | 12/1996 | Parrett |
| 5,587,692 A | 12/1996 | Graham et al. |
| 5,590,173 A | 12/1996 | Beasley |
| 5,592,482 A | 1/1997 | Abraham |
| 5,592,540 A | 1/1997 | Beveridge |
| 5,594,726 A | 1/1997 | Thompson et al. |
| 5,594,732 A | 1/1997 | Bell et al. |
| 5,594,789 A | 1/1997 | Seazholtz et al. |
| 5,596,631 A | 1/1997 | Chen |
| 5,600,333 A | 2/1997 | Justice et al. |
| 5,603,080 A | 2/1997 | Kallander et al. |
| 5,604,740 A | 2/1997 | Pinault et al. |
| 5,608,447 A | 3/1997 | Farry et al. |
| 5,608,725 A | 3/1997 | Grube et al. |
| 5,610,910 A | 3/1997 | Focsaneanu et al. |
| 5,610,916 A | 3/1997 | Kostreski et al. |
| 5,613,130 A | 3/1997 | Teng et al. |
| 5,613,190 A | 3/1997 | Hylton |
| 5,613,191 A | 3/1997 | Hylton et al. |
| 5,614,811 A | 3/1997 | Sagalovich et al. |
| 5,619,251 A | 4/1997 | Kuroiwa et al. |
| 5,619,252 A | 4/1997 | Nakano |
| 5,619,505 A | 4/1997 | Grube et al. |
| 5,621,455 A | 4/1997 | Rogers et al. |
| 5,623,537 A | 4/1997 | Ensor et al. |
| 5,625,651 A | 4/1997 | Cioffi |
| 5,625,677 A | 4/1997 | Feiertag et al. |
| 5,625,863 A | 4/1997 | Abraham |
| 5,627,501 A | 5/1997 | Biran et al. |
| 5,627,827 A | 5/1997 | Dale et al. |
| 5,628,055 A | 5/1997 | Stein |
| 5,630,204 A | 5/1997 | Hylton et al. |
| 5,634,191 A | 5/1997 | Beasley |
| 5,642,155 A | 6/1997 | Cheng |
| 5,646,983 A | 7/1997 | Suffern et al. |
| 5,652,893 A | 7/1997 | Ben-Meir et al. |
| 5,657,358 A | 8/1997 | Panech et al. |
| 5,661,726 A | 8/1997 | Wilder et al. |
| 5,664,101 A | 9/1997 | Picache |
| 5,666,293 A | 9/1997 | Metz et al. |
| 5,666,402 A | 9/1997 | Griffin |
| 5,668,814 A | 9/1997 | Balatoni |
| 5,668,857 A | 9/1997 | McHale |
| 5,671,220 A | 9/1997 | Tonomura |
| 5,673,290 A | 9/1997 | Cioffi |
| 5,675,375 A | 10/1997 | Riffee |
| 5,682,423 A | 10/1997 | Walker |
| 5,684,450 A | 11/1997 | Brown |
| 5,684,826 A | 11/1997 | Ratner |
| 5,689,242 A | 11/1997 | Sims et al. |
| 5,691,691 A | 11/1997 | Merwin et al. |
| 5,694,108 A | 12/1997 | Shuey |
| 5,696,790 A | 12/1997 | Graham et al. |
| 5,696,861 A | 12/1997 | Schimmeyer et al. |
| 5,699,276 A | 12/1997 | Roos |
| 5,699,413 A | 12/1997 | Sridhar |
| 5,705,974 A | 1/1998 | Patel et al. |
| 5,708,663 A | 1/1998 | Wright et al. |
| 5,708,701 A | 1/1998 | Houvig et al. |
| 5,708,705 A | 1/1998 | Yamashita et al. |
| 5,708,961 A | 1/1998 | Hylton et al. |
| 5,712,614 A | 1/1998 | Patel et al. |
| 5,712,977 A | 1/1998 | Glad et al. |
| 5,717,685 A | 2/1998 | Abraham |
| 5,719,858 A | 2/1998 | Moore |
| 5,719,872 A | 2/1998 | Dubberly et al. |
| 5,722,076 A | 2/1998 | Sakabe et al. |
| 5,726,980 A | 3/1998 | Rickard |
| 5,727,004 A | 3/1998 | Propp et al. |
| 5,729,824 A | 3/1998 | O'Neill et al. |
| 5,731,664 A | 3/1998 | Posa |
| 5,734,678 A | 3/1998 | Paneth et al. |
| RE35,774 E | 4/1998 | Moura et al. |
| 5,736,965 A | 4/1998 | Mosebrook et al. |
| 5,740,176 A | 4/1998 | Gupta et al. |
| 5,745,837 A | 4/1998 | Fuhrmann |
| 5,748,104 A | 5/1998 | Argyroudis et al. |
| 5,748,634 A | 5/1998 | Sokol et al. |
| 5,748,671 A | 5/1998 | Sutterlin et al. |
| 5,751,701 A | 5/1998 | Langberg et al. |
| 5,754,539 A | 5/1998 | Metz et al. |
| 5,756,280 A | 5/1998 | Soora et al. |
| 5,757,803 A | 5/1998 | Russell et al. |
| 5,757,936 A | 5/1998 | Lee |
| 5,758,075 A | 5/1998 | Graziano et al. |
| 5,760,822 A | 6/1998 | Coutinho |
| 5,767,895 A | 6/1998 | Yashiro et al. |
| 5,768,279 A | 6/1998 | Barn et al. |
| 5,771,236 A | 6/1998 | Sansom et al. |
| 5,774,526 A | 6/1998 | Propp et al. |
| 5,774,789 A | 6/1998 | van der Kaay et al. |
| 5,777,544 A | 7/1998 | Vander Mey et al. |
| 5,777,545 A | 7/1998 | Patel et al. |
| 5,777,769 A | 7/1998 | Coutinho |
| 5,778,303 A | 7/1998 | Shinozaki et al. |
| 5,781,617 A | 7/1998 | McHale et al. |
| 5,784,377 A | 7/1998 | Baydar et al. |
| 5,787,115 A | 7/1998 | Turnbull et al. |
| 5,790,548 A | 8/1998 | Sistanizadeh et al. |
| 5,793,265 A | 8/1998 | Spielman |
| 5,793,413 A | 8/1998 | Hylton et al. |
| 5,796,739 A | 8/1998 | Kim et al. |
| 5,796,965 A | 8/1998 | Choi et al. |
| 5,799,017 A | 8/1998 | Gupta et al. |
| 5,799,069 A | 8/1998 | Weston et al. |
| 5,802,173 A | 9/1998 | Hamilton-Piercy et al. |
| 5,802,177 A | 9/1998 | Daniel et al. |
| 5,802,283 A | 9/1998 | Grady et al. |
| 5,805,053 A | 9/1998 | Patel et al. |
| 5,805,591 A | 9/1998 | Naboulsi et al. |
| 5,805,597 A | 9/1998 | Edem |
| 5,805,806 A | 9/1998 | McArthur |
| 5,809,026 A | 9/1998 | Wong et al. |
| 5,809,033 A | 9/1998 | Turner et al. |
| 5,809,431 A | 9/1998 | Bustamante et al. |
| 5,812,184 A | 9/1998 | Martinez |
| 5,812,531 A | 9/1998 | Cheung et al. |
| 5,812,553 A | 9/1998 | Pinault et al. |
| 5,812,786 A | 9/1998 | Seazholtz et al. |
| 5,815,086 A | 9/1998 | Ivie et al. |
| 5,815,505 A | 9/1998 | Mills |
| 5,815,681 A | 9/1998 | Kikinis |
| 5,818,127 A | 10/1998 | Abraham |
| 5,818,710 A | 10/1998 | Levan Suu |
| 5,818,725 A | 10/1998 | McNamara et al. |
| 5,818,821 A | 10/1998 | Schurig |
| 5,818,845 A | 10/1998 | Moura et al. |

(56) References Cited

U.S. PATENT DOCUMENTS

| | | |
|---|---|---|
| 5,822,374 A | 10/1998 | Levin |
| 5,822,677 A | 10/1998 | Peyrovian |
| 5,822,678 A | 10/1998 | Evanyk |
| 5,828,293 A | 10/1998 | Rickard |
| 5,828,663 A | 10/1998 | Ikegami |
| 5,828,666 A | 10/1998 | Focsaneanu et al. |
| 5,828,821 A | 10/1998 | Hoshina et al. |
| 5,832,057 A | 11/1998 | Furman |
| 5,832,364 A | 11/1998 | Gustafson |
| 5,832,365 A | 11/1998 | Chen et al. |
| 5,835,005 A | 11/1998 | Furukawa et al. |
| 5,835,863 A | 11/1998 | Ikenouchi et al. |
| 5,838,226 A | 11/1998 | Houggy et al. |
| 5,841,360 A | 11/1998 | Binder |
| 5,841,840 A | 11/1998 | Smith et al. |
| 5,841,841 A | 11/1998 | Dodds et al. |
| 5,842,032 A | 11/1998 | Bertsch |
| 5,842,111 A | 11/1998 | Byers |
| 5,844,789 A | 12/1998 | Wynn |
| 5,844,888 A | 12/1998 | Markkula, Jr. et al. |
| 5,844,949 A | 12/1998 | Hershey et al. |
| 5,845,190 A | 12/1998 | Bushue et al. |
| 5,847,751 A | 12/1998 | Safadi |
| 5,848,054 A | 12/1998 | Mosebrook et al. |
| 5,848,059 A | 12/1998 | Yamamoto |
| 5,848,150 A | 12/1998 | Bingel |
| 5,852,631 A | 12/1998 | Scott |
| 5,859,596 A | 1/1999 | McRae |
| 5,864,284 A | 1/1999 | Sanderson |
| 5,867,669 A | 2/1999 | Breen et al. |
| 5,870,016 A | 2/1999 | Shrestha |
| 5,870,134 A | 2/1999 | Laubach et al. |
| 5,870,513 A | 2/1999 | Williams |
| 5,878,047 A | 3/1999 | Ganek et al. |
| 5,883,896 A | 3/1999 | Brieskorn |
| 5,886,732 A | 3/1999 | Humpleman |
| 5,889,765 A | 3/1999 | Gibbs |
| 5,889,856 A | 3/1999 | O'Toole et al. |
| 5,892,430 A | 4/1999 | Wiesman et al. |
| 5,892,795 A | 4/1999 | Paret |
| 5,896,417 A | 4/1999 | Lau |
| 5,896,443 A | 4/1999 | Dichter |
| 5,896,556 A | 4/1999 | Moreland et al. |
| 5,896,569 A | 4/1999 | Butler et al. |
| 5,898,347 A | 4/1999 | Harford |
| 5,898,761 A | 4/1999 | McHale et al. |
| 5,903,213 A | 5/1999 | Hodge et al. |
| 5,903,548 A | 5/1999 | Delamater |
| 5,903,572 A | 5/1999 | Wright et al. |
| 5,903,594 A | 5/1999 | Saulnier et al. |
| 5,905,442 A | 5/1999 | Mosebrook et al. |
| 5,905,781 A | 5/1999 | McHale et al. |
| 5,905,786 A | 5/1999 | Hoopes |
| 5,909,445 A | 6/1999 | Schneider |
| 5,910,776 A | 6/1999 | Black |
| 5,910,970 A | 6/1999 | Lu |
| 5,911,119 A | 6/1999 | Bartholomew et al. |
| 5,912,895 A | 6/1999 | Terry et al. |
| 5,912,896 A | 6/1999 | Beighe et al. |
| 5,917,624 A | 6/1999 | Wagner |
| 5,917,814 A | 6/1999 | Balatoni |
| 5,918,016 A | 6/1999 | Brewer et al. |
| 5,919,250 A | 7/1999 | Shimokawa |
| 5,922,047 A | 7/1999 | Newlin et al. |
| 5,923,361 A | 7/1999 | Sutton, Jr. |
| 5,926,464 A | 7/1999 | Fraser |
| 5,926,479 A | 7/1999 | Baran |
| 5,926,531 A | 7/1999 | Petite |
| 5,929,748 A | 7/1999 | Odinak |
| 5,929,749 A | 7/1999 | Slonim et al. |
| 5,929,896 A | 7/1999 | Goodman et al. |
| 5,930,231 A | 7/1999 | Miller et al. |
| 5,930,340 A | 7/1999 | Bell |
| 5,930,682 A | 7/1999 | Schwartz et al. |
| 5,930,719 A | 7/1999 | Babitch et al. |
| 5,933,073 A | 8/1999 | Shuey |
| 5,936,660 A | 8/1999 | Gurantz |
| 5,936,963 A | 8/1999 | Saussy |
| 5,937,342 A | 8/1999 | Kline |
| 5,937,348 A | 8/1999 | Cina et al. |
| 5,940,400 A | 8/1999 | Eastmond et al. |
| 5,940,738 A | 8/1999 | Rao |
| 5,943,319 A | 8/1999 | Fraser |
| 5,946,047 A | 8/1999 | Levan |
| 5,946,048 A | 8/1999 | Levan |
| 5,946,616 A | 8/1999 | Schornack et al. |
| 5,949,327 A | 9/1999 | Brown |
| 5,949,473 A | 9/1999 | Goodman |
| 5,949,476 A | 9/1999 | Pocock et al. |
| 5,950,149 A | 9/1999 | Fieramosca et al. |
| 5,952,914 A | 9/1999 | Wynn |
| 5,953,344 A | 9/1999 | Dail et al. |
| 5,953,670 A | 9/1999 | Newson |
| 5,956,323 A | 9/1999 | Bowie |
| 5,959,996 A | 9/1999 | Byers |
| 5,960,066 A | 9/1999 | Hartmann et al. |
| 5,960,344 A | 9/1999 | Mahany |
| 5,963,539 A | 10/1999 | Webber, Jr. et al. |
| 5,963,595 A | 10/1999 | Graham et al. |
| 5,963,844 A | 10/1999 | Dail |
| 5,974,553 A | 10/1999 | Gandar |
| 5,977,650 A | 11/1999 | Rickard et al. |
| 5,977,913 A | 11/1999 | Christ |
| 5,978,353 A | 11/1999 | Iwahori et al. |
| 5,982,276 A | 11/1999 | Stewart |
| 5,982,363 A | 11/1999 | Naiff |
| 5,982,784 A | 11/1999 | Bell |
| 5,982,854 A | 11/1999 | Ehreth |
| 5,983,070 A | 11/1999 | Georges et al. |
| 5,983,117 A | 11/1999 | Sandler et al. |
| 5,986,574 A | 11/1999 | Colton |
| 5,987,061 A | 11/1999 | Chen |
| 5,987,303 A | 11/1999 | Dutta et al. |
| 5,991,292 A | 11/1999 | Focsaneanu et al. |
| 5,991,311 A | 11/1999 | Long et al. |
| 5,991,831 A | 11/1999 | Lee et al. |
| 5,991,885 A | 11/1999 | Chang et al. |
| 5,994,998 A | 11/1999 | Fisher et al. |
| 5,995,593 A | 11/1999 | Cho |
| 5,995,598 A | 11/1999 | Berstis |
| 5,999,518 A | 12/1999 | Nattkemper et al. |
| 5,999,612 A | 12/1999 | Dunn et al. |
| 6,002,638 A | 12/1999 | John |
| 6,002,682 A | 12/1999 | Bellenger et al. |
| 6,002,722 A | 12/1999 | Wu |
| 6,005,476 A | 12/1999 | Valiulis |
| 6,005,850 A | 12/1999 | Moura et al. |
| 6,005,873 A | 12/1999 | Amit |
| 6,005,884 A | 12/1999 | Cook et al. |
| 6,009,465 A | 12/1999 | Decker et al. |
| 6,009,479 A | 12/1999 | Jeffries |
| 6,011,781 A | 1/2000 | Bell |
| 6,011,910 A | 1/2000 | Chau et al. |
| 6,014,386 A | 1/2000 | Abraham |
| 6,014,431 A | 1/2000 | McHale et al. |
| 6,016,321 A | 1/2000 | Hetzel et al. |
| 6,018,690 A | 1/2000 | Saito et al. |
| 6,021,158 A | 2/2000 | Schurr et al. |
| 6,025,945 A | 2/2000 | Nyu et al. |
| 6,026,150 A | 2/2000 | Frank et al. |
| 6,026,160 A | 2/2000 | Staber et al. |
| 6,028,860 A | 2/2000 | Laubach et al. |
| 6,028,867 A | 2/2000 | Rawson et al. |
| 6,029,047 A | 2/2000 | Ishida et al. |
| 6,032,057 A | 2/2000 | Kiiski |
| 6,033,101 A | 3/2000 | Reddick et al. |
| 6,034,988 A | 3/2000 | Vandermey et al. |
| 6,037,678 A | 3/2000 | Rickard |
| 6,038,300 A | 3/2000 | Hartmann et al. |
| 6,038,425 A | 3/2000 | Jeffrey |
| 6,040,759 A | 3/2000 | Sanderson |
| 6,049,531 A | 4/2000 | Roy |
| 6,052,380 A | 4/2000 | Bell |
| 6,055,242 A | 4/2000 | Doshi et al. |

(56) References Cited

U.S. PATENT DOCUMENTS

| | | |
|---|---|---|
| 6,055,268 A | 4/2000 | Timm et al. |
| 6,055,435 A | 4/2000 | Smith et al. |
| 6,061,357 A | 5/2000 | Olshansky et al. |
| 6,061,392 A | 5/2000 | Bremer et al. |
| 6,064,422 A | 5/2000 | Goolcharan et al. |
| 6,064,673 A | 5/2000 | Anderson et al. |
| 6,069,588 A | 5/2000 | O'Neill, Jr. |
| 6,069,879 A | 5/2000 | Chatter |
| 6,069,899 A | 5/2000 | Foley |
| 6,072,779 A | 6/2000 | Tzannes et al. |
| 6,072,810 A | 6/2000 | Van der Putten et al. |
| 6,075,784 A | 6/2000 | Frankel et al. |
| 6,075,787 A | 6/2000 | Bobeck et al. |
| 6,081,519 A | 6/2000 | Petler |
| 6,081,533 A | 6/2000 | Laubach et al. |
| 6,084,758 A | 7/2000 | Clarey et al. |
| 6,087,835 A | 7/2000 | Haneda |
| 6,087,860 A | 7/2000 | Liu et al. |
| 6,088,368 A | 7/2000 | Rubinstain et al. |
| 6,088,569 A | 7/2000 | Bach et al. |
| 6,094,441 A | 7/2000 | Jung et al. |
| 6,097,761 A | 8/2000 | Buhring et al. |
| 6,101,228 A | 8/2000 | Hebron et al. |
| 6,101,341 A | 8/2000 | Manabe |
| 6,104,707 A | 8/2000 | Abraham |
| 6,104,727 A | 8/2000 | Moura et al. |
| 6,107,656 A | 8/2000 | Igarashi |
| 6,107,912 A | 8/2000 | Bullock et al. |
| 6,108,330 A | 8/2000 | Bhatia et al. |
| 6,108,331 A | 8/2000 | Thompson |
| 6,111,595 A | 8/2000 | Hertrich |
| 6,111,936 A | 8/2000 | Bremer |
| 6,112,232 A | 8/2000 | Shahar et al. |
| 6,114,632 A | 9/2000 | Planas, Sr. et al. |
| 6,114,970 A | 9/2000 | Kirson et al. |
| 6,115,429 A | 9/2000 | Huang |
| 6,115,468 A | 9/2000 | De Nicolo |
| 6,115,755 A | 9/2000 | Krishan |
| 6,127,925 A | 10/2000 | Bonsignore et al. |
| 6,130,879 A | 10/2000 | Liu |
| 6,130,893 A | 10/2000 | Whittaker et al. |
| 6,130,896 A | 10/2000 | Lueker et al. |
| 6,137,793 A | 10/2000 | Gorman et al. |
| 6,137,865 A | 10/2000 | Ripy et al. |
| 6,137,866 A | 10/2000 | Staber et al. |
| 6,141,330 A | 10/2000 | Akers |
| 6,141,339 A | 10/2000 | Kaplan et al. |
| 6,141,356 A | 10/2000 | Gorman ............... 370/493 |
| 6,141,763 A | 10/2000 | Smith et al. |
| 6,144,292 A | 11/2000 | Brown |
| 6,144,399 A | 11/2000 | Manchester et al. |
| 6,148,006 A | 11/2000 | Dyke et al. |
| 6,151,330 A | 11/2000 | Liberman |
| 6,151,480 A | 11/2000 | Fischer et al. |
| 6,154,488 A | 11/2000 | Hunt |
| 6,157,292 A | 12/2000 | Piercy et al. |
| 6,157,645 A | 12/2000 | Shobatake |
| 6,160,795 A | 12/2000 | Hosemann |
| 6,166,730 A | 12/2000 | Goode et al. |
| 6,167,043 A | 12/2000 | Frantz |
| 6,167,120 A | 12/2000 | Kikinis |
| 6,175,522 B1 | 1/2001 | Fang |
| 6,175,556 B1 | 1/2001 | Allen, Jr. et al. |
| 6,175,860 B1 | 1/2001 | Gaucher |
| 6,177,884 B1 | 1/2001 | Hunt et al. |
| 6,178,161 B1 | 1/2001 | Terry |
| 6,178,455 B1 | 1/2001 | Schutte et al. |
| 6,181,775 B1 | 1/2001 | Bella |
| 6,186,826 B1 | 2/2001 | Weikle |
| 6,188,557 B1 | 2/2001 | Chaudhry |
| 6,188,871 B1 | 2/2001 | Kitamura et al. |
| 6,192,399 B1 | 2/2001 | Goodman |
| 6,195,339 B1 | 2/2001 | Erite et al. |
| 6,195,706 B1 | 2/2001 | Scott |
| 6,202,211 B1 | 3/2001 | Williams, Jr. |
| 6,205,202 B1 | 3/2001 | Yoshida et al. |
| 6,205,495 B1 | 3/2001 | Gilbert et al. |
| 6,208,637 B1 | 3/2001 | Eames |
| 6,212,204 B1 | 4/2001 | Depue |
| 6,212,227 B1 | 4/2001 | Ko et al. |
| 6,212,658 B1 | 4/2001 | Le Van |
| 6,215,789 B1 | 4/2001 | Keenan et al. |
| 6,215,855 B1 | 4/2001 | Schneider |
| 6,216,160 B1 | 4/2001 | Dichter |
| 6,216,171 B1 | 4/2001 | Isono et al. |
| 6,218,930 B1 | 4/2001 | Katzenberg et al. |
| 6,218,931 B1 | 4/2001 | Asghar et al. |
| 6,219,409 B1 | 4/2001 | Smith et al. |
| 6,229,433 B1 | 5/2001 | Rye et al. |
| 6,229,818 B1 | 5/2001 | Bell |
| 6,233,235 B1 | 5/2001 | Burke et al. |
| 6,236,653 B1 | 5/2001 | Dalton et al. |
| 6,239,672 B1 | 5/2001 | Lutz, Jr. et al. |
| 6,240,091 B1 | 5/2001 | Ginzboorg et al. |
| 6,240,166 B1 | 5/2001 | Collin et al. |
| 6,243,394 B1 | 6/2001 | Deng |
| 6,243,413 B1 | 6/2001 | Beukema |
| 6,243,446 B1 | 6/2001 | Goodman |
| 6,243,571 B1 | 6/2001 | Bullock et al. |
| 6,243,818 B1 | 6/2001 | Schwan et al. |
| 6,246,695 B1 | 6/2001 | Seazholtz et al. |
| 6,246,716 B1 | 6/2001 | Schneider |
| 6,246,868 B1 | 6/2001 | Bullock et al. |
| 6,249,213 B1 | 6/2001 | Horne |
| 6,249,671 B1 | 6/2001 | Tucker et al. |
| 6,252,755 B1 | 6/2001 | Willer |
| 6,256,296 B1 | 7/2001 | Ruziak et al. |
| 6,259,676 B1 | 7/2001 | Kellock et al. |
| 6,259,910 B1 | 7/2001 | Fairfield et al. |
| 6,266,348 B1 | 7/2001 | Gross et al. |
| 6,272,219 B1 | 8/2001 | De Bruycker et al. |
| 6,272,551 B1 | 8/2001 | Martin et al. |
| 6,275,144 B1 | 8/2001 | Rumbaugh |
| 6,278,769 B1 | 8/2001 | Bella |
| 6,281,784 B1 | 8/2001 | Redgate et al. |
| 6,282,189 B1 | 8/2001 | Eames |
| 6,282,238 B1 | 8/2001 | Landry |
| 6,282,405 B1 | 8/2001 | Brown |
| 6,285,754 B1 | 9/2001 | Sun et al. |
| 6,286,049 B1 | 9/2001 | Rajakarunanayake et al. |
| 6,288,334 B1 | 9/2001 | Hennum |
| 6,288,631 B1 | 9/2001 | Shinozaki et al. |
| 6,288,632 B1 | 9/2001 | Hoctor et al. |
| 6,290,141 B1 | 9/2001 | Park et al. |
| 6,292,467 B1 | 9/2001 | Keller |
| 6,292,517 B1 | 9/2001 | Jeffress et al. |
| 6,295,356 B1 | 9/2001 | De Nicolo |
| 6,298,037 B1 | 10/2001 | Sharifi |
| 6,300,881 B1 | 10/2001 | Yee et al. |
| 6,301,337 B1 | 10/2001 | Scholtz et al. |
| 6,307,862 B1 | 10/2001 | Silverman |
| 6,310,894 B1 | 10/2001 | Counterman |
| 6,310,909 B1 | 10/2001 | Jones |
| 6,314,102 B1 | 11/2001 | Czerwiec et al. |
| 6,317,884 B1 | 11/2001 | Eames et al. |
| 6,320,494 B1 | 11/2001 | Bartels et al. |
| 6,320,866 B2 | 11/2001 | Wolf et al. |
| 6,320,900 B1 | 11/2001 | Liu |
| 6,324,268 B1 | 11/2001 | Balachandran et al. |
| 6,329,937 B1 | 12/2001 | Harman |
| 6,330,244 B1 | 12/2001 | Swartz et al. |
| 6,331,814 B1 | 12/2001 | Albano et al. |
| 6,346,875 B1 | 2/2002 | Puckette et al. |
| 6,346,964 B1 | 2/2002 | Rogers et al. |
| 6,348,874 B1 | 2/2002 | Cole et al. |
| 6,348,875 B1 | 2/2002 | Odinak et al. |
| 6,349,133 B1 | 2/2002 | Matthews et al. |
| 6,353,599 B1 | 3/2002 | Bi et al. |
| 6,353,629 B1 | 3/2002 | Pal |
| 6,356,562 B1 | 3/2002 | Bamba |
| 6,359,906 B1 | 3/2002 | Dyke et al. |
| 6,370,149 B1 | 4/2002 | Gorman et al. |
| 6,373,377 B1 | 4/2002 | Sacca et al. |
| 6,377,163 B1 | 4/2002 | Deller et al. |

(56) References Cited

U.S. PATENT DOCUMENTS

| | | | |
|---|---|---|---|
| 6,381,745 B1 | 4/2002 | Paul | |
| 6,383,076 B1 | 5/2002 | Tiedeken | 463/40 |
| 6,385,024 B1 | 5/2002 | Olson | |
| 6,385,203 B2 | 5/2002 | McHale et al. | |
| 6,388,990 B1 | 5/2002 | Wetzel | |
| 6,389,110 B1 | 5/2002 | Fischer et al. | |
| 6,389,125 B1 | 5/2002 | Ubowski | |
| 6,392,349 B1 | 5/2002 | Crenshaw | |
| 6,393,050 B1 | 5/2002 | Liu | |
| 6,393,607 B1 | 5/2002 | Hughes et al. | |
| 6,396,391 B1 | 5/2002 | Binder | |
| 6,396,392 B1 | 5/2002 | Abraham | |
| 6,396,393 B2 | 5/2002 | Yuasa | |
| 6,396,837 B1 | 5/2002 | Wang et al. | |
| 6,397,288 B1 | 5/2002 | Rye et al. | |
| 6,400,815 B1 | 6/2002 | Gilboy et al. | |
| 6,400,957 B1 | 6/2002 | Rodrigues et al. | |
| 6,404,348 B1 | 6/2002 | Wilfong | |
| 6,404,773 B1 | 6/2002 | Williams et al. | |
| 6,404,861 B1 | 6/2002 | Cohen et al. | |
| 6,407,987 B1 | 6/2002 | Abraham | |
| 6,414,952 B2 | 7/2002 | Foley | |
| 6,417,762 B1 | 7/2002 | Comer | |
| 6,418,149 B1 | 7/2002 | Swisher et al. | |
| 6,418,558 B1 | 7/2002 | Roberts et al. | |
| 6,424,661 B1 | 7/2002 | Bentley | |
| 6,427,237 B1 | 7/2002 | Aranguren et al. | |
| 6,430,199 B1 | 8/2002 | Kerpez | |
| 6,434,123 B1 | 8/2002 | Park | |
| 6,438,109 B1 | 8/2002 | Karaoguz et al. | |
| 6,441,723 B1 | 8/2002 | Mansfield, Jr. et al. | |
| 6,442,129 B1 | 8/2002 | Yonge, III et al. | |
| 6,442,195 B1 | 8/2002 | Liu et al. | |
| 6,445,087 B1 | 9/2002 | Wang et al. | |
| 6,449,291 B1 | 9/2002 | Burns et al. | |
| 6,449,318 B1 | 9/2002 | Rumbaugh | |
| 6,449,348 B1 | 9/2002 | Lamb et al. | |
| 6,452,910 B1 | 9/2002 | Vij et al. | |
| 6,452,923 B1 | 9/2002 | Gerszberg et al. | |
| 6,453,473 B1 | 9/2002 | Watson, Jr. | |
| 6,456,714 B2 | 9/2002 | Shima et al. | |
| 6,459,692 B1 | 10/2002 | Ben-Michael et al. | |
| 6,463,588 B1 | 10/2002 | Jenkins et al. | |
| 6,470,053 B1 | 10/2002 | Liu | |
| 6,473,495 B1 | 10/2002 | Willer | |
| 6,477,595 B1 | 11/2002 | Cohen et al. | |
| 6,480,510 B1 | 11/2002 | Binder | |
| 6,481,013 B1 | 11/2002 | Dinwiddie et al. | |
| 6,483,470 B1 | 11/2002 | Hohnstein et al. | |
| 6,483,902 B1 | 11/2002 | Stewart et al. | |
| 6,483,903 B1 | 11/2002 | Itay et al. | |
| 6,490,273 B1 | 12/2002 | DeNap et al. | |
| 6,492,897 B1 | 12/2002 | Mowery, Jr. | |
| 6,493,875 B1 | 12/2002 | Eames et al. | |
| 6,496,104 B2 | 12/2002 | Kline | |
| 6,501,389 B1 | 12/2002 | Aguirre | |
| 6,501,942 B1 | 12/2002 | Weissman et al. | |
| 6,513,163 B1 | 1/2003 | Silvia et al. | |
| 6,519,291 B1 | 2/2003 | Dagdeviren et al. | |
| 6,522,352 B1 | 2/2003 | Strandwitz et al. | |
| 6,522,662 B1 | 2/2003 | Liu | |
| 6,522,728 B1 | 2/2003 | Willer | |
| 6,522,730 B1 | 2/2003 | Timm et al. | |
| 6,522,731 B2 | 2/2003 | Matsumoto | |
| 6,526,516 B1 | 2/2003 | Ishikawa et al. | |
| 6,526,581 B1 | 2/2003 | Edson | |
| 6,532,279 B1 | 3/2003 | Goodman | |
| 6,532,280 B1 | 3/2003 | McDonald | |
| 6,535,110 B1 | 3/2003 | Arora et al. | |
| 6,535,480 B1 | 3/2003 | Bhagavath et al. | |
| 6,535,580 B1 | 3/2003 | Strauss et al. | |
| 6,535,587 B1 | 3/2003 | Kobayashi | |
| 6,539,011 B1 | 3/2003 | Keenan et al. | |
| 6,542,464 B1 | 4/2003 | Takeda et al. | |
| 6,542,465 B1 | 4/2003 | Wang | |
| 6,546,017 B1 | 4/2003 | Khaunte | |
| 6,546,024 B1 | 4/2003 | Sharper et al. | |
| 6,546,098 B1 | 4/2003 | Henderson | |
| 6,546,494 B1 | 4/2003 | Jackson et al. | |
| 6,549,120 B1 | 4/2003 | De Buda | |
| 6,549,616 B1 | 4/2003 | Binder | |
| 6,553,568 B1 | 4/2003 | Fijolek et al. | |
| 6,556,097 B2 | 4/2003 | Coffey | |
| 6,556,581 B1 | 4/2003 | He et al. | |
| 6,559,757 B1 | 5/2003 | Deller et al. | |
| 6,560,319 B1 | 5/2003 | Binder | |
| 6,563,418 B1 | 5/2003 | Moon | |
| 6,563,816 B1 | 5/2003 | Nodoushani et al. | |
| 6,567,981 B1 | 5/2003 | Jeffrey | |
| 6,570,869 B1 | 5/2003 | Shankar et al. | |
| 6,570,890 B1 | 5/2003 | Keenan et al. | |
| 6,571,181 B1 | 5/2003 | Rakshani et al. | |
| 6,572,384 B1 | 6/2003 | Marchevsky | |
| 6,573,826 B2 | 6/2003 | Pan | |
| 6,574,237 B1 | 6/2003 | Bullman et al. | |
| 6,574,242 B1 | 6/2003 | Keenan et al. | |
| 6,574,313 B1 | 6/2003 | Chea, Jr. et al. | |
| 6,577,231 B2 | 6/2003 | Litwin, Jr. et al. | |
| 6,577,631 B1 | 6/2003 | Keenan et al. | |
| 6,577,642 B1 | 6/2003 | Fijolek et al. | |
| 6,580,710 B1 | 6/2003 | Bowen et al. | |
| 6,580,727 B1 | 6/2003 | Yim et al. | |
| 6,580,728 B1 | 6/2003 | Cook et al. | |
| 6,580,785 B2 | 6/2003 | Bremer et al. | |
| 6,581,208 B1 | 6/2003 | Inaguma | |
| 6,583,719 B2 | 6/2003 | Okada et al. | |
| 6,584,122 B1 | 6/2003 | Matthews et al. | |
| 6,584,148 B1 | 6/2003 | Zitting et al. | |
| 6,587,454 B1 | 7/2003 | Lamb | |
| 6,587,473 B2 | 7/2003 | Terry et al. | |
| 6,587,479 B1 | 7/2003 | Bianchi et al. | |
| 6,587,739 B1 | 7/2003 | Abrams et al. | |
| 6,591,091 B1 | 7/2003 | Vorenkamp et al. | |
| 6,597,732 B1 | 7/2003 | Dowling | |
| 6,600,734 B1 | 7/2003 | Gernert et al. | |
| 6,603,808 B1 | 8/2003 | Anne et al. | |
| 6,611,537 B1 | 8/2003 | Edens et al. | |
| 6,615,407 B1 | 9/2003 | Inaguma | |
| 6,616,005 B1 | 9/2003 | Pereira et al. | |
| 6,618,353 B2 | 9/2003 | Merrill et al. | |
| 6,618,387 B1 | 9/2003 | Liu et al. | |
| 6,618,578 B1 | 9/2003 | Petite | |
| 6,622,304 B1 | 9/2003 | Carhart | |
| 6,624,532 B1 | 9/2003 | Davidow et al. | |
| 6,636,505 B1 | 10/2003 | Wang et al. | |
| 6,637,030 B1 | 10/2003 | Klein | |
| 6,639,913 B1 | 10/2003 | Frankel et al. | |
| 6,643,566 B1 | 11/2003 | Lehr et al. | |
| 6,647,069 B1 | 11/2003 | Segal et al. | |
| 6,650,871 B1 | 11/2003 | Cannon et al. | |
| 6,653,932 B1 | 11/2003 | Beamish et al. | |
| 6,654,616 B1 | 11/2003 | Pope, Jr. et al. | |
| 6,658,010 B1 | 12/2003 | Enns et al. | |
| 6,658,098 B2 | 12/2003 | Lamb et al. | |
| 6,658,108 B1 | 12/2003 | Bissell et al. | |
| 6,659,947 B1 | 12/2003 | Carter et al. | |
| 6,661,892 B1 | 12/2003 | Fischer | |
| 6,665,384 B2 | 12/2003 | Daum et al. | |
| 6,668,328 B1 | 12/2003 | Bell | |
| 6,671,501 B1 | 12/2003 | Dalichau | |
| 6,671,519 B2 | 12/2003 | Jeon et al. | |
| 6,674,843 B1 | 1/2004 | Ham | |
| 6,674,845 B2 | 1/2004 | Ayoub et al. | |
| 6,678,321 B1 | 1/2004 | Graham et al. | |
| 6,678,721 B1 | 1/2004 | Bell | |
| 6,678,740 B1 | 1/2004 | Rakib et al. | |
| 6,680,940 B1 | 1/2004 | Lewin et al. | |
| 6,683,531 B2 | 1/2004 | Diamanti et al. | |
| 6,686,832 B2 | 2/2004 | Abraham | |
| 6,690,677 B1 | 2/2004 | Binder | |
| 6,693,916 B1 | 2/2004 | Chaplik et al. | |
| 6,697,358 B2 | 2/2004 | Bernstein | |
| 6,697,864 B1 | 2/2004 | Demirtjis et al. | |
| 6,700,970 B1 | 3/2004 | Aronson et al. | |

(56) References Cited

U.S. PATENT DOCUMENTS

| | | |
|---|---|---|
| 6,701,406 B1 | 3/2004 | Chang et al. |
| 6,704,414 B2 | 3/2004 | Murakoshi |
| 6,704,545 B1 | 3/2004 | Wala |
| 6,704,824 B1 | 3/2004 | Goodman |
| 6,710,721 B1 | 3/2004 | Holowick |
| 6,711,138 B1 | 3/2004 | Pai et al. |
| 6,711,260 B1 | 3/2004 | Russell et al. |
| 6,711,417 B1 | 3/2004 | Gorman et al. |
| 6,711,742 B1 | 3/2004 | Kishi et al. |
| 6,714,534 B1 | 3/2004 | Gerszberg et al. |
| 6,721,298 B1 | 4/2004 | Vella-Coleiro |
| 6,721,365 B1 | 4/2004 | Yin et al. |
| 6,721,419 B1 | 4/2004 | Stell et al. |
| 6,721,790 B1 | 4/2004 | Chen |
| 6,724,750 B1 | 4/2004 | Sun |
| 6,725,059 B1 | 4/2004 | Bell |
| 6,731,627 B1 | 5/2004 | Gupta et al. |
| 6,731,945 B2 | 5/2004 | Do et al. |
| 6,732,315 B2 | 5/2004 | Yagil et al. |
| 6,732,368 B1 | 5/2004 | Michael et al. |
| 6,735,217 B1 | 5/2004 | Webber, Jr. et al. |
| 6,737,984 B1 | 5/2004 | Welles, II et al. |
| 6,738,382 B1 | 5/2004 | West et al. |
| 6,738,470 B1 | 5/2004 | Aronovitz |
| 6,738,597 B1 | 5/2004 | Jeung et al. |
| 6,738,641 B1 | 5/2004 | Elsasser |
| 6,741,162 B1 | 5/2004 | Sacca et al. |
| 6,744,883 B1 | 6/2004 | Bingel et al. |
| 6,745,392 B1 | 6/2004 | Basawapatna et al. |
| 6,747,995 B1 | 6/2004 | Brown et al. |
| 6,747,996 B2 | 6/2004 | Holloway et al. |
| 6,748,080 B2 | 6/2004 | Russ et al. |
| 6,751,441 B1 | 6/2004 | Murray et al. |
| 6,754,186 B1 | 6/2004 | Bullman |
| 6,754,235 B2 | 6/2004 | Van Der Putten et al. |
| 6,757,382 B1 | 6/2004 | Wilkes, Jr. et al. |
| 6,759,946 B2 | 7/2004 | Sahinoglu et al. |
| 6,760,384 B1 | 7/2004 | Garreau et al. |
| 6,763,097 B1 | 7/2004 | Vitenberg |
| 6,765,931 B1 | 7/2004 | Rabenko et al. |
| 6,771,164 B1 | 8/2004 | Fink |
| 6,771,750 B1 | 8/2004 | Nayler et al. |
| 6,771,773 B1 | 8/2004 | Hanrieder et al. |
| 6,771,774 B1 | 8/2004 | Phan et al. |
| 6,772,331 B1 | 8/2004 | Hind et al. |
| 6,773,632 B1 | 8/2004 | Marshall et al. |
| 6,778,549 B1 | 8/2004 | Keller |
| 6,778,646 B1 | 8/2004 | Sun |
| 6,778,817 B1 | 8/2004 | Bullock et al. |
| 6,781,530 B2 | 8/2004 | Moore |
| 6,782,048 B2 | 8/2004 | Santhoff |
| 6,785,296 B1 | 8/2004 | Bell |
| 6,785,532 B1 | 8/2004 | Rickard |
| 6,792,323 B2 | 9/2004 | Krzyzanowski et al. |
| 6,796,555 B1 | 9/2004 | Blahut |
| 6,804,195 B2 | 10/2004 | Izumi et al. |
| 6,804,351 B1 | 10/2004 | Karam |
| 6,807,463 B1 | 10/2004 | Cunningham et al. |
| 6,813,343 B1 | 11/2004 | Vitenberg |
| 6,816,512 B2 | 11/2004 | Lazarus et al. |
| 6,819,682 B1 | 11/2004 | Rabenko et al. |
| 6,819,760 B1 | 11/2004 | Nayler |
| 6,822,946 B1 | 11/2004 | Wallace |
| 6,826,174 B1 | 11/2004 | Erekson et al. |
| 6,831,921 B2 | 12/2004 | Higgins |
| 6,831,975 B1 | 12/2004 | Easwaran et al. |
| 6,831,976 B1 | 12/2004 | Comerford et al. |
| 6,834,057 B1 | 12/2004 | Rabenko et al. |
| 6,836,546 B1 | 12/2004 | Willer |
| 6,839,345 B2 | 1/2005 | Lu et al. |
| 6,842,426 B2 | 1/2005 | Bogardus et al. |
| 6,842,459 B1 | 1/2005 | Binder ............... 370/463 |
| 6,844,809 B2 | 1/2005 | Manis et al. |
| 6,844,810 B2 | 1/2005 | Cern |
| 6,848,116 B1 | 1/2005 | Land |
| 6,850,560 B2 | 2/2005 | Heusala |
| 6,853,724 B2 | 2/2005 | Wang |
| 6,854,059 B2 | 2/2005 | Gardner |
| 6,856,799 B1 | 2/2005 | Ritter |
| 6,857,132 B1 | 2/2005 | Rakib et al. |
| 6,862,353 B2 | 3/2005 | Rabenko et al. |
| 6,865,193 B2 | 3/2005 | Terk |
| 6,868,058 B1 | 3/2005 | Cooper et al. |
| 6,868,072 B1 | 3/2005 | Lin et al. |
| 6,868,117 B1 | 3/2005 | Mardinian |
| 6,880,020 B1 | 4/2005 | Rubinstein et al. |
| 6,885,674 B2 | 4/2005 | Hunt et al. |
| 6,886,181 B1 | 4/2005 | Dodds et al. |
| 6,889,095 B1 | 5/2005 | Eidson et al. |
| 6,891,881 B2 | 5/2005 | Trachewsky et al. |
| 6,895,089 B2 | 5/2005 | Wang |
| 6,896,551 B2 | 5/2005 | Hauck et al. |
| 6,898,413 B2 | 5/2005 | Yip et al. |
| 6,901,439 B1 | 5/2005 | Bonasia et al. |
| 6,904,134 B2 | 6/2005 | Jeon et al. |
| 6,904,149 B2 | 6/2005 | Keenum et al. |
| 6,909,725 B1 | 6/2005 | Chow |
| 6,912,145 B2 | 6/2005 | Hung et al. |
| 6,912,209 B1 | 6/2005 | Thi et al. |
| 6,912,651 B1 | 6/2005 | Hamdi et al. |
| 6,922,135 B2 | 7/2005 | Abraham |
| 6,922,407 B2 | 7/2005 | Wu |
| 6,925,089 B2 | 8/2005 | Chow et al. |
| 6,930,987 B1 | 8/2005 | Fukuda et al. |
| 6,931,659 B1 | 8/2005 | Kinemura |
| 6,933,835 B2 | 8/2005 | Kline |
| 6,934,170 B2 | 8/2005 | Ooishi |
| 6,934,754 B2 | 8/2005 | West et al. |
| 6,937,056 B2 | 8/2005 | Binder |
| 6,940,918 B1 | 9/2005 | Nayler et al. |
| 6,941,364 B2 | 9/2005 | Kim et al. |
| 6,941,576 B2 | 9/2005 | Amit |
| 6,943,683 B2 | 9/2005 | Perret |
| 6,947,409 B2 | 9/2005 | Iwamura |
| 6,947,736 B2 | 9/2005 | Shaver et al. |
| 6,950,567 B2 | 9/2005 | Kline |
| 6,952,785 B1 | 10/2005 | Diab et al. |
| 6,956,826 B1 | 10/2005 | Binder |
| 6,958,680 B2 | 10/2005 | Kline |
| 6,961,303 B1 | 11/2005 | Binder |
| 6,961,763 B1 | 11/2005 | Wang et al. |
| 6,963,559 B2 | 11/2005 | Elo |
| 6,963,931 B2 | 11/2005 | Bunn et al. |
| 6,963,936 B2 | 11/2005 | Billington et al. |
| 6,965,302 B2 | 11/2005 | Mollenkopf et al. |
| 6,965,303 B2 | 11/2005 | Mollenkopf |
| 6,972,688 B2 | 12/2005 | Rapaich |
| 6,975,211 B2 | 12/2005 | Atsuta et al. |
| 6,975,713 B1 | 12/2005 | Smith et al. |
| 6,977,578 B2 | 12/2005 | Kline |
| 6,980,089 B1 | 12/2005 | Kline |
| 6,980,090 B2 | 12/2005 | Mollenkopf |
| 6,980,091 B2 | 12/2005 | White, II et al. |
| 6,980,638 B1 | 12/2005 | Smith et al. |
| 6,982,611 B2 | 1/2006 | Cope |
| 6,985,072 B2 | 1/2006 | Omidi et al. |
| 6,985,713 B2 | 1/2006 | Lehr et al. |
| 6,985,714 B2 | 1/2006 | Akiyama et al. |
| 6,987,430 B2 | 1/2006 | Wasaki et al. |
| 6,989,733 B2 | 1/2006 | Simonsen et al. |
| 6,989,734 B2 | 1/2006 | Thomas |
| 6,993,317 B2 | 1/2006 | Belsak, Jr. |
| 6,995,657 B2 | 2/2006 | Zalitzky et al. |
| 6,995,658 B2 | 2/2006 | Tustison et al. |
| 6,996,134 B1 | 2/2006 | Renucci et al. |
| 6,996,213 B1 | 2/2006 | De Jong |
| 6,996,837 B2 | 2/2006 | Miura et al. |
| 6,998,962 B2 | 2/2006 | Cope et al. |
| 6,998,964 B2 | 2/2006 | Lomax, Jr. et al. |
| 6,999,433 B2 | 2/2006 | Baum |
| 6,999,505 B2 | 2/2006 | Yokoo et al. |
| 7,002,898 B1 | 2/2006 | Lou |
| 7,003,102 B2 | 2/2006 | Kiko |
| 7,006,006 B2 | 2/2006 | Witkow et al. |

(56) References Cited

U.S. PATENT DOCUMENTS

| | | |
|---|---|---|
| 7,006,445 B1 | 2/2006 | Cole et al. |
| 7,007,305 B2 | 2/2006 | Carson et al. |
| 7,009,527 B2 | 3/2006 | Seo |
| 7,009,946 B1 | 3/2006 | Kardach |
| 7,012,922 B1 | 3/2006 | Unitt et al. |
| 7,015,797 B2 | 3/2006 | Kaylor et al. |
| 7,016,377 B1 | 3/2006 | Chun et al. |
| 7,023,868 B2 | 4/2006 | Rabenko et al. |
| 7,026,917 B2 | 4/2006 | Berkman |
| 7,027,416 B1 | 4/2006 | Kriz |
| 7,027,483 B2 | 4/2006 | Santhoff et al. |
| 7,027,770 B2 | 4/2006 | Judd et al. |
| 7,031,394 B2 | 4/2006 | Vitenberg |
| 7,035,270 B2 | 4/2006 | Moore, Jr. et al. |
| 7,035,280 B2 | 4/2006 | Binder |
| 7,035,281 B1 | 4/2006 | Spearman et al. |
| 7,036,140 B2 | 4/2006 | Terry et al. |
| 7,046,124 B2 | 5/2006 | Cope et al. |
| 7,046,882 B2 | 5/2006 | Kline |
| 7,046,983 B2 | 5/2006 | Elkayam et al. |
| 7,047,555 B1 | 5/2006 | Inaguma et al. |
| 7,049,939 B2 | 5/2006 | Ikeda et al. |
| 7,050,546 B1 | 5/2006 | Richardson et al. |
| 7,053,756 B2 | 5/2006 | Mollenkopf et al. |
| 7,054,303 B2 | 5/2006 | Miyazaki et al. |
| 7,054,442 B2 | 5/2006 | Weikle |
| 7,058,174 B2 | 6/2006 | Posthuma |
| 7,064,654 B2 | 6/2006 | Berkman et al. |
| 7,068,649 B2 | 6/2006 | Fisher et al. |
| 7,068,682 B2 | 6/2006 | Campbell et al. |
| 7,072,408 B2 | 7/2006 | Gehlot et al. |
| 7,079,012 B2 | 7/2006 | Wetmore |
| 7,082,320 B2 | 7/2006 | Kattukaran et al. |
| 7,085,238 B2 | 8/2006 | McBeath |
| 7,088,238 B2 | 8/2006 | Karaoguz et al. |
| 7,091,849 B1 | 8/2006 | Henry |
| 7,095,756 B2 | 8/2006 | Binder |
| 7,095,848 B1 | 8/2006 | Fischer et al. |
| 7,095,849 B2 | 8/2006 | Smith et al. |
| 7,098,773 B2 | 8/2006 | Berkman |
| 7,099,368 B2 | 8/2006 | Santhoff et al. |
| 7,099,621 B1 | 8/2006 | Chadwick |
| 7,103,240 B2 | 9/2006 | Kline |
| 7,106,261 B2 | 9/2006 | Nagel et al. |
| 7,106,388 B2 | 9/2006 | Vorenkamp et al. |
| 7,106,721 B1 | 9/2006 | Binder |
| 7,113,134 B1 | 9/2006 | Berkman |
| 7,113,574 B1 | 9/2006 | Haas et al. |
| 7,113,763 B2 | 9/2006 | Heinonen et al. |
| 7,116,685 B2 | 10/2006 | Brown et al. |
| 7,117,520 B2 | 10/2006 | Stewart |
| 7,133,278 B2 | 11/2006 | Amdahl et al. |
| 7,133,423 B1 | 11/2006 | Chow et al. |
| 7,133,729 B1 | 11/2006 | Wang et al. |
| 7,135,982 B2 | 11/2006 | Lee |
| 7,136,270 B2 | 11/2006 | Liebenow |
| 7,136,936 B2 | 11/2006 | Chan et al. |
| 7,138,886 B2 | 11/2006 | Strull et al. |
| 7,142,094 B1 | 11/2006 | Davidow et al. |
| 7,142,560 B2 | 11/2006 | Mansfield |
| 7,142,563 B1 | 11/2006 | Lin |
| 7,143,299 B1 | 11/2006 | Rubinstein et al. |
| 7,145,996 B2 | 12/2006 | Creamer et al. |
| 7,148,799 B2 | 12/2006 | Cern |
| 7,149,182 B1 | 12/2006 | Renucci et al. |
| 7,149,474 B1 | 12/2006 | Mikhak |
| 7,151,575 B1 | 12/2006 | Landry et al. |
| 7,152,168 B2 | 12/2006 | Boynton et al. |
| 7,154,996 B2 | 12/2006 | Strauss |
| 7,155,214 B2 | 12/2006 | Struthers et al. |
| 7,158,483 B1 | 1/2007 | Takabatake et al. |
| 7,162,377 B2 | 1/2007 | Amrod et al. |
| 7,164,346 B2 | 1/2007 | Hunt et al. |
| 7,164,690 B2 | 1/2007 | Limb et al. |
| 7,164,886 B2 | 1/2007 | Mowery et al. |
| 7,167,078 B2 | 1/2007 | Pourchot |
| 7,167,525 B2 | 1/2007 | Santhoff et al. |
| 7,167,923 B2 | 1/2007 | Lo |
| 7,170,405 B2 | 1/2007 | Daum et al. |
| 7,171,506 B2 | 1/2007 | Iwamura |
| 7,176,786 B2 | 2/2007 | Kline et al. |
| 7,180,412 B2 | 2/2007 | Bonicatto et al. |
| 7,181,023 B1 | 2/2007 | Andrews et al. |
| 7,183,902 B2 | 2/2007 | Hamburgen et al. |
| 7,187,695 B2 | 3/2007 | Binder |
| 7,187,946 B2 | 3/2007 | Palan |
| 7,190,716 B2 | 3/2007 | Norrell et al. |
| 7,193,149 B2 | 3/2007 | Polanek et al. |
| 7,194,251 B2 | 3/2007 | Rubinstein et al. |
| 7,194,528 B1 | 3/2007 | Davidow |
| 7,194,639 B2 | 3/2007 | Atkinson et al. |
| 7,198,521 B2 | 4/2007 | Hauck et al. |
| 7,199,699 B1 | 4/2007 | Gidge |
| 7,199,706 B2 | 4/2007 | Dawson et al. |
| 7,206,417 B2 | 4/2007 | Nathan |
| 7,207,846 B2 | 4/2007 | Caveney et al. |
| 7,209,497 B2 | 4/2007 | Weinstein et al. |
| 7,209,719 B2 | 4/2007 | Liebenow |
| 7,209,945 B2 | 4/2007 | Hicks, III et al. |
| 7,215,763 B1 | 5/2007 | Keller et al. |
| 7,224,272 B2 | 5/2007 | White, II et al. |
| 7,231,535 B2 | 6/2007 | Le Creff et al. |
| 7,239,627 B2 | 7/2007 | Nattkemper et al. |
| 7,239,628 B1 | 7/2007 | Pendleton et al. |
| 7,240,224 B1 | 7/2007 | Biederman |
| 7,242,729 B1 | 7/2007 | Heistermann et al. |
| 7,245,625 B2 | 7/2007 | Manis et al. |
| 7,247,793 B2 | 7/2007 | Hinkson et al. |
| 7,256,704 B2 | 8/2007 | Yoon et al. |
| 7,257,106 B2 | 8/2007 | Chen et al. |
| 7,257,108 B2 | 8/2007 | Cheston et al. |
| 7,263,362 B1 | 8/2007 | Young et al. |
| 7,265,664 B2 | 9/2007 | Berkman |
| 7,266,344 B2 | 9/2007 | Rodriguez |
| 7,274,669 B2 | 9/2007 | Czerwiec et al. |
| 7,275,255 B2 | 9/2007 | Suda et al. |
| 7,276,915 B1 | 10/2007 | Euler et al. |
| 7,280,032 B2 | 10/2007 | Aekins et al. |
| 7,283,554 B2 | 10/2007 | Ophir et al. |
| 7,292,859 B2 | 11/2007 | Park |
| 7,293,103 B1 | 11/2007 | Lin et al. |
| 7,295,518 B1 | 11/2007 | Monk et al. |
| 7,299,287 B1 | 11/2007 | Rubinstein et al. |
| 7,301,940 B1 | 11/2007 | Bernstein |
| 7,305,006 B1 | 12/2007 | Bella |
| 7,307,510 B2 | 12/2007 | Berkman |
| 7,308,086 B2 | 12/2007 | Yoshitani |
| 7,310,355 B1 | 12/2007 | Krein et al. |
| 7,319,717 B2 | 1/2008 | Zitting |
| 7,322,860 B2 | 1/2008 | Martich et al. |
| 7,323,968 B2 | 1/2008 | Iwamura |
| 7,324,488 B1 | 1/2008 | Rubinstein et al. |
| 7,324,824 B2 | 1/2008 | Smith et al. |
| 7,327,765 B1 | 2/2008 | Ojard |
| 7,330,695 B2 | 2/2008 | Karschnia et al. |
| 7,331,819 B2 | 2/2008 | Nelson et al. |
| 7,339,458 B2 | 3/2008 | Cern |
| 7,340,051 B2 | 3/2008 | Phillips et al. |
| 7,340,509 B2 | 3/2008 | Daum et al. |
| 7,343,506 B1 | 3/2008 | Fenwick |
| 7,345,998 B2 | 3/2008 | Cregg et al. |
| 7,346,071 B2 | 3/2008 | Bareis |
| 7,346,918 B2 | 3/2008 | Hennenhoefer et al. |
| 7,349,325 B2 | 3/2008 | Trzeciak et al. |
| 7,356,588 B2 | 4/2008 | Stineman, Jr. et al. |
| 7,359,392 B2 | 4/2008 | Bianchi et al. |
| 7,362,285 B2 | 4/2008 | Webb et al. |
| 7,375,445 B1 | 5/2008 | Smith |
| 7,382,786 B2 | 6/2008 | Chen et al. |
| 7,382,876 B2 | 6/2008 | Lauter et al. |
| 7,401,239 B2 | 7/2008 | Chan et al. |
| 7,406,094 B2 | 7/2008 | Propp et al. |
| 7,406,536 B2 | 7/2008 | Efrati et al. |
| 7,408,949 B2 | 8/2008 | Baum |

(56) References Cited

U.S. PATENT DOCUMENTS

| | | |
|---|---|---|
| 7,413,471 B2 | 8/2008 | Chan |
| 7,453,895 B2 | 11/2008 | Binder |
| 7,483,524 B2 | 1/2009 | Binder |
| 7,486,648 B1 | 2/2009 | Baranowski |
| 7,489,709 B2 | 2/2009 | Binder |
| 7,492,875 B2 | 2/2009 | Binder |
| 7,633,966 B2 | 12/2009 | Binder |
| 7,636,373 B2 * | 12/2009 | Binder .................... 370/463 |
| 7,653,033 B2 | 1/2010 | Beach et al. |
| 7,715,441 B2 | 5/2010 | Binder |
| 7,830,858 B2 | 11/2010 | Binder |
| 8,151,306 B2 | 4/2012 | Rakib |
| 2001/0036199 A1 | 11/2001 | Terry |
| 2001/0039660 A1 | 11/2001 | Vasilevsky et al. |
| 2001/0047418 A1 | 11/2001 | White |
| 2002/0006137 A1 | 1/2002 | Rabenko et al. |
| 2002/0011923 A1 | 1/2002 | Cunningham et al. |
| 2002/0019875 A1 | 2/2002 | Garrett et al. |
| 2002/0021465 A1 | 2/2002 | Moore, Jr. et al. |
| 2002/0022467 A1 | 2/2002 | Matsui |
| 2002/0024424 A1 | 2/2002 | Burns et al. |
| 2002/0031114 A1 | 3/2002 | Terry et al. |
| 2002/0034220 A1 | 3/2002 | Duxbury |
| 2002/0035624 A1 | 3/2002 | Kim |
| 2002/0037004 A1 | 3/2002 | Bossemeyer et al. |
| 2002/0038459 A1 | 3/2002 | Talmola et al. |
| 2002/0049036 A1 | 4/2002 | Bullock et al. |
| 2002/0056116 A1 | 5/2002 | Smith |
| 2002/0059634 A1 | 5/2002 | Terry et al. |
| 2002/0061012 A1 | 5/2002 | Thi et al. |
| 2002/0069417 A1 | 6/2002 | Kliger et al. |
| 2002/0075806 A1 | 6/2002 | Shalvi et al. |
| 2002/0080010 A1 | 6/2002 | Zhang |
| 2002/0095662 A1 | 7/2002 | Ashlock et al. |
| 2002/0097821 A1 | 7/2002 | Hebron et al. |
| 2002/0114325 A1 | 8/2002 | Dale et al. |
| 2002/0116720 A1 | 8/2002 | Terry et al. |
| 2002/0118676 A1 | 8/2002 | Tonnby et al. |
| 2002/0128009 A1 | 9/2002 | Boch et al. |
| 2002/0144159 A1 | 10/2002 | Wu et al. |
| 2002/0145509 A1 | 10/2002 | Karny et al. |
| 2002/0150100 A1 | 10/2002 | White et al. |
| 2002/0150155 A1 | 10/2002 | Florentin et al. |
| 2002/0154629 A1 | 10/2002 | Lohman et al. |
| 2002/0159512 A1 | 10/2002 | Matsumoto |
| 2002/0166124 A1 | 11/2002 | Gurantz et al. |
| 2002/0174423 A1 | 11/2002 | Fifield et al. |
| 2002/0176567 A1 | 11/2002 | Chen et al. |
| 2002/0194383 A1 | 12/2002 | Cohen et al. |
| 2002/0194605 A1 | 12/2002 | Cohen et al. |
| 2002/0198952 A1 | 12/2002 | Bell |
| 2003/0005450 A1 | 1/2003 | Smith |
| 2003/0006881 A1 | 1/2003 | Reyes |
| 2003/0016794 A1 | 1/2003 | Brothers |
| 2003/0018975 A1 | 1/2003 | Stone |
| 2003/0046377 A1 | 3/2003 | Daum et al. |
| 2003/0048895 A1 | 3/2003 | Kiko et al. |
| 2003/0066082 A1 | 4/2003 | Kliger et al. |
| 2003/0067910 A1 | 4/2003 | Razazian et al. |
| 2003/0088706 A1 | 5/2003 | Chan et al. |
| 2003/0090368 A1 | 5/2003 | Ide et al. |
| 2003/0099228 A1 | 5/2003 | Alcock |
| 2003/0100288 A1 | 5/2003 | Tomlinson, Jr. et al. |
| 2003/0100330 A1 | 5/2003 | Tomlinson, Jr. et al. |
| 2003/0103521 A1 | 6/2003 | Raphaeli et al. |
| 2003/0106067 A1 | 6/2003 | Hoskins et al. |
| 2003/0133473 A1 | 7/2003 | Manis et al. |
| 2003/0198246 A1 | 10/2003 | Lifshitz et al. |
| 2003/0198341 A1 | 10/2003 | Smith et al. |
| 2003/0224728 A1 | 12/2003 | Heinonen et al. |
| 2004/0006484 A1 | 1/2004 | Manis et al. |
| 2004/0032373 A1 | 2/2004 | Petros et al. |
| 2004/0037317 A1 | 2/2004 | Zalitzky et al. |
| 2004/0073597 A1 | 4/2004 | Caveney et al. |
| 2004/0077310 A1 | 4/2004 | Levy |
| 2004/0083262 A1 | 4/2004 | Trantow |
| 2004/0085976 A1 | 5/2004 | Dale et al. |
| 2004/0087214 A1 | 5/2004 | Cho |
| 2004/0090984 A1 | 5/2004 | Saint-Hilaire et al. |
| 2004/0105539 A1 | 6/2004 | Auzizeau et al. |
| 2004/0107299 A1 | 6/2004 | Lee et al. |
| 2004/0107445 A1 | 6/2004 | Amit |
| 2004/0123322 A1 | 6/2004 | Erkocevic et al. |
| 2004/0125870 A1 | 7/2004 | Yamazaki |
| 2004/0130413 A1 | 7/2004 | Mentz et al. |
| 2004/0136388 A1 | 7/2004 | Schaff |
| 2004/0156513 A1 | 8/2004 | Kaylor et al. |
| 2004/0158649 A1 | 8/2004 | Ophir et al. |
| 2004/0162117 A1 | 8/2004 | Liebenow |
| 2004/0172658 A1 | 9/2004 | Rakib et al. |
| 2004/0177167 A1 | 9/2004 | Iwamura et al. |
| 2004/0177381 A1 | 9/2004 | Kliger et al. |
| 2004/0178888 A1 | 9/2004 | Hales et al. |
| 2004/0187156 A1 | 9/2004 | Palm et al. |
| 2004/0192285 A1 | 9/2004 | Capobianco et al. |
| 2004/0198236 A1 | 10/2004 | Paine et al. |
| 2004/0203387 A1 | 10/2004 | Grannan |
| 2004/0204040 A1 | 10/2004 | Heijnen |
| 2004/0208167 A1 | 10/2004 | Kishida |
| 2004/0208599 A1 | 10/2004 | Swartz et al. |
| 2004/0235468 A1 | 11/2004 | Luebke et al. |
| 2004/0250273 A1 | 12/2004 | Swix et al. |
| 2004/0255332 A1 | 12/2004 | Bertonis et al. |
| 2004/0259538 A1 | 12/2004 | Agbegnenow |
| 2004/0268160 A1 | 12/2004 | Atkinson et al. |
| 2005/0015805 A1 | 1/2005 | Iwamura |
| 2005/0018648 A1 | 1/2005 | Scheelke |
| 2005/0018766 A1 | 1/2005 | Iwamura |
| 2005/0018857 A1 | 1/2005 | McCarty et al. |
| 2005/0025162 A1 | 2/2005 | Binder |
| 2005/0034159 A1 | 2/2005 | Ophir et al. |
| 2005/0038875 A1 | 2/2005 | Park |
| 2005/0047379 A1 | 3/2005 | Boyden et al. |
| 2005/0063403 A1 | 3/2005 | Binder |
| 2005/0073968 A1 | 4/2005 | Perlman |
| 2005/0076149 A1 | 4/2005 | McKown et al. |
| 2005/0076151 A1 | 4/2005 | Tapperson et al. |
| 2005/0076375 A1 | 4/2005 | Nakamura |
| 2005/0084004 A1 | 4/2005 | Bione |
| 2005/0086694 A1 | 4/2005 | Hicks et al. |
| 2005/0089061 A1 | 4/2005 | Logvinov et al. |
| 2005/0100043 A1 | 5/2005 | Binder |
| 2005/0114325 A1 | 5/2005 | Liu et al. |
| 2005/0136972 A1 | 6/2005 | Smith et al. |
| 2005/0144647 A1 | 6/2005 | Zussman et al. |
| 2005/0150100 A1 | 7/2005 | Merdan et al. |
| 2005/0152337 A1 | 7/2005 | Wurtzel et al. |
| 2005/0164666 A1 | 7/2005 | Lang et al. |
| 2005/0181839 A1 | 8/2005 | Tiainen et al. |
| 2005/0226200 A1 | 10/2005 | Askildsen et al. |
| 2005/0226206 A1 | 10/2005 | An |
| 2005/0232299 A1 | 10/2005 | Binder |
| 2005/0235333 A1 | 10/2005 | Bertonis et al. |
| 2005/0239400 A1 | 10/2005 | Narikawa |
| 2005/0249245 A1 | 11/2005 | Hazani et al. |
| 2005/0254516 A1 | 11/2005 | Binder |
| 2005/0259691 A1 | 11/2005 | Binder |
| 2005/0268322 A1 | 12/2005 | Watson |
| 2005/0277328 A1 * | 12/2005 | Binder .................... 439/540.1 |
| 2005/0280598 A1 | 12/2005 | Webb et al. |
| 2005/0289638 A1 | 12/2005 | Steading |
| 2006/0007945 A1 | 1/2006 | Schoettle et al. |
| 2006/0008039 A1 | 1/2006 | Segal et al. |
| 2006/0017324 A1 | 1/2006 | Pace et al. |
| 2006/0018328 A1 | 1/2006 | Mody et al. |
| 2006/0029210 A1 | 2/2006 | Feugere |
| 2006/0056444 A1 | 3/2006 | Binder |
| 2006/0062241 A1 | 3/2006 | Binder |
| 2006/0077970 A1 | 4/2006 | Binder |
| 2006/0092962 A1 | 5/2006 | Binder |
| 2006/0092967 A1 | 5/2006 | Bergeron et al. |
| 2006/0133465 A1 | 6/2006 | Dockemeyer, Jr. et al. |
| 2006/0140260 A1 | 6/2006 | Wasaki et al. |
| 2006/0152344 A1 | 7/2006 | Mowery |

(56) References Cited

U.S. PATENT DOCUMENTS

| | | |
|---|---|---|
| 2006/0153169 A1 | 7/2006 | Koifman et al. |
| 2006/0172781 A1 | 8/2006 | Mohebbi |
| 2006/0193310 A1 | 8/2006 | Landry et al. |
| 2006/0193313 A1 | 8/2006 | Landry et al. |
| 2006/0193336 A1 | 8/2006 | Landry et al. |
| 2006/0203981 A1 | 9/2006 | Binder |
| 2006/0210278 A1 | 9/2006 | Cregg et al. |
| 2006/0215680 A1 | 9/2006 | Camagna |
| 2006/0220833 A1 | 10/2006 | Berkman |
| 2006/0222086 A1 | 10/2006 | Frye, Jr. |
| 2006/0235333 A1 | 10/2006 | Couvillon |
| 2006/0238250 A1 | 10/2006 | Camagna et al. |
| 2006/0251086 A1 | 11/2006 | Ha et al. |
| 2006/0251094 A1 | 11/2006 | Van Vleck et al. |
| 2006/0251110 A1 | 11/2006 | Binder |
| 2006/0251159 A1 | 11/2006 | Huotari et al. |
| 2006/0251179 A1 | 11/2006 | Ghoshal |
| 2006/0274745 A1 | 12/2006 | Wang et al. |
| 2006/0280197 A1 | 12/2006 | Stone |
| 2006/0286958 A1 | 12/2006 | Lee et al. |
| 2006/0291493 A1 | 12/2006 | Schley-May et al. |
| 2006/0291497 A1 | 12/2006 | Binder |
| 2006/0291575 A1 | 12/2006 | Berkman et al. |
| 2007/0002772 A1 | 1/2007 | Berkman et al. |
| 2007/0002876 A1 | 1/2007 | Berkman et al. |
| 2007/0019669 A1 | 1/2007 | Binder |
| 2007/0019959 A1 | 1/2007 | Retnasothie et al. |
| 2007/0025368 A1 | 2/2007 | Ha et al. |
| 2007/0036171 A1 | 2/2007 | Magin |
| 2007/0041339 A1 | 2/2007 | Binder |
| 2007/0041340 A1 | 2/2007 | Binder |
| 2007/0047573 A1 | 3/2007 | Logvinov et al. |
| 2007/0054622 A1 | 3/2007 | Berkman |
| 2007/0058666 A1 | 3/2007 | Pratt |
| 2007/0082649 A1 | 4/2007 | Chan |
| 2007/0083668 A1 | 4/2007 | Kelsey et al. |
| 2007/0086444 A1 | 4/2007 | Binder |
| 2007/0091915 A1 | 4/2007 | Binder |
| 2007/0104168 A1 | 5/2007 | Polson |
| 2007/0112939 A1 | 5/2007 | Wilson et al. |
| 2007/0139188 A1 | 6/2007 | Ollis et al. |
| 2007/0147369 A1 | 6/2007 | Binder |
| 2007/0147433 A1 | 6/2007 | Binder |
| 2007/0167144 A1 | 7/2007 | Koga et al. |
| 2007/0177495 A1 | 8/2007 | Ametsitsi |
| 2007/0183447 A1 | 8/2007 | Binder |
| 2007/0195719 A1 | 8/2007 | Binder |
| 2007/0198748 A1 | 8/2007 | Ametsitsi et al. |
| 2007/0206629 A1 | 9/2007 | Choi |
| 2007/0213879 A1 | 9/2007 | Iwamura |
| 2007/0254714 A1 | 11/2007 | Martich et al. |
| 2007/0263652 A1 | 11/2007 | Binder |
| 2007/0268886 A1 | 11/2007 | Caspi et al. |
| 2008/0013612 A1 | 1/2008 | Miller et al. |
| 2008/0013637 A1 | 1/2008 | Kodama et al. |
| 2008/0025723 A1 | 1/2008 | Mayer et al. |
| 2008/0062013 A1 | 3/2008 | Face et al. |
| 2008/0117091 A1 | 5/2008 | Binder |
| 2008/0125187 A1 | 5/2008 | Chang et al. |
| 2008/0136915 A1 | 6/2008 | Iwamura |
| 2008/0140565 A1 | 6/2008 | Debenedetti et al. |
| 2008/0153415 A1 | 6/2008 | Block et al. |
| 2008/0165463 A1 | 7/2008 | Chan |
| 2008/0175256 A1 | 7/2008 | Binder |
| 2008/0186150 A1 | 8/2008 | Kao |
| 2008/0198777 A1 | 8/2008 | Binder |
| 2008/0205606 A1 | 8/2008 | Binder |
| 2008/0219288 A1 | 9/2008 | Binder |
| 2008/0226060 A1 | 9/2008 | Hazani |
| 2008/0227333 A1 | 9/2008 | Hazani |
| 2009/0046742 A1 | 2/2009 | Binder |

FOREIGN PATENT DOCUMENTS

| | | |
|---|---|---|
| EP | 0 798 923 B1 | 9/2000 |
| JP | 59215137 | 12/1984 |
| JP | 60139095 A | 7/1985 |
| JP | 62076343 | 4/1987 |
| JP | 08213941 | 8/1996 |
| JP | 10023029 | 1/1998 |
| JP | 11098113 A | 4/1999 |
| JP | 11136392 | 5/1999 |
| JP | 2001217757 A | 8/2001 |
| KR | 199822718 | 7/1998 |
| WO | 9623377 A1 | 8/1996 |
| WO | WO-96/23377 A1 | 8/1996 |
| WO | 9827748 A2 | 6/1998 |
| WO | 9831133 A2 | 7/1998 |
| WO | 9854901 | 12/1998 |
| WO | WO 99/25098 | 5/1999 |
| WO | WO 99/25098 A1 | 5/1999 |
| WO | 9935753 A2 | 7/1999 |
| WO | 0028689 A2 | 5/2000 |
| WO | 0180030 A1 | 10/2001 |
| WO | 0219623 A2 | 3/2002 |
| WO | WO 2004/068827 A1 | 8/2004 |
| WO | WO 2005/022692 A2 | 3/2005 |
| WO | 2006052216 A1 | 5/2006 |
| WO | 2007069241 A2 | 6/2007 |

OTHER PUBLICATIONS

Powerhouse Wireless Remote Controls: Apr. 5, 2008. (3 pages).
Powerhouse Wireless Wall Switches: Apr. 5, 2008 (3 pages).
JVC VIPSLAN-10 Infrared Wireless LAN system; May 1996. (10 pages).
JVC Introducing VISPLAN-10; Jan. 18, 2007. (2 pages).
JVC Satellite; Jan. 18, 2007 (2 pages).
JVC Node; Jan. 18, 2007 (2 pages).
JVC Station; Jan. 18, 2007 (2 pages).
JVC PC Card & Mobile; Jan. 18, 2007 (2 pages).
JVC Power Hub; Jan. 18, 2007 (1 page).
JVC T-Adapter; Jan. 18, 2007 (1 page).
J. Hofmann, Cable, Television, and the Consumer Electronic Bus, Symposium Record, 15th International TV Symposium, Jun. 11, 1987, Montreux, Switzerland (9 pages).
Lior Ophir; Yigal Bitran; "802.11 Over Coax—A Hybrid Coax—Wireless Home Network Using 802.11 Technology"; Texas Instruments, 2004, 6 pages.
Ascend DSLPipe-S Specifications; copyright 1997, (2 pages).
C. Valenti, "Study of the Feasibility and Advisability of Digital Subscriber Lines Operating at Rates Substantially in Excess of the Basic Access Rate", T1E1.R Technical Subcommittee (T1E1.4/91-115), pp. 2 and 4; Aug. 26, 1991.
J.W. Lechleider, "Study of the Feasibility and Advisability of Digital Subscriber Lines Operating at Rates Substantially in Excess of the Basic Access Rate", T1E1.4 Technical Subcommittee (T1E1.4/89-070), 1 page, Dec. 11, 1989.
"TeleConcepts . . . Introduces the Just Plug It in Intercom System,"TeleConcepts Brochure, Newington, CT, 2 pages, published before Jul. 3, 1995.
TeleVideo Brochure, 2 pages, published before Jul. 3, 1995.
"Video Transmission System—Send Video Over Ordinary Wire—No Coax Required", Javelin Brochure, 2 pages, published before Jul. 3, 1995.
Office Action dated Aug. 1, 2003: U.S. Appl. No. 09/552,564; 9 pages.
Office Action dated Jan. 28, 2004: U.S. Appl. No. 09/552,564; 9 pages.
Office Action dated Apr. 28, 2004: U.S. Appl. No. 09/552,564; 13 pages.
Office Action dated May 29, 2009: U.S. Appl. No. 11/121,075; 8 pages.
Office Action dated Dec. 23, 2008: U.S. Appl. No. 10/890,199; 11 pages.
Office Action dated Apr. 14, 2009: U.S. Appl. No. 10/890,199; 82 pages.

(56) References Cited

OTHER PUBLICATIONS

Office Action dated Dec. 24, 2008: U.S. Appl. No. 10/998,015; 12 pages.
Office Action dated Apr. 13, 2009: U.S. Appl. No. 10/998,015; 53 pages.
Office Action dated Dec. 29, 2008: U.S. Appl. No. 11/121,075; 10 pages.
Office Action dated Feb. 20, 2009: U.S. Appl. No. 11/128,229; 112 pages.
Office Action dated Dec. 30, 2008: U.S. Appl. No. 11/128,383; 11 pages.
Office Action dated Dec. 24, 2008: U.S. Appl. No. 11/605,336; 11 pages.
EIA-600.35 RF Physical Layer and Medium Specification; Revision: IS-60, Aug. 30, 1995 (17 pages).
EIA-600.37 Symbol Encoding Sublayer; Revision: Nov. 15, 1991; May 12, 1995 Draft Copy (30 pages).
EIA-600.38 Power Line / RF Symbol Encoding Sublayer; Revision Nov. 15, 1991; May 12, 1995 Draft Copy (64 pages).
EIA 600.81 Common Application Language (CAL) Specification; Revision SP3484 Rev Sep. 17, 1996 (126 pages).
EIA 600.82 CAL Context Description; Revision SP3485 Rev Feb. 2, 1996 (17 pages).
Draft IS-60.04 Node Communications Protocol Part 6: Application Layer Specification; Revision Apr. 18, 1996 Draft Copy (129 pages).
EIA 600.42 Node Medium Access Control Sublayer; Revision IS-60 Feb. 22, 1996 (54 pages).
EIA 600.41 Description of the Data Link Layer; Revision IS-60 Jan. 31, 1996 (60 pages).
Home Automation Buses: Protocols Really Hit Home; EDN Apr. 13, 1995 (9 pages).
Powerhouse Wireless Remote Controls; date unknown (3 pages).
Powerhouse Wireless Wall Switches; date unknown (3 pages).
EIA-600.10 Introduction to the CEBus Standard; revision Feb. 5, 1995 Draft Copy (19 pages).
Mark Nachman, Compaq to Ride the CEBus; EBN Jan. 22, 1996 (1 page).
CEBus Router Testing; IEEE Transactions on Consumer Electronics Nov. 1991, vol. 37, No. 4 (8 pages).
Peter Clegg, VIPSLAN-10 Streaks Off the Wire; LAN Times Dec. 18, 1995 (1 page).
VIPSLAN-10; Source LAN Magazine, Sep. 1995 (11 pages).
JVC Power Hub; date unknown (1 page).
JVC T-Adapter; date unknown (1 page).
Optical wireless Systems and Networks; IEEE Communications Dec. 1998 vol. 36, No. 12, p. 70-71 (4 pages).
GSM Over Ethernet; IEE Review Mar. 2002 (6 pages).
High Cost of Wiring Sparks Wireless LAN Alternatives; Computer Technology Review vol. XIV No. 3, Mar. 1994 (8 pages).
J. Hofmann, Cable, Television, and the Consumer Electronic Bus; date unknown (9 pages).
VISPLAN-10 Infrared Wireless LAN system; JVC May 1996 (10 pages).
'JVC introduces Ethernet compatible wireless LAN system'; Business Wire Sep. 26, 1995 (1 page).
Ethernet Wireless LAN Systems; BYTE Feb. 1996 (3 pages).
'JVC introduces first Ethernet compatible wireless LAN system'; Business Wire Nov. 8, 1995 (1 page).
Zeino, H.; Misson, M.; "Functional Approach to a Hybrid Wireless Network for Mobile Stations"; Personal, Indoor and Mobile Radio Communications, 1994. 5th IEEE International Symposium on Sep. 18-23, 1994; vol. 3, pp. 994-998.
Pahlavan, K.; Probert, T.H.; Chase, M.E.; "Trends in Local Wireless Networks"; Communications Magazine, IEEE, Issue: 3, Mar. 1995, vol. 33, pp. 88-95.
Dastangoo, S.; Eftekari, R.; Tran, H.;"Wireless LAN Technologies and Applications"; MILCOM '93. Conference record. IEEE vol. 2, pp. 497-501.

Lior Ophir; Yigal Bitran; "802.11 Over Coax—A Hybrid Coax—Wireless Home Network Using 802.11 Technology"; Texas Instruments, 6 pages.
Claim Chart presented in request for reexamination of U.S. Patent No. 6,480,510 request filed Jun. 10, 2009.
Claim Chart presented in request for reexamination of U.S. Patent No. 5,841,360 request filed May 26, 2009.
007414-007430 EIA-600.35 RF Physical Layer and Medium Specification; Revision: IS-60, Aug. 30, 1995 (17 pages).
007431-007460 EIA-600.37 Symbol Encoding Sublayer; Revision: May 12, 1995 Draft Copy (30 pages).
007461-007524 EIA-600.38 Power Line / RF Symbol Encoding Sublayer; Revision May 12, 1995 Draft Copy (64 pages).
007525-007650 EIA 600.81 Common Application Language (CAL) Specification; Revision SP3484 Rev Sep. 17, 1996 (126 pages).
007651-007667 EIA 600.82 CAL Context Description; Revision SP3485 Rev Feb. 2, 1996 (17 pages).
007668-007796 Draft IS-60.04 Node Communications Protocol Part 6: Application Layer Specification; Revision April 18, 1996 Draft Copy (129 pages).
007797-007850 EIA 600.42 Node Medium Access Control Sublayer; Revision IS-60 Feb. 22, 1996 (54 pages).
007851- 007910 EIA 600.41 Description of the Data Link Layer; Revision IS-60 Jan. 31, 1996 (60 pages).
007911-007919 Home Automation Buses: Protocols Really Hit Home; EDN Apr. 13, 1995 (9 pages).
007926-007944 EIA-600.10 Introduction to the CEBus Standard; revision Feb. 5, 1995 Draft Copy (19 pages).
007945 Compaq to Ride the CEBus; by Mark Nachman, EBN Jan. 22, 1996 (1 page).
008660-008667 CEBus Router Testing; IEEE Transactions on Consumer Electronics Nov. 1991, vol. 37 No. 4 (8 pages).
010724 VIPSLAN-10 Streaks Off the Wire; LAN Times Dec. 18, 1995 (1 page).
010809 JVC Power Hub; (1 page).
010810 JVC T-Adapter; (1 page).
010811-010814 Optical wireless Systems and Networks; IEEE Communications Dec. 1998 vol. 36, No. 12, p. 70-71 (4 pages).
012090- 012095 GSM Over Ethernet; IEE Review Mar. 2002 (6 pages).
012856-012863 High Cost of Wiring Sparks Wireless LAN Alternatives; Computer Technology Review vol. XIV, No. 3, Mar. 1994 (8 pages).
012864-012872 Cable, Television, and the Consumer Electronic Bus; by J. Hofmann, date unknown (9 pages).
015124-015133 VISPLAN-10 Infrared Wireless LAN system; JVC May 1996 (10 pages).
015134 'JVC introduces Ethernet compatible wireless LAN system'; Business Wire Sep. 26, 1995 (1 page).
015135-015137 Ethernet Wireless LAN Systems; BYTE Feb. 1996 (3 pages).
015138 'JVC introduces first Ethernet compatible wireless LAN system'; Business Wire Nov. 8, 1995 (1 page).
Office Action from the Korean Patent Office dated Feb. 2, 2007 for application No. KR-10-2002-7014029.
Office Action from the Korean Patent Office dated Jul. 10, 2008 for application No. KR-10-2008-7006206.
Strassberg, Dan; "Home Automation Buses: Protocols Really Hit Home"; EDN Design Feature, Apr. 13, 1995 (9 pages).
Hachman, Mark; "Compaq to Ride the CEBus"; EBN Jan. 22, 1996 (1 page).
Hoffman, J.; "Cable, Television, and the Consumer Electronic Bus"; Panasonic Technologies. Inc., pp. 165-173.
Grayson Evans, The CEBUs Standard User's Guide, 1st edition, May 1996, 317 pages.
IS-60.04; Node Communications Protocol Part 6: Application Layer Specification; Revision Apr. 18, 1996 (129 pages).
Markwalter, Brain et al; "CEBus Router Testing"; IEEE Transactions on Consumer Electronics Nov. 1991, vol. 37 No. 4 (8 pages).
"The DSL Sourcebook", Paradyne Corporation, Copyright 2000, DSL-BOOK-3.0/0900, 98 pages.
Olshansky, "A Full Service Network for the Copper Plant", Telephony, 1985, pp. 52-60.

(56) References Cited

OTHER PUBLICATIONS

Instant Network Rules on Phone Lines, Electronic Design, 1987.
O. Agazzi, et al., "Large Scale Integration of Hybrid-Method Digital Subscriber Loops," IEEE Transactions on Communications, vol. COM-30, No. 9, Sep. 1982, pp. 2095-2108.
S.V. Ahamed, et al., "A tutorial on Two-Wire Digital Transmission in the Loop Plant", IEEE Transactions on Communications, vol. COM-29, No. 11, Nov. 1991, pp. 1554-1664.
J. Alves, "Data Over Voice—A Low Cost LAN Alternative", Communications Show and Conference, MECOM 87, January, pp. 13-15.
S.B. Andrews, "The Generic Digital Channel Concept", IEEE International Conference on Communications, 1985, Jun. 23-26, 1985, Chicago, IL, pp. 7.1.1-7.1.3.
G.W. Beene, "Design Considerations for a CO-Powered Distributed-Drop PCM Station Carrier", IEEE Transactions on Communications, vol. COM-30, No. 9, Sep. 1982, pp. 2022-2028.
A. Bienz, "1+1=1—Order Das Telefonnetz Als Datennetz", Sysdata, vol. 16, Aug. 28, 1985, pp. 41-42.
A. Brosio, et al., "A Comparison of Digital Subscriber Line Transmission Systems Employing Different Line Codes", IEEE Transactions on Communications, vol. COM-29, No. 11, Nov. 1981, pp. 1581-1588.
T.P. Byrne, et al., "Positioning the Subscriber Loop Network for Digital Services", IEEE Transactions on Communications, vol. COM-30, No. 9, Sep. 1982, pp. 2006-2011.
R.G. Cornell, et al., "Progress Towards Digital Subscriber Line Services and Signaling", IEEE Transactions on Communications, vol. COM-29, No. 11, Nov. 1981, pp. 1589-1594.
S. Davis, "Integrating Voice and Data: A Marriage of Convenience", Today's Office, vol. 24, No. 9, Feb. 1990, pp. 28-30.
M. Devault et al., "Resaux Domestques et Terminaux Audiovisuels Numerques", L'Echo Des Recheches, No. 126, 1986, pp. 37-46.
H. Fuchs, et al., "Providing Full Duplex Transmission Over Two-Wire Subscriber Loops", Telephony, vol. 208, No. 11, Mar. 18 1985, pp. 76, 77, 78 and 84.
H. Fukagawa, et al., "Bus Wiring System for Residences", Matsushita Electric Works Technical Report, No. 36, Feb. 1988, pp. 31-35. 1-1.
D. Glick, et al., "Providing Telco Customers Continuous Data Services", Telephony, vol. 205, No. 22, Nov. 1983, pp. 46, 50, 51, 54.
J.B. Hughes, et al., "A Receiver IC for a 1+1 Digital Subscriber Loop", IEEE Journal of Solid State Circuitry, vol. S.C. 20, No. 3, Jun. 1985 pp. 671-678.
R. Jelski, "Subscriber Subcarrier System—A New Life," Communications International, vol. 4, No. 5, May 1977, pp. 29-30.
A.J. Karia, et al., "A Digital Subscriber Carrier System for the Evolving Subscriber Loop Network", IEEE Transactions on Communications, vol. COM-30, No. 9, Sep. 1982, pp. 2012, 2014, 2015.
T. Masuda, et al., "2-Wire Video Intercom System with Telephone", National Technical Report, vol. 37, No. 6, Dec. 1991, pp. 74-80.
T. Matthews, "Telecomm System is Nerve Center", Infosystems, vol. 31, No. 5, May 1984, pp. 68-69.
J. K. Merrow, "A New Approach to Integrating Local Area Data and Voice Transmission," Telephony, vol. 250, No. 17, Oct. 1983, 2 pages.
H. Morgan, "Two-Wire Full-Duplex Modem Simplifies Voice and Data Networking", Mini-Micro Systems, vol. 17, No. 3, Mar. 1984, 4 pages.
R. Murakoshi, "Home Automation", Journal of the Society of Instrument and Control Engineers, vol. 23, No. 11, Nov. 1984, pp. 955-958.
R.D. Nash, et al., "Simultaneous Transmission of Speech and Data Over an Analog Telephone Channel", GLOBECOM '85. IEEE Global Telecommunications Conference. Conference Record. Communication Technology to Provide New Services, Dec. 25, 1985, New Orleans, Louisiana, pp. 4.2.1-4.2.4.
H. Ogiwara, et al., Design Philosophy and Hardware Implementation for Digital Subscriber Loops, IEEE Transactions on Communications, vol. COM-30, No. 9, Sep. 1982, pp. 2057-2065.

J.L. Pernin, "Related Evolution of Subscriber Loop Plant and Residential Data Transmission Needs", Intelcon 79 Exposition Proceedings, Feb. 26-Mar. 2, 1979, Dallas, Texas, pp. 596-599.
R.A. Tatum, "Project Victoria—the 7-in-1 Solution", Telephone Engineer and Management, vol. 90, No. 1, Jan. 1, 1986, pp. 47 and 50.
A. Teshima, et al., "Still Video Telecommunication Over the Analog Telephone Network", Journal of the Institute of Television Engineers of Japan, vol. 42, No. 11, Nov. 1988, pp. 1162-1167.
S.R. Treves, et al., "Text. Image and Data Integration in a Distributed Control Digital Voice Switching System", International Switching Symposium—ISS '81 CIC, Sep. 21-25, 1981, Montreal, Quebec, Canada, pp. 1-7.
T. Tsuda, et al., "Experimental In-House Multiservice Communication System", Fujitsu Scientific and Technical Journal, vol. 16, No. 3, Sep. 1980, pp. 29-45.
K. Urui, "Integrated Voice/Data Digital EPBX", Toshiba Review, No. 150, Winter 1984, pp. 30-33.
A.F. Van Den Berg, et al., "Principles van de Modem: Technieken en Specificaties", Elektronica, vol. 32, No. 5, Mar. 9, 1984, pp. 11, 13, 15, 17, 19 and 21.
M.G. Vry, et al., "Digital 1+1 Systems for Local Network Enhancement", Conference on Communications Equipment and Systems, Apr. 20-22, 1982, Birmingham, United Kingdom, pp. 61-64.
M.G. Vry, et al., "The Design of a 1+1 System for Digital Signal Transmission to the Subscriber", NTG-Bachberichte, vol. 73, 1980, pp. 36-40.
J.A. Webb, "A New Concept in Data-Above-Voice (DAV)", PTC '86: Evolutions of the Digital Pacific. Telecommunications—Asia, Americas, Pacific: PTC '86 Proceedings, Jan. 12-15, 1986, Honolulu, Hawaii, pp. 260-265.
K. Yamamoto, "A Home Terminal System Using the Home Area Information Network", IEEE Transactions on Consumer Electronics, vol. CE-30, No. 4, Nov. 1984, pp. 608-616.
"Centrex LAN Can Provide Advanced Network Capabilities Over the Existing Telephone Wires", Communications News, vol. 25, No. 6, Jun. 1988, p. 27.
"Data Over Voice is Solution for Corporate Network", Telephone Engineer and Management, vol. 91, No. 9, May 1, 1987, pp. 67-69.
"Data Carrier System Allows Simultaneous Voice/Data Transmission for PABX Telephone Systems", Computer Design, vol. 21, No. 5, May 1982, pp. 68 and 70.
"Computerized Telephone System Integrates Voice and Data Switching", Computer Design, vol. 20, No. 4, Apr. 1981, 6 pages.
"AT&T's Systemax Premises Distribution System Solves Networking Problems", Fiber Optics Magazine, vol. 12, No. 4, Jul.-Aug. 1990, pp. 14-16.
M.M. Anderson, "Video Services on Copper", Conference: ICC 91, International Conference on Communications Conference Record, Jun. 2-26, 1991, Denver, CO, pp. 302-306.
M. Bastian, "Voice-Data Integration: An Architecture Perspective," IEEE Communications Magazine, vol. 24, No. 7, Jul. 1986, pp. 8-12.
M. Boubekker, "Bandwidth Reduction for the Transmission of Sign Language Over Telephone Lines", Proceedings of the SPIE-The International Society for Optical Engineering, vol. 1001, Part. 1, 1988, pp. 223-230.
S. Bramblett, "Connect Terminals to Your CPU Over PBX Telephone Lines", EDN, vol. 31, No. 5, Mar. 6, 1986, pp. 239-243, 245, 246 and 248.
G.D. Carse, "New and Future Technologies in the Local Telephone Network: The Victoria System", Conference: IEEE International Conference on Communications '86, ICC '86: Integrating the World Through Communications Conference Record, Jun. 22-25, 1986, Toronto, Ontario, Canada, pp. 410-412.
C. Dougligeris, et al., "Communications and Control for a Home Automation System", Conference: IEEE Proceedings of the Southeastcon '91, vol. 1, pp. 171-175.
D.G.J. Fanshavve, "Architures for Home Systems", Conference: IEEE Colloquium on Home Systems—Information, Entertainment and Control, Oct. 1, 1990, London, United Kingdom, pp. 3/1-3/3.
N.C. Hightower, "Integrated Voice, Data and Video in the Local Loop", IEEE 1986, pp. 915-919.
M. Inoue, et al., "A Home Automation System", IEEE Transactions on Consumer Electronics, vol. CE-31, No. 3, Aug. 1985, pp. 516-527.

(56) References Cited

OTHER PUBLICATIONS

J.W. Lechleider, "Study of the Feasibility and Advisability of Digital Subscriber Lines Operating at Rates Substantially in Excess of the Basic Access Rate", T1E1.4 Technical Subcommittee (T1E1.4/89-070), 1 page.
S. Motoyama, et al., "A Subscriber Loop Multiplexing System for Integrated Service Digital Networks", Conference: NTC '81, IEEE 1981 National Telecommunications Conference, Innovative Telecommunications-Key to the Future, Nov. 29-Dec. 3, 1981, New Orleans, Louisiana, pp. D5.1.1-D5.1.5.
G. Neumann, Flexible and Cost-Minimising System Concept (Ericsson Digital PABX MD 110), NET Nechrichten Elektronik-Telematik, Special Issue, Mar. 1988, pp. 11, 12, 14 and 15.
H. Nishi, et al., "Control of a Star/Bus Key Telephone System", NTT R & D, vol. 39, No. 8, 1990, pp. 122, 1222, 1224-1228.
A. Pietrasik, et al., "Subscriber Carrier Telephony System 1+1", Wiadomosci Telekomunikacyjne, vol. 17, No. 7-8, Jul.-Aug. 1977, pp. 183-198.
V. Punj, "Broadband Applications and Services of Public Switched Networks", IEEE Transactions on Consumer Electronics, vol. 35, No. 2, May 1989, pp. 106-112.
T. Sodeyama, et al., "Intelligent House", Journal of the Institute of Electronics, Information and Communication Engineers, vol. 72, No. 9, Sep. 1989, pp. 1024-1026.
H. Tanaka, et al., "Telecontrol System VJ-501", National Technical Report, vol. 32, No. 6, Dec. 1986, pp. 809-817.
C. Valenti, "Study of the Feasibility and Advisability of Digital Subscriber Lines Operating at Rates Substantially in Excess of the Basic Access Rate", T1E1.R Technical Subcommifte (T1E1.4/91-115), pp. 2 and 4.
D. L. Waring, "The Asymmetrical Digital Subscriber Line (ADSL): A New Transport Technology for Delivering Wideband Capabilities to the Residence", Globecom '91, IEEE, pp. 1979-1986.
K. Yamamoto, et al., "New Home Telephone System Using Japanese Home Bus System Standard," IEEE Transactions on Consumer Electronics, vol. 35, No. 3, Aug. 1989, pp. 687-697.
T. Yamazakii, et al., "Home Appliance Technologies," NEC Research and Development. No. 96, Mar. 1990, pp. 292-299.
Funkschau, "CEBus: US Households are Being Networked", No. 9, Apr. 1989, pp. 45-47.
"Shared Services (Data/Voice Network)", Communications News, vol. 25, No. 11, Nov. 1988, pp. 46-47.
Freeman, "Telecommunication Transmission Handbook", 2.sup.nd Ed., Cover, 1981, pp. xi-xxvii, Chapter 3 (pp. 79-127), Chapter 5 (pp. 172-252), Chapter 6 (pp. 253-288).
A. Artom, et al., "The Possible Use of Customer Loop for New Services During the Transition From Analogue to Digital", Revue F.I.T.C.E., Mar.-Apr. 1981, vol. 20, No. 2, pp. 50-56.
A. Artom, et al., "Medium-Term Prospects for New Servies to the Telephone Customers," Conference Record, Jun. 14-18, 1981, Int'l Conf. on Communications, Denver, CO., pp. 14.4.1-14.4-6.
Hoe-Young Noh, "Home Automation", Korea Information Science Society Review, Apr. 1989, vol. 7 No. 2, pp. 40-44, Republic of Korea. (Translation Provided).
M. Coronaro, et al., "Integrated Office Communication System," Electrical Communication, 1986, pp. 17-22. vol. 60, No. 1, FACE Research Center, Pomezia, Italy.
Chow et al., "A Multi-drop In-House ADSL Distribution Network"; IEEE 1994, pp. 456-460.
English Language Abstract for Japanese Patent 1-27358 (64-27358) Jan. 30, 1989.
Bellcore: Request for Information; Asymmetrical Digital Subscriber Line (ADSL) Systems That Support Simplex High-Bit-Rate Access and POTS in the Copper Loop Plant; Jun. 1991.
Twisted Pair Physical Layer and Medium Specification; Revision: IS-60 8-18-95 (49 pages).
Introduction to the CEBus Standard; Revision Feb. 5, 1995 Draft Copy (19 pages).
Compaq to Ride the CEBus; by Mark Hachman, EBN Jan. 22, 1996 (1 page).
CEBus Router Testing; IEEE Transactions on Consumer Electronics Nov. 1991, vol. 37 No. 4 (8 pages).
Broadband Network Technology—An Overview for the Data and Telecommunications Industries; by Edward Cooper, Copyright 1984, p. 51-52 (4 pages).
Technical Report TR-001 ADSL Forum System Reference Model; May 1996 (6 pages).
DSLPipe User's Guide; by Ascend Communications, Jun. 3, 1997 (245 pages).
DSLPipe Reference Guide; by Ascend Communications, Jun. 2, 1997 (162 pages).
Ascend DSLPipe-S Features; Posted May 12, 1997 (2 pages).
Broadband Digital Subscriber Line—A Full Service Network for the Copper Plant; Telephony / Jun. 12, 1995, vol. 228 No. 24 (8 pages).
Commtek Intros Video over UTP; Communications Week, Feb. 10, 1992 (3 pages).
Aurelio Amodei, et al., "Increasing the Throughput of the HomePNA MAC Protocol, IEEE, Proceedings of the 29th Annual IEEE International Conference on Local Computer Networks (LCN '04), 8 Pages", Nov. 1, 2004, 8 pages.
"Home Phoneline Networking Alliance", Interface Specification for HomePNA 2.0 10M8 Technology Link Layer Protocol, (Dec. 1, 1999), pp. 1-39.
"Home Phoneline Networking Alliance", Interface Specification for HomePNA 2.0 10M8 Technology, (Dec. 1, 1999), pp. 1-77.
Paola Bisaglia, et al., Receiver Architectures for HomePNA 2.0, Hewlett Packard Laboratories, Bristol, U.K., Oct. 17, 2001.
Loh, L; Ozturk, Y.; Quality of Support and Priority Management in HomePNA 2.0 Link Layer.quadrature . . . quadrature. Computers and Communication; Jun. 30-Jul. 3, 2003. (ISCC 2003). Proceedings. Eighth IEEE International Symposium; pp. 861-866 vol. 2.
Phoneline / HPNA / HomePNA Networks, http://www.homenethelp.com/web/howto/HomeNet-HPNA.asp (visited Jul. 29, 2003) (3 pages).
Anonymous, HomePNA Specification 1.0 Field Tests Status, Mar. 1999, Home Phoneline Networking Alliance, Inc, pp. 1-6.
21145 Phoneline/Ethernet LAN Controller, Intel Corporation .COPYRGT. 1999, http://developer.intel.com/design/network/21145.htm.
Simple, High-Speed Ethernet Technology for the Home, White Paper, Home Phoneline Networking Alliance, Jun. 1998, pp. 1-11.
Information on Home PhoneLine Networking Alliance (Home PNA), dated Jun. 1998 and before.
Korean Patent Publication 2000-152, Jan. 2000, Home Network System Co.Ltd.
Evans, Grayson, *CEBus-Standard User's Guide: A Complete Technical Overview*, May 1996, Chapters 1, 2, and 4-6; pp. 1-1 to 2-13, 4-1 to 7-89.
Evans, Grayson, *CEBus Standard User's Guide: A Complete Technical Overview*, May 1996, pp. 1-2, 1-3, 2-3, 2-7, 2-8, 2-9, 4-1, 4-2, 5-7, 6-8, 6-9, 6-14 to 6-25, 6-41, 6-42, 6-57 to 6-60, 6-65 to 6-68, 7-38, 7-51 to 7-54.
Dastangoo, S. et al., "Wireless LAN Technologies and Applications", MILCOM 1993, Conference Record, IEEE, vol. 2, pp. 497-501.
Kelly, J.C. et al., "Power Line Based LAN Applications in Residential Communication and Control", Wireless LAN Implementation, IEEE Conference on Sep. 17-18, 1992, pp. 38-41.
Newbury, J. et al., "Potential Communication Services Using Power Line Carriers and Broadband Integrated Services Digital Network", IEEE Transactions on Oct. 1999, vol. 14, pp. 1197-1201.
Okazaki, H. et al., "A Transmitting and Receiving Method for CDMA Communications Over Indoor Electrical Power Lines", International Symposium on May 31, 1998-Jun. 3, 1998, vol. 6, pp. 522-528.
Pahlavan, K. et al., "Trends in Local Wireless Networks", Communications Magazine, IEEE, Issue 3, Mar. 1995, vol. 33, pp. 88-95.
Sado, W.N. et al., "Personal Communication on Residential Power Lines—Assessment of Channel Parameters", Fourth IEEE International Conference on Nov. 6-10, 1995, pp. 532-537.
Yi-Fu, Chen et al., "A 100-kbps Power-Line Modem for Household Applications", International Symposium on Jun. 8-10, 1999, pp. 179-182.

(56) References Cited

OTHER PUBLICATIONS

Yi-Fu, Chen et al., "Baseband Transceiver Design of a 128-kbps Power-Line Modem for Household Applications", IEEE Transactions, Issue 2, Apr. 2002, vol. 17, pp. 338-344.
Zeino, H. et al., "Functional Approach to a Hybrid Wireless Network fro Mobile Stations", Personal, Indoor and Mobile Radio Communications, Fifth IEEE International Symposium on Sep. 18-23, 1994, vol. 3, pp. 994-998.
U.S. ITC Complaint in the matter of Certain Equipment for Communications Networks, Including Switches, Routers, Gateways, Bridges, Wireless Access Points, Cable Modems, IP Phones, and Products Containing Same, May 13, 2011.
"Air Connect Access Point User Guide, Version 1.0", 1-90, Jan. 1, 2000.
Drudy, Francis, "Considerations and Recommendations on Power Feeding At an 802.9", IEEE 802.9—IVD LAN Interface Working Group, Reference IEEE 802.87*9.618, 1-6, Nov. 5, 1987.
Bell, Robert, "IEEE P802.9F Draft Standard for Local and Metropolitan Area Networks—Supplement to Integrated Services (IS) LAN Interface At the Medium Access Control (MAC) and Physical (PHY) Layers", 1-22, Nov. 7, 1996.
Bell, Robert, "IEEE Standards Project, P802.9F Draft Standard for Local and Metropolitan Area Netoworks—Supplement to Integrated Services (IS) LAN Interface At the Medium Access Control (MAC) and Physical (PHY) Layers", 1-34, Jul. 8, 1997.
"IEEE 802.9, IEEE Standards for Local and Metropolitan Area Networks: Integrated Services (IS) LAN Interface At the Medium Access Control (MAC) and Physical (PHY) Layers, IEEE Standard 802.9", 1-437, Sep. 22, 1994.
"IEEE 802.9A, IEEE Standards for Local and Metropolitan Area Networks: Supplement to Integrated Services (IS) LAN Interface At the Medium Access Control (MAC) and Physical (PHY) Layers: Specification of ISLAN16-T", 1-344, Oct. 16, 1995.
-, "Cisco Systems, Inc., Cisco Consumer Products LLC, Scientific-Atlanta LLD, and Cisco Systems International B.V.'S Response to Complaint of Mosaid Technologies Inc., Response to Complaint", Investigation No. 337-TA-778, 1-72, Jul. 21, 2011.
Japanese Office Action in application No. 2001-576670, drafted May 11, 2011.
Platt, Richard, "New Standard Helps Multimedia Get Off the Ground", IEEE Multimedia, vol. 3, Issue 2, Summer 1996, 78-82.
Ross, Floyd E. et al, "IsoEthernet: An Integrated Services LAN", IEEE Communications, vol. 34, Issue 8, Aug. 1996, 74, 79-84.
Matsuda, Jun-Ichi et al, "IEEE 1394 S200 Infrared Wireless Adapter", International Conference on Consumer Electronics, 1999, 288-289.
Negus, Kevin J. et al, "HomeRF and SWAP: Wireless Networking for the Connected Home", Mobile Computing and Communications Review, vol. 2, No. 4, Oct. 1998, 28-37.
Ramanathan, Srinivas et al, "A Home Network Controller for Providing Broadband Access to Residential Subscribers", IEEE Transactions on Consumer Electronics, vol. 41, No. 3, Aug. 1995, 859-868.
"2Wire's DSL Residential Gateway to Offer High-Speed Wireless In-Home Services Using Proxim's HomeRF Cordless Networking Products", 1-2, Jan. 6, 2000.
"Cayman Systems and Proxim Combining Wireless LAN with ADSL Modem/Gateway to Enable Low Cost, Broadband Internet Access for Multiple PC Homes", 1-2, May 10, 1999.
Krasne, Alexandra, "Xircom Announces Wireless Networking for Handspring", 1-2, Jan. 5, 2000.
"Elisa Communications and Nokia Bring Wireless High-Speed DSL Internet Access to Greater Helsinki, Finland", Nokia Networks, 1 page, Apr. 12, 2000.
"Nokia MW1112 and MW1122: Wireless Delivery of DSL-capacity Internet Connections Within the Home", Nokia Networks, 2 pages, May 9, 2000.
"Nokia Introduces a New ADSL Terminal Providing Wireless LAN Connectivity for Homes and Small Offices", 1 page, Sep. 21, 1999.

American National Standards Insititute, Inc., "Network and Customer Installation Interfaces—Asymmetric Digital Subscriber Line (ADSL) Metallic Interface", 1999, 1-264.
"IEEE 802.3, Carrier Sense Multiple Access with Collision Detection (CSMA/CD) Access Method and Physical Layer Specifications", IEEE Standard for Information Technology—Telecommunications and Information Exchange Between Systems—Local and Metropolitan Area Networks—Specific Requirements—Part 3, 1985, 146 pages.
"IEEE 802.3ab, Supplement to Carrier Sense Multiple Access with Collision Detection (CSMA/CD) Access Method and Physical Layer Specifications—Physical Layer Parameters and Specifications for 1000 Mb/s Operation Over 4-Pair of Category 5 Balanced Copper Cabling, Type 1000Base-T" Information Technology—Telecommunications and Information Exchange Between Systems—Local and Metropolitan Area Networks—Specific Requirements, 1999 , 140 pages.
"IEEE 802.11, Part II: Wireless LAN Medium Access Control (MAC) and Physical Layer (PHY) Specifications", Information Technology—Telecommunications and Information Exchange Between Systems—Local and Metropolitan Area Networks—Specific Requirements, 1997, 465 pages.
"TIA/EIA TSB-110, Residential Gateway", Dec. 1999, 22 pages.
Waring, David L. et al, "A newly Emerging Customer Premises Paradigm for Delivery of Network-Based Services", Computer Networks, vol. 31, Num. 4, 411-424, Feb. 25, 1999.
Miki, Tetsuya, "Toward the Service-Rich Era", IEEE Communications Magazine, Feb. 1994, pp. 34-39.
Mochida, Yukou, "Technologies for Local-Access Fibering", IEEE Communications Magazine, Feb. 1994, 64-73.
Cook, Andy et al, "Optical Fiber Access—Perspectives Toward the 21st Century", IEEE Communications Magazine, Feb. 1994, 78-86.
"NETBuilder II Inteligent Routers", 3Com NETBuilder Datasheet, Jun. 1998, 1-8.
"Highly-Integrated ISA Ethernet Controller", Dec. 1995, 1-132.
Stallings, William, Local Networks (Third Edition), 1990, 1-534.
International Telecommunication Union, "ISDN User-Network Interface Data Link Layer—General Aspects", CCITT, Q.920, Nov. 1988, 20 pages.
International Telecommunication Union, "ISDN User-Network Interface Data Link Layer Specification"CCITT, Q.921, Nov. 1988, 118 pages.
International Telecommunication Union, "ISDN User-Network Interfaces—Reference Configurations", I.411, Mar. 1993, 11 pages.
International Telecommunication Union, "ISDN User-Network Interfaces—Interface Structures and Access Capabilities", I.412, 1988, 7 pages.
International Telecommunication Union. "ISDN User-Network Interfaces—Basic User-Network interface—Layer 1 Specification", I.430, Mar. 1993, 106 pages.
International Telecommunication Union, "ISDN User-Network Interfaces—Primary Rate User-Network Interface—Layer 1 Specification", I.431, Mar. 1993, 44 pages.
"IEEE 802.1D, IEEE International Standard: Information Technology-Telecommunications and Information Exchange Between Systems—Local Area Networks—Media Access Control (MAC) Bridges", 181 pages, Jul. 8, 1993.
"IEEE 802.9, IEEE Standards for Local and Metropolitan Area Networks: Integrated Services (IS) Lan Interface At the Medium Access Control (MAC) and Physical (PHY) Layers, IEEE Standard 802.9", 1994, 437 pages.
"IEEE 802.9A, IEEE Standards for Local and Metropolitan Area Networks: Supplement to Integrated Services (IS) Lan Interface At the Medium Access Control (MAC) and Physical (PHY) Layers: Specification of ISLAN16-T", 344 pages, Feb. 16, 1996.
Droms, R., "Dynamic Host Configuration Protocol (DCHCP) Request for Comments 1531", Bucknell University, Oct. 1993, 1-40.
Wimer, W., "Clarifications and Extensions for the Bootstrap Protocol, Request for Comments 1542", Carnegie Mellon University, Oct. 1993, 1-23.
Shimizu, Hiroshi et al, "IVDLAN Standardization and Development", IEICE Transactions on Communications, vol. E74-B, No. 9, Sep. 1991, 2696-2702.

(56) References Cited

OTHER PUBLICATIONS

Amada, Eiichi et al, "An Integrated PABX/LAN System Architecture", Communications, 1988, ICC '88, Digital Technology—Spanning the Universerse, Conference Record, IEEE International Conference, vol. 3., Jun. 1988, 1533-1538.
"HiGain Remote Unit, Engineering Services Technical Practice Section 150-412-181-01, Revision 01", 42 pages, Mar. 31, 1998.
"ASCEND Pipeline 25 ISDN Remote Lan Access, Bandwidth on Demand, Getting Started Guide", 111 pages, Aug. 18, 1995.
"AT and T Practice, SLC 24 and 96 Carrier Systems, Channel Unit Installation, Loop Transmission Systems", Select Code 363-202-402, Issue 2, Jul. 1985, 335 pages.
"AT and T Practice, SLC 96 Carrier System, Maintenance Pair Gain System". Select Code 363-202-500, Issue 1, Aug. 1983, 497 pages.
"AT and T Practice, SLC 96 Subscriber Loop Carrier System, Remote Terminal Pair Gain Systems", Select Code 363-202-401, Issue 1, Feb. 1982, 506 pages.
Cervenka, Dana, "Building Cablephone Systems Piece by Piece", CED: Communications Engineering and Design, 6 pages, Mar. 1, 1996.
"Quick Installation and Reference for the Model RPSU Redundant Power Supply Unit", Bay Networks, Sep. 1995, 1-15.
Platt, Richard, "Why IsoEthernet Will Change the Voice and Video Worlds", IEEE Communications Magazine, vol. 34, Issue 4, Apr. 1996, 55-59.
Fausti, A. et al, "Remote Powered Data Transmission System, Telecommunications Energy Conference", INTELEC '89, Conference Proceedings, Eleventh International, vol. 2, Oct. 1989, 1-5.
United States International Trade Commission, Order No. 21: Construing the Terms of the Asserted Claims of the Patents at Issue (Public Version); In the Matter of Certain Equipment for Communications Networks, Including Switches, Routers, Gateways, Bridges, Wireless Access Points, Cable Modems, IP Phones, and Products Containing Same; ITC Investigation No. 337-TA-778, 148 pages, Feb. 14, 2012.
"IEEE 802.11a, Part II: Wireless LAN Medium Access Control (MAC) and Physical Layer (PHY) Specifications: High Speed Physical Layer in the 5 GHz Band", Supplement to IEEE Standard for Information Technology—Telecommunications and Information Exchange Between Systems—Local and Metropolitan Area Networks—Specific Requirements, Sep. 1999, pp. 1-91.
Zakowski, Wayne A., "IEEE 802.9 Draft Standard Integrated Services (IS) LAN Interface at the MAC and PHY Layers (IEEE Unapproved Draft)", 1-502, Nov. 8, 1992.
"IEEE P802.9af, Draft Standard for Local and Metropolitan Area Networks—Supplement to Integrated Services (IS) LAN Interface at the Medium Access Control (MAC) and Physical (PHY) Layers", 1997, 1-34.
"ISO/IEC JTC 1/SC 25/WG 1, xTR 15045-1: Information Technology Architecture for Residential Gateways", 1-35, Dec. 30, 1999.
"ISO/IEC JTC 1/SC 25/WG 1, Information Technology—Interconnection of Information Technology Equipment—Architecture for HomeGate, the Residential Gateway (AHRG)", CD1 15045-01, 1-40, Apr. 1, 2000.
"ISO/IEC JTC1 SC25 WG1, HomeGate: A Residential Gateway Model for HES", 1-8, May 25, 1998.
"ISO/IEC JTC1/SC25 WG1, HomeGate: A Residential Gateway Model for HES", 1-7, Feb. 16, 1998.
"ISO/IEC JTC1/SC25/WG1, HomeGate: Current Issues on Broadband Interworking and the Residential Gateway", 1-13, Jun. 16, 1997.
"ISO/IEC JTC 1/SC 25/WG 1, HomeGate: A Residential Gateway Model for HES, rev. 5", 1-14, Oct. 14, 1998.
"ITU-T G.992.1, Series G: Transmission Systems and Media, Digital Systems and Networks: Digital Transmission Systems—Digital Sections and Digital Line System—Access Networks: Assymmetric Digital Subscriber Line (ADSL) Transceivers", Jun. 1999, pp. 1-256.
"ITU-T G.992.2, Series G: Transmission Systems and Media, Digital Systems and Networks: Digital Transmission Systems—Digital Sections and Digital Line System—Access Networks: Splitterless Asymmetric Digital Subscriber Line (ADSL) Transceivers", Jun. 1999, pp. 1-179.
"Product Description: Nokia MW1112: ADSL over ISDN/WLAN Terminal", Version 1.20/10.4.3.2000/PC, JTO, Nokia Networks, 2000, 1-17.
North America's Home and Building Automation Association, "The Residential Gateway Report and TIA/EIA Residential Gateway", CABA: IS-98-5, Dec. 1998, 1-70.
Caswell, Wayne, "Intersection Gateways, Connect NC and E-commerce Services to Homes and Small Businesses", TR41.5 meeting in Portland, OR, 1-50, May 17, 1999.
"IEEE 802.11b, Part II: Wireless LAN Medium Access Control (MAC) and Physical Layer (PHY) Specifications: Higher-speed Physical Layer Extension in the 2.4 GHz Band", Supplement to IEEE Standard for Information Technology—Telecommunications and Information Exchange Between Systems—Local and Metropolitan Area Networks—Specific Requirements, Sep. 1999, pp. 1-96.
Cisco Systems, Inc., Respondents' Notice of Prior Art (Redacted); in the Matter of Certain Equipment for Communications Networks, Including Switches, Routers, Gateways, Bridges, Wireless Access Pointes, Cable Modems, IP Phones and Products Containing Same; ITC Investigation No. 337-TA-778, 86 pages, Aug. 12, 2011.
Horowitz, Paul et al., Art of Electronics, Second Edition, Cambridge University Press, 1989, pp. 44, 45, 47, 48, 316-319.
Bell, Robert, IEEE P802.9F Draft Standard for Local and Metropolitan Area Networks—Supplement to Integrated Services (IS) LAN Interface At the Medium Access Control (MAC) and Physical (PHY) Layers, Nov. 1996, pp. 1-22.
Introduction to the IrDA Protocol, Sep. 1997, pp. 1-22.
The LAN Catalogue; Black Box Corporation; published Winter of 1989, 6 pages.
Media Access Control (MAC) Parameters, Physical Layer, Medium Attachment Units, and Repeater for 100 Mb/s Operation, Type 100BASE-T (Clauses 21-30); IEEE Standards for Local Metropolitan Area Networks: Supplement to Carrier Sense Multiple Access with Collision Detection (CSMA/CD) Access Method and Physical Layer Specifications; 1995, 200 pages.
Cervenka, Dana, Cablephone Not Ringing Yet; CED: Communications Engineering and Design, Mar. 1995, pp. 32, 33, 34, 36, 38, 40 and 42.
Horowitz, Paul et al, "Art of Electronics", Second Edition, Cambridge University Press, 1989, pp. 1-205, (Part 1).
Horowitz, Paul et al, "Art of Electronics", Second Edition, Cambridge University Press, 1989, pp. 206-354, (Part 2).
Horowitz, Paul et al, "Art of Electronics", Second Edition, Cambridge University Press, 1989, pp. 355-437, (Part 3).
Horowitz, Paul et al, "Art of Electronics", Second Edition, Cambridge University Press, 1989, pp. 438-738, (Part 4).
Horowitz, Paul et al, "Art of Electronics", Second Edition, Cambridge University Press, 1989, pp. 739-924, (Part 5).
Horowitz, Paul et al, "Art of Electronics", Second Edition, Cambridge University Press, 1989, pp. 925-1125, (Part 6).
Patrick, M and Harvey, J, "Data Over Cable System Quality of Service Management Information Base (DOCSIS-QOS MIB)" Motorola ING, pp. 1-43, Jun. 25, 1999.
Abrahams, Richard, "Socket to me: networks linked by electrical lines", Mass High Tech, 1 page, Jan. 1, 1997.
N/A, "SuperStack II Baseline 10/100 Switch User Guide", 3Com, pp. 1-8, May 1, 1998.
"LTS-10 SLTA Core Module Model 65200" Echelon, 12 pages, Jan. 1, 1993.
Limb, John O et al, "An Access Protocol to Support Multimedia Traffic Over Hybrid Fiber/Coax Systems", pp. 1-6, Jan. 1, 2010.
Propp, Michael, Dr., "The Use of Reliable Communications in Telemanagment Trials", Proceedings, 1997, International Symposium on Power-Line Communications and its Applications, 2nd Ed., 9 pages, Jan. 1, 1997.
Tanaka, Masaoki, "Transmission Characteristics of a Power Line Used for Data Communications at High Frequencies", IEEE Transactions on Consumer Electronics, vol. 35, No. 1, pp. 37-42, Feb. 1, 1989.

(56) References Cited

OTHER PUBLICATIONS

IEEE Standard for a High Perfomance Serial Bus; IEEE Std. 1394-1995, 392 pages, Jul. 22, 1996.
Sdralia V. et al, "Performance Characterisation of the MCNS DOCSIS 1.0 CATV Protocol with Prioritised First Come First Served Scheduling", IEEE Transactions on Broadcasting, US, vol. 45, No. 2, pp. 196-205, Jun. 1, 1999.
"LonWorks LPT-10 Link Power Transceiver User's Guide Version 2.1", Echelon Corporation, 60 pages, Jan. 1, 1995.
KIPO, Korean OA issued on 10-2008-7006206, 1-3; 1-2, Jul. 10, 2008.
Marthe, Emmanuel et al, "Indoor Radiated Emission Associated with Power Line Communication Systems", Swiss Federal Institute of Technology Power Systems Laboratory IEEE , pp. 517-520, Jan. 1, 2001.
Strassberg, Dan, "Home Automation Buses", Protocols Really Hit Home, EDN, 1-9, Apr. 13, 1995.
Gibson, Richard et al, Fiber Distributed Data Interface (FDDI)—Token Ring Physical Layer Medium Dependent (PMD); Americal National Standard for Information Systems; ANSI X3.166, 1-57, Jan. 1, 1990.
Archnet Technology Ltd., "Archnet: Automatic Meter Reading System Power Line Carrier Communication", 3 pages, Jan. 1, 2001.
Nichols, Keith, "Line Carrier Modems-1: Build A Pair of Line-Carrier Modems (Part 1)", Radio Electronics , 7 total pages, Jul. 1, 1988.
Nichols, Keith, "Line Carrier Modems-2: Build a Pair of Line-Carrier Modems (Part 2)", Radio Electronics , 5 total pages, Aug. 1, 1988.
Dostert, Klaus, "Powerline Communications" Ch. 5, Prentice Hall PTR, Upper Saddle River NJ COPYRGT 2001, pp. 286, 288-292, Jan. 1, 2001.
Echelon Corporation, "Building a Lon Talk-to-PLC Gateway", Lon Works Engineering Bulletin, 1-63, May 1, 1994.
"LTM-10A User's Guide", Revision 4, Echelon Coporation, 1995-2001, 46 pages, Jan. 1, 2010.
"The Mac Reborn", Macworld, vol. 13, Issue 9., pp. 1-10, Sep. 1, 1996.
Stallings, W., "Local Networks—Third Edition", pp. I-v, x-xvi, 499-510, Jan. 1, 1990.
"IEEE Guide for Power-Line Carrier Applications, ANSI/IEEE Std 643-1980", COPYRGT 1980 by The Institute of Electrical and Electronics Engineers, Inc., pp. 1-84, Jan. 1, 1980.
"SuperStack II Desktop Switch", 3Com, 1-2, Sep. 1, 1996.
Summary of an IEEE Guide for Power-Line Carrier Applications, A Report by the Power System Communications Committee, IEEE Transactions on Power Apparatus and Systems, vol. PAS-99, No. 6, pp. 2334-2337, Nov. 1, 1980.
Wu, Chien-Ting et al., "Extended DQRAP (EXQRAP) A Cable TV Protocol Functioning as a Distributed Switch"; Illinois Institute of Technology (Comp. Science Dept), pp. 1-7, Mar. 12, 1994.
Data-Over Cable Technical Reports; Operations Support System Framework for Data Over Cable Services; TR-DOCS-OSSIW08-961016; MCNS Holdings, LP, pp. 1-23, Oct. 16, 1996.
"Cisco LAN Emulation", pp. 1-16, Jan. 1, 1996.
"PL3120/PL3150 Power Line Smart Transceiver Data Book", Version 2, Echelon Corporation, 1996-2005, 255 pages, Jan. 1, 1996.
"Superstack II Baseline Switch 610 User Guide", 3Com, pp. 1-54, May 1, 1999.
Hasler, E.F. et al, "Communication Systems Using Bundle Conductor Overhead Power Lines", IEEE Transactions on Power Apparatus and Systems, vol. PAS-94, No. 2, pp. 344-349, Mar. 1, 1975.
Laubach, Mark, "To foster residential area broadband internet technology: IP datagrams keep going, and going, and going . . . ", Computer Communications, NL, Elsvier Science Publishers BV, Amsterdam, vol. 19, No. 11, pp. 867-875, Sep. 1, 1996.
Adaptive Networks, Inc., "AN1000EVK Evaluation Unit Manual, Draft 1.0", 31 pages, Aug. 1, 1996.
Burr, A.G, et al, "Effect of HF Broadcast Interference on PowerLine Telecommunications Above 1 MHZ" COPYRGT 1998 IEEE, pp. 2870-2875, Jan. 1, 1998.
"Data Transmission Without Wires", Material Handling Engineering, 1 page, Jan. 1, 1993.
Burranscano, P et al, "Performance Evaluation of Digital Signal Transmission Channels on Coronating Power Lines"COPYRGT 1988 IEEE, pp. 365-368, Jan. 1, 1988.
Intelogis Simplifies Networking, (Passport Plug-In Network), 1 page, Jul. 20, 1998.
"SuperStack II Baseline Switch, 14-Port TP (3C16460) User Guide", 3Com, pp. 1-8, Mar. 1, 1998.
Sala, Dolors and Limb, John, O., "Scheduling Disciplines for HFC Systems: What can we learn from ATM Scheduling", GA Tech, pp. 1-6, May 23, 1996.
Gutzwiller, F.W. et al, "Homenet: A control Network for Consumer Applications", IEEE Transactions on Consumer Electronics, vol. CE-29, No. 3, pp. 297-304, Aug. 1, 1983.
Cisco Systems, "Catalyst 5000 ATM Dual PHY LAN Emulation Module", pp. 1-4, Sep. 24, 1996.
Azzam, Albert, A. , "High Speed Cable Modems", 1997, ISBN: 0-07-006417-2 pp. 247-570, 247-570, Jan. 1, 1997.
"Data-Over Cable Service Interface Specifications; Operations Support System Interface Specification Baseline Privacy Interface MIB"; SP-OSSI-BPI-101-980331; 1997 and 1998, MCNS Holdings. LP., pp. 1-37, Jan. 1, 1997.
Brightfield, Keith, Power Line Communications Conference Entitled, "PLC, A New Competitor in Broadband Internet Access", Washington DC, 60 pages, Dec. 11, 2001.
Broadbridge, R., "Power Line Modems and Networks", Second IEEE National Conference on Telecommunications, 294-296, (6 pages), Apr. 2, 1989.
Plexeon Logistics, Inc. "Power Line Communications", COPYRGT 1998-2003, 2 pages, Jan. 1, 1998.
"Data-Over-Cable Service Interface Specifications" Cable Modem Termination System—Network Side Interface Specification, SP-CMTS-NSII01-960702, 1-17, Jul. 2, 1996.
"HomePlug TM Powerline Alliance, HomePlug 0.5 Draft Medium Interface Specification", 133 pages, Nov. 28, 2000.
Cisco Systems, "Cisco Catalyst 5000: Industry's First Modular, Multilayer-Capable Switching System for the Wiring Closet" , pp. 1-22, May 16, 1996.
Esmailian, T. et al, "A Discrete Multitone Power Line Communications System", Department of Electrical and Computer Engineering, University of Toronto, Ontario, Canada, 2000 IEEE, pp. 2953-2956, Jan. 1, 2000.
"Embedded Power Line Carrier Modem", Archnet Electronic Technology, COPYRGT 2001, 3 pages, Jan. 1, 2001.
"RCA Wireless Phone Jack for DirecTV from Amazon.com website", 5 pages, Jan. 1, 2010.
Cable Television Laboratories, Inc., "Cable Data Modem Performance Evaluation: A Primer for Non-Technical Readers", pp. 1-8, Nov. 15, 1996.
Nguyen, Hung and Yao, Felix, "Hybrid-Fiber Coax", pp. 1-11, Apr. 22, 1996.
Kim, Woo-Seop et al, "A Control Network Architecture Based on EIA-709.1 Protocol for Power Line Data Communications", IEEE Transactions on Consumer Electronics, vol. 48, No. 3 , pp. 650-655, Aug. 1, 2002.
Sheets, William et al, "Carrier Current Audio Transmitter", Radio Electronics, 5 pages, Jan. 1, 1989.
Lohse et al, "Fiber Distributed Data Interface (FDDI)—Token Ring Media Access Control (MAC); American National Standards for Information Systems; ANSI X3. 139-1987", 1-64, Nov. 5, 1986.
Golmie, Nada et al., "A Review of Contention Resolution Algorithms for IEEE 802.14 Networks"; National Institute of Standards and Technology, pp. 1-11, Jan. 1, 1999.
"SuperStack II Entry Hub User Guide", 3Com, pp. 1-8, Nov. 1, 1996.
Ciciora, Walter et al, "Protocol Issues", Modern Cable Television Technology, Video, Voice and Data Communications, Section 4.4, Copyright 1999 by Morgan Kauffmann Publishers Inc., 1-22, Jan. 1, 1999.
"Demand Side Management with LonWorks Power Line Transceiver", LonWorks Engineering Bulletin, Echelon Corporation, 36 pages, Dec. 1, 1996.

(56) References Cited

OTHER PUBLICATIONS

"NE5050 Power line modem product specification", Philips semiconductors, 6 pages, Apr. 15, 1992.

"HomePlug TM Powerline Alliance, HomePlug 1.01 Specification", 139 pages, Dec. 1, 2001.

"White Paper on Medium Voltage Powerline Communication" (PLC) Networks Annexes CIGRE SC D2 WG 14, Broadband PLC, pp. 1-15, Apr. 1, 2005.

Sumner, Mark, "DOCSIS 1.1 Overview" cablemodem.com—Documents, Online! May 3-7, 1999, XP-002165493—Overview, pdf, retrieved on Apr. 18, 2001, pp. 196-205, May 3, 1999.

Tzerfos P. et al, "Delivery of Low Bit Rate Isochronous Streams Over the DOCSIS 1.0 Cable Television Protocol", IEEE Transactions on Broadcasting, US, vol. 45, No. 2, pp. 206-214, Jun. 1, 1999.

Cisco Systems, "CiscoPro EtherSwitch CPW2115", 4 pages, Dec. 1, 1995.

"Intelogis to Present on Stage at Internet Showcase 1998" PR Newswire, 1 pages, Jan. 28, 1998.

KIPO, Korean OA issued on 10-2002-7014029, 1-4; 1-2, Feb. 2, 2007.

Hunt, John M. et al, "Electrical Energy Monitoring and Contol System for the Home" IEEE Tansactons on Consumer Electronics, vol. CE-32, No. 3, pp. 578-583, Aug. 1, 1986.

"Cisco Fast Ethernet 100-Mbps Solutions", pp. 1-10, Jan. 1, 1996.

Cable Television Laboratories Inc., "Data-Over-Cable Service Interface Specifications: Radio Frequency Interface Specification", SP-RFIv2.0-I03-021218, Dec. 18, 2002.

Stallings, William, "Local Networks: An Introduction", pp. 1-97, Jan. 1, 1984.

"Fieldbus Standard for use in Industrial Control Systems Part 2: Physical Layer Specification and Service Definition", 106 pages, May 17, 1994.

Hoang, Thai D., Office Action U.S. Appl. No. 12/627,574, 1-6, Sep. 30, 2010.

Liu, Er et al, "Broadband Characterization of Indoor Powerline Channel", Communications Laboratory, Heisinki Univeristy of Technology, Finland (presented at the 2004 International Symposium on PowerLine Communications and its Applications, Zaragoza, Spain,), 6 pages, Mar. 31, 2004.

Lim, C. K. et al, "Development of a Test Bed for High-Speed Power Line Communications", School of Eiectrical and Electronic Egineering, Nanyana Technological University, Sincapore, IEEE, pp. 451-456, Jan. 1, 2000.

Yi-Fu, Chen et al, "Baseband Transceiver Design of a 128 kbps Power Line Modem for Household Applications", IEEE Transactions on Power Delivery, vol. 17, No. 2, pp. 338-344, Apr. 1, 2002.

Coakley, N.G. et al, "Real-Time Control of a Servosystem Using the Inverter-Fed Power Lines to Communicate Sensor Feedback", IEEE Transactions on Industrial Electronics, pp. 360-369, Jan. 1, 1999.

Advanced Micro Devices, Inc. et al, "An Interoperable Solution for FDDI Signaling Over Shielded Twisted Pair", Advanced Micro Devices Inc., pp. 1-18, May 21, 1991.

Johnson, Johna Till, "Videohub Cuts Costs, Opens Options", Data Communications, 4 pages, Feb. 1, 1992.

"LonWorks for Audio Computer Control Network Applications", Echelon Corporation, 30, Jan. 1, 1995.

Inoue, M et al, "The MELON Home Automation Housekeeping System", Mitsubishi Denki Giho, vol. 63, No. 2, pp. 36-41, Jan. 1, 1989.

Burranscano, P et al, "Digital Signal Transmission on Power Line Carrier Channels: An Introduction", IEEE Transactions on Power Delivery, vol. PWRD-2, No. 1, pp. 50-56, Jan. 1, 1987.

Drams, "Dynamic Host Configuration Protocol", 1-45, Mar. 1, 1997.

"LonWorks 78kbps Self-Healing Ring Architecture", LonWorks Marketing Bulletin, Echelon Coporation, 6 pages, Aug. 1, 1993.

"Texas Instruments: System Block Diagrams; Power Line Communication (Generic)", COPYRGT 1995-2002, 1 page, Jan. 1, 1995.

Ciciora, Walter et al, "Modern Cable Television Technology: Video, Voice, and Data Communications", Section 4.5, pp. 205-213, Jan. 1, 1999.

"Dedicated Passive Backbone for Power Line Communications", IBM Technical Disclosure Bulletin, pp. 183-185, Jul. 1, 1997.

Vercauteren, S., "International Patent Application No. PCT/IL01/00302, Search Report", 1-3, Jan. 22, 2002.

Woundy, R., "Baseline Privacy Interface Management Information Base for MCNS Complaint Cable Modems and Modem Termination Systems", pp. 1-35, Jul. 1, 1998.

Donnan, Robert et al, "Token Ring Access Method and Physical Layer Specifications", ANSI/IEEE Standard for Local Area Networks, 44 pages, Apr. 29, 1985.

Adaptive Networks, Inc., "AN1000 Powerline Network Communications Chip Set", 1-29 pages, Jan. 1, 1995.

3COM, "3Com Product Details, NBX 2101PE Basic Phone", pp. 1-3, Jan. 18, 2007.

Azzam, Albert A., High-Speed Cable Modems, pp. 247-570, ISBN: 0-07-006417-2, 1-321, Jan. 1, 1997.

Radford, Denny, "Spread-spectrum Data Leap Through AC Power Wiring", IEEE Spectrum, pp. 48-53, Nov. 1, 1996.

"MCNS Data-Over-Cable Service Interface Specifications: Baseline Privacy Interface Specification SP-BPI-I02-990319", 1-96, Mar. 1, 1999.

Cisco Systems, "Catalyst 5000 Series", Cisco Systems, 1996, pp. 589-600.

Jacobs, David et al, "Bandwidth Burglary in Broad Daylight: How to Prevent a Simple Hack", 4 pages, Jan. 1, 2003.

Quigley, Thomas J., "Cablemodem Standards for Advanced Quality of Service Deployments", Digest of Technical Papers, International Conference on Consumer Electronics, pp. 282-283, Jun. 22, 1999.

"Signalling on Low-Voltage Electrical Installations In the Frequency Band 3kHz to 148.5kHz—Part 4: Filter at the Inferface of the Indoor and Outdoor Electricity Network", CLC SC 105A (Secretariat), pp. 1-11, May 1, 1992.

Campbell, Chris, "Building a Business Case for PLC: Lessons Learned From the Communication Industry Trenches", KPMG Consulting, 5 pages, Jul. 16, 2002.

Marketing Assessment Presentation Entitled "Powerline Telecommunications", The Shpigler Group for CITI PLT, 9 pages, Jul. 16, 2002.

"Introduction to Pyxos FT Platform", Echelon Corporation 2007, 34 pages, Jan. 1, 2007.

Piety, Robert A., "Intrabuilding Data Transmission Using Power-Line Wiring", Hewlett-Packard Journal, pp. 35-40, May 1, 1987.

"SuperStack II Desktop Switch User Guide"; 3Com, 148 pages, Jun. 1, 1997.

Cisco Systems, Catalyst 5000 Group Switching Ethernet Modules, 5 pages, May 6, 1996.

Pfendtner, "DOCSIS Network Security at WH-Netz", Nov. 20, 2002.

Metcalfe, Bob, From the Ether-Bob Mecalfe, Cheap, reliable 'net connections may be as close as an electrical socket, by Bob Metcalfe Info World, vol. 19, Issue 6, 4 pages, Feb. 10, 1997.

"PassPort PC Plug In Quick Setup Guide", Intelogis P/N 30030202, 1998, 8 pages.

Adaptive Networks, Inc., "AN192 Powerline Network Communications Module: Product Specifications", 2 pages, Jan. 1, 2010.

"Universal Serial Bus Specification", Revision 1.0, 268 total pages, Jan. 15, 1996.

Society of Cable Telecommunications Engineers, Inc. "Data-Over-Cable Service Interface Specification: DOCSIS 1.0 Radio Frquency Interface (RFI)", ANSI/SCTE (formerly DSS 02-05), Jan. 22, 2002.

Dostert, Klaus, "Telecommunications Over the Power Distribution Grid-Possibilities and Limitations" Proceedings, 1997 Int'l Symposium on Power-Line communications and its Applications, 10 pages, Apr. 2, 1997.

Rivkin, Steven R, "Co-Evolution of Electric and Telecommunications Networks", The Electricity Journal, pp. 71-76, May 1, 1998.

Cable Modem Security: Insulating Your Network While Keeping Your Subcribers Safe From Each Other, Oct. 1, 2001.

Cisco, "Internal DOCSIS Configurator File Generator for the Cisco Cable Modem Termination System", Cisco Cable Modern Termination System Feature Guide., 1-22, Oct. 14, 2002.

Gershon, Eugen, "FDDI on Copper with AMD PHY Components"; Advanced Micro Devices Inc., pp. 1-8, Jun. 1, 1991.

(56) References Cited

OTHER PUBLICATIONS

Oneal Jr., J.B., "The Residential Power Circuit as a Communication Medium", IEEE Transactions on Consumer Electronics, vol. CE-32, No. 3, pp. 567-577, Aug. 1, 1986.
"SuperStack II PS Hub User Guide"; 3Com, 188 pages, Jul. 1, 1997.
Feduschak, Natalia A., "Waiting In the Wings: Is Powerline Technology Ready to Compete with Cable?", 5 pages, Mar. 1, 2001.
Chang, S.S.L., "Power-Line Carrier", Fundamentals Handbook of Electrical and Computer Engineering, vol. II Communication, Control, Devices and Systems, John Wiley and Sons, New York, pp. 617-627, Jan. 1, 1983.
De Wilde, W.R. et al, "Upwards To A Reliable Bi-Directional Communication Link On The LV Power Supplies for Utility Services: Field Tests in Belgium", Sixth International Conference, pp. 168-172, Apr. 3, 1990.
Stallings, W., "Local Networks—Second Edition", pp. I-v, vii-xiv, 427-434, Jan. 1, 1987.
Yoshitoshi, M et al., "Proposed Interface Specifications For Home Bus", IEEE Transactions on Consumer Electronics, vol. CE-32, No. 3. pp. 550-557, Aug. 1, 1986.
Naredo, J.L et al, "Design of Power Line Carrier Systems on Multitransposed Delta Transmission Lines" IEEE Transactions on Power Delivery. vol. 6, No. 3, pp. 952-958, Jul. 1, 1991.
Tanaka, Mosaoki, "High Frequency Noise Power Spectrum, Impedance and Transmission Loss of Power Line in Japan on Intrabuilding Power Line Communications" IEEE Transactions on Consumer Electronics, vol. 34, No. 2, pp. 321-326, May 1, 1988.
Barstow, J.M., "A Carrier Telephone System for Rural Service", AIEE Transcations, 1947, vol. 66, pp. 301-307, Jan. 1, 1947.
Data-Over Cable Service Interface Specifications; Operations Support System Interface Specification; SP-OSSI-102-990113; Cable Television Laboratories, Inc., pp. 1-28, Jan. 13, 1999.
"MCNS Data-Over-Cable Service Interface Specifications: Cable Modem to Customer Premise Equipment Interface Specification SP-CMCI-104-000714", 1-65, Jul. 14, 2000.
3Com, "48 Volt DC Power Supply Connection Guide For the SuperStack II Switch 3900", pp. 1-12, Mar. 1, 2000.
Sala, Dolors et al, "A Protocol for Efficient Transfer of Data over Fiber/Cable Systems"GA Tech., pp. 1-8, Jan. 1, 1997.
Cisco Systems, "Quick Start Guide: Cisco 2610 Router Cabling and Setup", 18 pages, Jan. 1, 1998.
Hatori, Mitsutoshi et al, "Home Informatization and Standardization of Home Bus", IEEE Transactions on Consumer Electronics, CE-32, No. 3, pp. 542-549, Aug. 1, 1986.
Gibson, Richard et al, "Fiber Distributed Data Interface (FDDI)—Token Ring Physical Layer Protocol (PHY)"; American National Standard for Information Systems, 34 pages, Jan. 1, 1988.
"LonWorks Router User's Guide Revision 3", Echelon Corporation, 68 pages, Jan. 1, 1995.
Sheets, William et al, "Carrier Current Receiver", Radio Electronics, vol. 60, No. 2, 5 pages, Feb. 1, 1989.
"PL DSK 2.1 Power Line Smart Transceiver Development Support Kit User's Guide", Echelon Corporation, 2005-2006, 18 pages, Jan. 1, 2005.
"Intelion Corporation Test Summary for Transformerless Coupler Study", Intellon No News Wires, DOT/NHTSA Order No. DTNH22-98-P-07632, pp. 1-18, Dec. 24, 1998.
"The Mac Reborn; Macworld Sep. 1996", 104-115, Sep. 1, 1996.
"White Paper on Medium Voltage Powerline Communication" (PLC) Networks CIGRE SC D2 WG 14, Broadband PLC, pp. 1-58, Mar. 1, 2005.
Keller et al, "Performance Bottlenecks in Digital Movie Systems", Proceedings of the 4th International Workshop on Network and Operating System Support for Digital Audio and Video., pp. 161-172, Jan. 1, 1993.
Cable Televison Laboratories, Inc., "Data-Over-Cable Service Interface Specifications—Radio Frequency Interface Specificaiton"—SP-RF1-104-980724, pp. 1-204, Jan. 1, 1997.

St Johns, Mike, "Radio Frequency (RF) Interface Management Information Base for MCNS/DOCSIS Complaint RF Interfaces", pp. 1-67, Feb. 17, 1999.
Lin, Dar-Ying, "On IEEE 802.14 Medium Access Control Protocol", IEEE Communications Survey Fourth Quarter, pp. 1-27, Jan. 1, 1998.
Cable Television Laboratories Inc., Data-Over-Cable Service Interface Specifications: Radio Frequency Interface Specification SP-RFIv1.1-I09-020830, Aug. 30, 2002.
"Using the LonWorks PLT-22 Power Line Transceiver in European Utility Application", Version 1, Echelon Coporation 1996-1999, 118 pages, Jan. 1, 1996.
Willet, M., "Token-Ring Local Area Networks—An Introduction", IEEE Network Magazine, vol. 1, No. 1., pp. 8 and 9, Jan. 1, 1987.
"Powerline Network Communications Module" Adaptive Networks, 2 pages, Jan. 1, 2010.
Onunga, J. et al, "Distribution Line Communications Using CSMA Access Control with Priority Acknowledgements" IEEE Transactions on Power Delivery, vol. 4, No. 2, pp. 878-886, Apr. 1, 1989.
St. Johns, Michael, "Cable Device Management Information Base for DOCSIS Compliant Cable Modems and Cable Modem Termination System", pp. 1-54, Mar. 30, 1999.
Lauback, Mark, "Logical IP Subnetworks over IEE 802.14 Services", pp. 1-36, Mar. 13, 1998.
3Com, "3ComImpact IQ External ISDN Modem User Guide", 158 pages, Jul. 1, 1997.
"LonWorks LPI-10 Link Power Interface Module User's Guide", Echelon Corporation, 37 pages, Jan. 1, 1995.
Lokken, G. et al, "The Proposed Wisconsin Electric Power Company Load Management System Using Power Line Carrier Over Distribution Lines", 1976 National Telecommunications Conference, IEEE, 2.2-12.2-3, Jan. 1, 1976.
"Integrated Services Digital Network (ISDN)", International Telecommunications Union, vol. III, Fascicle III.8, pp. 175-176 and 204-209, Jan. 1, 1988.
"Power Line Communications Solutions" COPYRGT 2002, 2 pages, Jan. 1, 2002.
Adiragju, S and Fijolek, J., Telephony-Return Interface (TRI) Management Information Base for DOCSIS compliant Telephony-Return Cable Modems and Cable Modem Termination Sytems., pp. 1-27, Apr. 2, 1999.
"HomePlug TM Powerline Alliance, HomePlug Initial Draft Medium Interface Specification", 111 pages, May 19, 2000.
Roek, Guenter, Radio Frequency (RF) Interface Management Information Base for MCNS Compliant RF Interfaces Draft-ietf-Jipcdn-rf-interface-mib-07.txt;, pp. 1-55, May 22, 1998.
"Hart Field Communication Protocol—an introduction for users and manufacturers", Hart Communication Foundation, 12 pages, Oct. 1, 1995.
Bak, David, "LAN Operates Over Existing Power Lines", Design News, 3 pages, Jan. 23, 1989.
Cisco Systems, "Catalyst 5000 Switching System", 1996, pp. 1-4.
Herbold, Jacob et al, "Banish Those "Wall-Warts" With Power Over Ethernet", Electronic Design Online, 8 pages, Oct. 27, 2003.
Russell, B. Don, "Communication Alternatives for Distribution Metering and Load Mangement", IEEE Transactions on Power Apparatus and Systems, vol. PAS-99, No. 4, pp. 1448-1455, Jul. 1, 1980.
Cable Television Laboratories Inc., "Data-Over-Cable Service Interface Specifications: Radio Frequency Interface Specification—SP-RFI-104-980724", pp. 1-204, Jan. 1, 1997.
Hiroshi, Takeda, "Patent Abstracts of Japan", Japanese Publication No. 10200544 A2, (Matsushita Electric Works, Ltd.), 1, Jul. 31, 1998.
"Spread Spectrum Carrier Technology Enabling Reliable Communications Over Noisy Media", Intellon, 8 pages, Jan. 1, 2010.
Abramson, H., "Docsis 1.1 IGMP MIB" Motorola, pp. 1-13, Jun. 1, 1999.
Diclementi, Domenic A. et al, "Electrical Distribution System Power Line Characterization" COPYRGT 1996, IEEE, pp. 271-276, Jan. 1, 1996.
"Tohoku Electric Develops High-Speed Communications System Using Power Distribution Lines" Tohoku Currents, Spring 1998, 8(1), 2 pages, Jan. 1, 1998.

(56) References Cited

OTHER PUBLICATIONS

"Communications System Uses Standard Powerlines", Computer Design, 3 pages, Nov. 1, 1995.
Data-Over Cable Service Interface Specifications: Cable Modem Telephony Return Interface Specification: SP-CMTRI-I01-970804, Cable Television Laboratories, Inc., pp. 1-80, Aug. 4, 1997.
Cisco Systems, "Cisco Catalyst 5002 Switching System", 4 pages, Jan. 1, 2010.
3Com, "3ComImpact IQ External ISDN Modem User product brochure", pp. 1-4, Jun. 1, 1996.
Gershon, Ron et al, "A Token Passing Network for Powerline Communications" by Adaptive Networks, IEEE Transactions on Consumer Electronics, vol. 37, No. 2, 6 pages, May 1, 1991.
LonWorks Custom Node Development, LonWorks Engineering Bulletin, Echelon Corporation, 16 pages, Jan. 1, 1995.
Croft, Bill et al, "Bootstrap Protocol (BOOTP)", Sep. 1, 1985.
Goodenough, Frank, "Chip Set Plus 100 Kbit/s of Data on Noisy Power Lines", Electronic Design, 9 pages, Mar. 18, 1996.
Strole, N., "The IBM Token-Ring Network—A functional Overview", IEEE Network Magazine, vol. 1, No. 1, pp. 23-30, Jan. 1, 1987.
Dostert, K, "EMC Aspects of High Speed Powerline Communications", Proceedings of the 15.sup.th International Wroclaw Symposium and Exhibition on Electromagnetic Capability, Wroclaw, Poland, pp. 98-102, Jun. 27, 2000.
"LonWorks Twisted Pair Control Module User's Guide Version 2", Echelon Corporation, 1992-1996, 50 pages, Jan. 1, 1996.
Roeck, Guenter, "Cable Device Management Information Base for MCNS Compliant Cable Modems and Cable Modem Termination Systems", pp. 1-32, May 22, 1998.
Lavoisard, J.L., "ISDN Customer Equipments", Commutation and Transmission, No. 3, pp. 35-50, Jan. 1, 1987.
"EMETCON Automated Distribution System, ABB Power T and D Company Inc.", Raleigh North Carolina, No. B-919A, 14 pages, Jan. 1, 1990.
Kilbourne, B, "EEI Electric Perspectives: the Final Connection", 7 pages, Jul. 1, 2001.
"Data-Over Cable Service Interface Specifications; Operations Support System Interface Specification Radio Frequency Interface; SP-OSSI-RFI-I03-990113" Cable Television Laboratories Inc., pp. 1-33, Jan. 13, 1999.
Detreville, John et al, "A Distributed Experimental Communications System", IEEE Journal on Selected Areas in Communications, vol. Sac-1, No. 6, pp. 1070-1075, Dec. 1, 1983.
Batlle, Sala Dolors, "MAC Protocols for Multimedia Data over HFC Architecture", pp. 1-30, Oct. 27, 1995.
Wildstrom, Stephen, "Now This is Plug and Play", Business Week, Updated Jun. 14 1997, 2 pages, Jun. 14, 1997.
"EIA-600.31—PL Physical Layer and Medium Specification", pp. 1-24, Jan. 1, 2010.
"Data-Over Cable Service Interface Specifications: Cable Modem to Customer Premise Equipment Interface Specification"; SP-CMCI-12-980317, Cable Television Laboratories, Inc., pp. 1-40, Mar. 17, 1998.
Nicholas, Vun C.H. et al, "A Power LAN for Telecommunication Power Supply Equipment", IEEE Region 10 Conference on Computer, Communication, Control and Power Engineering, vol. 3 of 5., 6 pages, Oct. 19, 1993.
"Echelon Customer Support Alert Re: RTR-10 Core Module and RTR-10 Motherboard Changes", 2 pages, Jan. 1, 1996.
"EMETCON Automated Distribution System: Communications Guide", Westinghouse ABB Power T7D Company Technical Manual 42-6001A, 55 p ages, Sep. 1, 1989.
Abraham, K.C. et al, "A Novel High-Speed PLC Communication Modem", IEEE Transactions on Power Delivery, pp. 1760-1767, Oct. 1, 1992.
Azzam, Albert, A., "High Speed Cable Modems: Including IEEE 802.14 Standards", pp. 1-597, Jan. 1, 1997.
Cisco Systems, "Catalyst 5000 Series Configuration Worksheet", pp. 1-11, Jan. 1, 1996.

Meng, H. et al, "A Transmission Line Model for High—Frequency Power Line Communication Channel" IEEE, pp. 1290-1295, Jan. 1, 2002.
Data-Over Cable Service Interface Specifications; Radio Frequency Interface Specification; SPRFIv1.1-101-990311, Cable Televison Laboratories, pp. 1-320, Mar. 11, 1999.
Echelon Corporation, "Centralized Commercial Building Applications with the LonWorks PLT-21 Power Line Transceiver", LonWorks Engineering Bulletin, Echelon Corporation, 22 pages, Apr. 1, 1997.
Goldberg, Lee, "MCNS/DOCSIS MAC Clears a Path for the Cable-Modem Invasion", Electronic Design, US, Penton Publishing, vol. 45, No. 27, pp. 69-70, 74, 78, 80, Dec. 1, 1997.
Kawamura, A et al, "Autonomous Decentralized Manufacturing System Using High-Speed Network with Inductive Transmission of Data and Power", IEEE, pp. 940-945, Jan. 1, 1996.
Ophir, Lior et al., "802.11 Over Coax—A Hybrid Coax—Wireless Home Network Using 802.11 Technology"; Texas Instruments, 6 pages, Jan. 1, 2003.
Stallings, W., "Local Networks—An Introduction", pp. ii, xii-xvi, 373-381, Jan. 1, 1984.
Little, Arthur D et al, "Data Over Cable Interface Specifications: Cable Modem Termination System—Network Side Interface Specification", pp. 1-17, Jul. 2, 1996.
Network Based Exchange—The Complete Communications Solution, NBX Corporation, 16 pages, Jan. 1, 1997.
Hachman, Mark, "Compaq to Ride the CEBus", EBN, 1 page, Jan. 22, 1996.
ISO/IEC, "CD1 15045-01: Information technology-Interconnection of information technology equipment—Architecture for HomeGate, the residential gateway (AHRG)", Apr. 1, 2000, pp. 1-38.
Olshansky, Robert, "Broadband Digital Subscriber Line: A Full Service Network for the Copper Plant", Telephony, pp. 52-60, Jun. 12, 1985.
Efficient Networks, Inc., "Speedstream 5800 Series Business Class DSL Routers", 1-2, Jul. 1, 2000.
PairGain Technologies, Incorporated, "PairGain Technologies HiGain Doubler Unit Model HDU-451 Issue 1", pp. 1-22, Nov. 13, 1997.
Cisco Systems, Inc., "Release Notes for Cisco Aironet 340 Series Access Points", 1-8, Apr. 4, 2000.
Cisco Systems, Inc., "Cisco 675E Small Office Home Office Telecommuter ADSL Router Data Sheet", 1-3, Jun. 1, 1999.
Cabletron Systems, "Flowpoint FP2200 SDSL Router Customer Release Notes", 1-6, Jun. 21, 1999.
"David Information Manager Technical Overview", Sep. 1988, pp. 1-74.
Cisco Systems, Inc., "Cisco 675 Soho Telecommuter ADSL Router Data Sheet", 1-3, May 1, 1999.
Wireless, Inc., "2.4 Ghz DS1/E1 Access Link Operations Manual" V 0.71, 1-62, Nov. 30, 1998.
Efficient Networks, Inc., "Speedstream 5600 Series ADSL Router Installation Guide", 1-39, Jan. 1, 1999.
Cisco Systems Inc., "Using the Cisco Aironet 340 Series Wireless Bridges", pp. 1-218, Mar. 27, 2000.
Efficient Networks, Inc., "Speedstream 4041" Archive.org (http://www.efficient.com/products/dsl/4041.html), 1-2, Nov. 30, 1999.
"PowerDsine Product Catalogue" Israel, pp. 56-79 and 95-105, Jan. 1, 1999.
Apple, "Setting Up the AirPort Base Station", pp. 1-24, Jan. 1, 1999.
PR Newswire, "Apple Introduces AirPort Wireless Networking", pp. 1-2, Jul. 21, 1999.
Efficient Networks, Inc., "Speedstream 5010" Archive.org (http://www.efficient.com/products/dsl/5010.html), 1-2, Oct. 7, 1999.
Cayman Systems, Inc., "Getting Started With the Cayman 3220-H-W11", 1-4, Oct. 1, 2000.
Efficient Networks, Inc., "Speedstream 5250" Archive.org (http://www.efficient.com/products/dsl/5250.html), 1-2, Oct. 7, 1999.
Efficient Networks, Inc., "Speedstream 5660" Archive.org (http://www.efficient.com/products/dsl/5660.html), 1-2, Oct. 7, 1999.
Aware, "Aware Announces Commercial Availability of the X200 ADSL Access Router at Network plus Interop 97", pp. 1-3, Oct. 7, 1997.

(56) References Cited

OTHER PUBLICATIONS

Efficient Networks, Inc., "Speedstream 5260 ADSL LAN Modem Installation Guide", 1-11, Jan. 1, 2000.
Wireless, Inc., "Access Series Microlink Operations Manual" 2.4 Ghz Access Microlink Operations Manual, V 1.0, 1-107, Nov. 1, 1998.
Alcatel, "1000 ADSL High Speed Modem User's Guide", pp. 1-78, Jan. 1, 1999.
Efficient Networks, Inc., "Speedstream 4060" Archive.org (http://www.efficient.com/products/dsl/4060.html), 1-2, Oct. 7, 1999.
Efficient Networks, Inc., "Speedstream 3010" Archive.org (http://www.efficient.com/products/dsl/3010.html), 1-2, Aug. 28, 1999.
Cayman Systems, Inc., "Getting Started With the Cayman 3220-H", 1-4, Jan. 1, 2000.
Suranyi, Gabriel G., "The Need for Home Power: It Is Just Around the Corner", Telecommunications Energy Conference, INTELEC, 19th International, Oct., 1997, 80-86.
Cisco Systems, Inc., "Quick Start for the Cisco ADSL 675 Router", 1-2, Jan. 1, 1998.
"Claim Chart presented in request for reexamination of U.S. Patent No. 6,480,510", pp. 1-37, Jul. 28, 1998.
Efficient Networks, Inc., "Speedstream 7800 Series Business Class VODSL", 1-2, Jul. 1, 2000.
Efficient Networks, Inc., "Speedstream 4020" Archive.org (http://www.efficient.com/products/dsl/4020.html), 1-2, Nov. 30, 1999.
Efficient Networks, Inc., "Speedstream 5621" Archive.org (http://www.efficient.com/products/dsl/5621.html), 1-2, Nov. 30, 1999.
Business Wire, "Proxim Now Shipping Industry's First Cordless Solution for Shared Broadband Internet Access to Home and SOHO Customers", 1-2, Feb. 22, 1999.
Cisco Systems, Inc., "Cisco Aironet 340 Series: LAN Wireless Solutions", 1-24, Mar. 20, 2000.
Cayman Systems, Inc., "Cayman Systems Releases ADSL3220 Router With Alcatel'S Dynamite ADSL Chipset" CISCO02595544, 1-3, Jan. 11, 1999.
Cisco, "Cisco Systems Introduces Wireless LAN Solution for Small to Medium Businesses and Corporate Enterprises", EDP Weekly's IT Monitor, pp. 1, Mar. 27, 2000.
Wireless, Inc., "Access Series", Date unknown, 1-4.
Cisco Systems Inc., "Cisco 600 Series Installation and Operation Guide", pp. 1-192, Jul. 1, 2000.
"Claim Chart presented in request for reexamination of US Patent No. 5,841,360 request filed", pp. 1-53, Oct. 22, 1996.
Cisco Systems, Inc., "Cisco 675 ADSL Router Installation and Operation Manual V. 2.0.0", 1-118, Aug. 1, 1998.
Cisco Systems, Inc., "Cisco 678 Small Office Home Office Telecommuter ADSL Router Data Sheet", 1-3, May 1, 2000.
Efficient Networks, Inc., "Speedstream 5861 ADSL Business Class Router Quick Start Guide", 1-47, Jan. 1, 2000.
Efficient Networks, Inc., "Speedstream 3020" Archive.org (http://www.efficient.com/products/dsl/3020.html), 1-2, Nov. 30, 1999.
Business Wire, "Cayman Introduces First ADSL Broadband Gateway With Integrated HomeRF Wireless Capabilities", 1-3, Apr. 4, 2000.
Cisco Systems, Inc., "Cisco Aironet 340 Series Client Adapters and Access Points-in-Building Wireless Solutions Data Sheet", 1-7, Feb. 1, 2000.
Efficient Networks, Inc., "Speedstream 3060" Archive.org (http://www.efficient.com/products/dsl/3060.html), 1-2, Oct. 7, 1999.
Aware, "X200 ADSL Access Router", pp. 1-5, Jan. 1, 1998.
Efficient Networks, Inc., Speedstream 5200 Series Ethernet DSL Modems, 1-2, Jul. 1, 2000.
Cisco Systems Inc., "Quick Start Guide—Cisco Aironet 340 Series Wireless Bridges", pp. 1 - 12, Jan. 1, 2000.
Cabletron Systems, "Flowpoint Router 2200-12 SDSL Router Quick Start Guide", 1-48, Mar. 1, 1999.
ISO/IEC, "Information Technology—Interconnection of Information Equipment—Architecture for HomeGate, the Residential Gateway (AHRG)", ISO/IEC JTC 1/SC 25/WG 1, CD1 15045101, pp. 1-40, Apr. 1, 2000.
Wireless, Inc., "Access Micro Link System Hardware Design Description Draft 00", 1-36, Jan. 8, 1998.
Business Wire, "2Wire Unlocks the Potential of Consumer Broadband with the First DSL Residential Gateway", pp. 1-2, Dec. 28, 1999.
Efficient Networks, Inc., "Speedstream DSL USB Modem Installation Guide", 1-18, Jan. 1, 2000.
Cayman Systems, "Configuring your PC for HomeRF", pp. 1-44, Sep. 1, 2000.
Wireless, Inc., "Access Micro Link System Hardware Design Description Draft 01", 1-27, Aug. 1, 1998.
Apple Computer, Inc., "Airport", 1-5, Aug. 1, 1999.
Aragon, Martin et al, "Residential Gateway Viability", published as early as 1998, pp. 1-15.
Cisco, "Cisco 677—SOHO/Telecommuter ADSL Router", Cisco Product Catalog, Dec. 2000, 6 pages.
3Com Netbuilder Data Sheet, "NETBuilder II Intelligent Routers 3Com", 1998, 8 pages.
Apple Computer, Inc., "AirPort", Apple Computer Inc. 1999, 5 pages.
Cornerstone, "Cornerstone Voice—Economical Delivery of Telephony Services in the Hybrid Fiber/Coax Network", Issue 2, Aug. 1996, 22 pages.
Cervenka, Dana, "Building cablephone systems piece by piece, Manufacturers provide an update", Cable Telephony, CED: Communications Engineering & Design, Mar. 1996, 6 pages.
Business Wire, "Phasecom Announces Wireless System Headend Controller for Business and Residential MMDS/LMDS Modems.", Sep. 18, 1999, Business Wire, 2 pages.
Business Wire, "Phasecom's New Broadband Bridge Cable Modem Will Help MSOs Tap Into Major Growth Market for Private Data Networks Over Cable.", Oct. 8, 1996, Business Wire, 2 pages.
Scientific-Atlanta, Inc., "CoAxium™ CoAxium Customer Interface Unit", © 1996, 1997 Scientific-Atlanta, Inc., 3 pages.
Scientific-Atlanta, "Cable Telephony, CoAxium™ Cable Telephony System Architecture", Copyright 1994, 1 page.
Eldering, Charles, et al., "Engineering Requirements for Hybrid Fiber—Coax Telephony Systems", 1994 NCTA Technical Papers, pp. 219-231.
Drudy, Francis, et al., "Considerations and Recommendations on Power Feeding at an 802.9 Interface", IEEE 802.9—IVD LAN Interface Working Group, Nov. 5, 1987, 6 pages.
PairGain Technologies, Inc., "HiGain Line Unit Quick Installation Guide", PairGain Technologies, Inc. Engineering Services Technical Practice, Section 350-231-165-01, Sep. 15, 1998, 28 pages.
PairGain Technologies, "Quick Installation Guide for PairGain™ Technologies HiGain™ Remote Enclosure Model HRE-421 Issue 1", PairGain Technologies, Technical Practice, Engineering-Plant Series, Section 100-421-100, Revision 05, Aug. 15, 1995, 6 pages.
CiscoPro, "CiscoPro EtherSwitch Stack System", Copyright 1995 Cisco Systems, 4 pages.
Cisco Systems, "Catalyst 3000 Ethernet Modules, Easy-to-Install Modules for Cient/server or Shared Connectivity Applications", Data Sheet, Copyright 1997 Cisco Systems, 3 pages.
IEEE Standard for Information Technology, "Part 3: Carrier Sense Multiple Access with Collision Detection (CSMA/CD) access method and Physical Layer specifications", IEEE, 2006, 790 pages.
Riddel, Jeff, "PacketCable Implementation", Cisco Press, Feb. 2007, 1104 pages.
Wood, Robert, "Next-Generation Network Services", Cisco Press, Nov. 2005, 624 pages.
Committee T1—Telecommunications, "T1.413 Issue 2", 1998, 270 pages.
Dye, Mark A., et al., "Network Fundamentals CCNA Exploration Companion Guide", Cisco Press, Feb. 2011, 560 pages.
The Institute of Electrical and Electronics Engineers, Inc., "Part 11: Wireless LAN Medium Access Control (MAC) and Physical Layer (PHY) specifications", Jun. 26, 1997, 465 pages.
The Institute of Electrical and Electronics Engineers, Inc., "Part 11: Wireless LAN Medium Access Control (MAC) and Physical Layer (PHY) specifications, High-speed Physical Layer in the 5 GHz Band", Jun. 12, 2003, 91 pages.

(56) References Cited

OTHER PUBLICATIONS

The Institute of Electrical and Electronics Engineers, Inc., "Part 11: Wireless LAN Medium Access Control (MAC) and Physical Layer (PHY) specifications: Higher-Speed Physical Layer Extension in the 2.4 GHz Band", Jun. 12, 2003, 96 pages.
First Pacific Networks, "Response to CableLabs RFI on Cable Telecommunications Equipment and Systems", Mar. 10, 1994, 46 pages.
First Pacific Networks, Inc., "1997 Business Plan Appendix", 1997, 79 pages.
Communications Industry Researchers, Inc., "Cablephone: A Technology and Market Assessment for Cable-Telephony Systems", 1995, 199 pages.
Canada Newswire Ltd., "Norther Telecom (Nortel) to Market Com21 Cable Modems with Cornerstone Voice", Dec. 4, 1996, 20 pages.
Bernier, Paula, "Northern Telecom joins HFC bandwagon", Telephony, Nov. 21, 1994, 26 pages.
DSC Communications Corporation, "News Release: DSC and General Instrument Announce New Integrated Video and Telephony System", May 3, 1994, 8 pages.
The Institute of Electrical and Electronics Engineers, Inc., "Digest of Papers, Spring Compcon 82", Feb. 1982, 7 pages.
Motorola, "CableComm™. Building on the Strength of the Coax/Fiber Cable Infrastructure.", 1994, 18 pages.
Phasecom, "Broadband Bridge System—P545", 1997, 8 pages.
Scientific-Atlanta, Inc., "Broadband Communications Group Backgrounder", Mar. 1995, 4 pages.
COM21, "ComPORT Cable Modem Specifications", 1997, 3 pages.
Cyberlab University, "The Broadband Bob Report", Jul. 1, 1997, 24 pages.
Motorola Multimedia Group, "Cable Data Modems, A Primer for Non-Technical Readers", 1995, 66 pages.
Drudy, Francis, et al., "Considerations and Recommendations on Power Feeding at an 802.9 Interface", Nov. 5, 1987, 6 pages.
International Telecommunication Union, "ISDN User-Network Interfaces—Reference Configurations", Mar. 1993, 11 pages.
International Telecommunication Union, "Basic User-Network Interface—Layer 1 Specification", Mar. 1993, 106 pages.
Pairgain Technologies, Inc., "HiGain Line Unit Quick Installation Guide", Sep. 15, 1998, 28 pages.
Pairgain Technologies, Inc., "HiGain Line Unit Model HLU-231 List No. 8 Installation Guide", Aug. 13, 1999, 78 pages.
Pairgain Technologies, Inc., "HiGain Line Unit Model HLU-319 List No. 4B Installation Guide", Dec. 22, 1997, 56 pages.
Pairgain Technologies, Inc., "HiGain Remote Unit Model HRU-412 List No. 8A Installation Guide", Mar. 31, 1998, 42 pages.
Pairgain Technologies, Inc., "HiGain Remote Unit Model HRU-412 List No. 6 Installation Guide", Oct. 28, 1998, 39 pages.
ADC Telecommunications, Inc., "HiGain HDSL2 Modules Specifications", Feb. 2003, 12 pages.
David Systems, Inc. "David CO-Net Command Reference", 1988, 342 pages.
David Systems, Inc. "David CO-Net Installation Manual", 1988, 228 pages.
David Systems, Inc. "David Systems David Information Manager", Feb. 1985, 38 pages.
David Systems, Inc. "David Information Manager System Description Manual", Mar. 1987, 114 pages.
David Systems, Inc. "David Information Manager Technical Overview", Sep. 1988, 74 pages.
David Systems, Inc. "David CO-Net Technical Reference Manual", 1988, 326 pages.
David Systems, Inc. "David CO-Net Maintenance Manual", 1990, 309 pages.
David Systems, Inc., "David CO-Net Voice and Data Configuration Manual", Oct. 1990, 233 pages.
Verilink Corporation, "ConnecT1 DSU", 1988, 12 pages.
Verilink Corporation, "ConnecT1 DSU (Data Service Unit)", Jul. 28, 1992, 88 pages.
3Com, "AirConnect Access Point User Guide", Jan. 2000, 91 pages.
3Com, "OfficeConnect® ISDN LAN Modem 3C892 User Guide", Feb. 1999, 129 pages.
Cisco Systems, "Catalyst 3000 Highlights", Catalyst 3000 and Catalyst Matrix, 1996, 3 pages.
CiscoPro, "CiscoPro EtherSwitch 1400 Series Modules", Workgroup Solutions, 1995, 2 pages.
Cisco Systems, "Cisco IOS(tm) Software Feature Matrices: Releases 8.3 through 11.2", Product Bulletin—Public #511, 1996, 30 pages.
Cisco, "About This Guide", 1997, 52 pages.
CiscoPro, "CiscoPro EtherSwitch CPW2115", Workgroup Solutions, 1995, 4 pages.
Adtran, "HDSL T200 HTU-R, Span Powered, 60 mA Installation and Maintenance Practice", Apr. 2008, 49 pages.
3Com, "NetBuilder II Intelligent Routers", Routers Routing and VPN Tunneling, 1998, 8 pages.
3Com, "NETBuilder II Features and Benefits", 2000, 8 pages.
3Com Corporation, "ISDN LAN Modem Getting Started Guide", 3Com Office Connect, Jul. 1999, 8 pages.
3Com, "OfficeConnect™ Remote Getting Started Guide", OfficeConnect The Complete Network Solution for Small Offices, Sep. 1997, 36 pages.
Allied Telesyn, "AT-MC101XL, AT-MC102XL, AT-MC103XL, AT-MC103LH Fast Ethernet Media Converters Installation Guide", Allied Telesyn Simply Connecting the World, 1998, 27 pages.
ISO/IEC, "ISO/IEC JTC1 SC25: Information Technology Equipment Working Group I—Home Electronic Systems (HES)", Jun. 16, 1997, 13 pages.
ISO/IEC, "HomeGate: A Residential Gateway Model for HES", ISO/IEC JTC1 SC25 WG1 N7387, Feb. 16, 1998, 7 pages.
ISO/IEC, "HomeGate: A Residential Gateway Model for HES", May 25, 1998, 8 pages.
ISO/IEC, HomeGate: A Residential Gateway Model for HES, rev. 5, Oct. 14, 1998, 14 pages.
ISO/IEC, "xTR 15045-1: Information technology Architecture for Residential Gateways", Dec. 30, 1999, 35 pages.
ISO/IEC, "CD1 15045-01: Information technology—Interconnection of information technology equipment—Architecture for HomeGate, the residential gateway (AHRG)", Apr. 1, 2000, 40 pages.
Crystal Semiconductor Corporation, "Highly-Integrated ISA Ethernet Controller", Dec. 1995, 132 pages.
U.S. Robotics Access Corp., "Courier I-Modem Command Reference", 1996, 219 pages.
Westell, Inc., "Installation Guide—3116-10 Westell DS1 Network Interface Unit with Performance Monitoring", Equipment Issue B, Rev. B, Sep. 2005, 4 pages.
Westell, Inc., "Westell® 3125-52 DS1 Neetwork Interface Unit", Equipment Issue A, Rev. D, Jul. 2008, 12 pages.
ADC Telecommunications, Inc., "Homeworx Access Platform Telephony System", Jul. 1997, 7 pages.
ADC Telecommunications, "ADC Provides Homeworx Telephony System to Nanjing CATV.", Business Wire, Nov. 6, 1997, 2 pages.
ADC Telecommunications, "Homeworx™ Access Platform", 1994, 16 pages.
ADC Telecommunications, "Homeworx™ Access Platform—Overview", 1997, 5 pages.
Cervenka, D., "Building cablephone systems piece by piece, Manufacturerss provide an update", CED: Communications Engineering & Design, Mar. 1996, 6 .pages.
Cablelabs/CCTA, "Unisys Digital Cable Services System", CableNET 1994, 26 pages.
Platt, R., "Why IsoEthernet Will Change the Voice and Video Worlds", IEEE Communications Magazine, Apr. 1996, 5 pages.
Cisco Systems, Inc., "Installing the Cisco RPS Adapter Plate in Cisco 4000 Series Routers", 1997, 14 pages.
Platt, R., "New Standard Helps Multimedia Get Off the Ground", 1996, IEEE, 5 pages.
Platt, R., et al., "Selsius Next Generation Ethernet Phone, Product Requirements Document", 1998, 12 pages.
Selsius Systems Inc., "The Selsius-IP PBX Overview", 1998, 6 pages.
Zgliczynski, C., "Selsius Systems™ 'Converged Platforms for Enterprise Networks'", Jun. 11, 1998, 16 pages.

(56) References Cited

OTHER PUBLICATIONS

Zgliczynski, C., "Selsius Systems™ The Distributed IP PBX", Jun. 8, 1998, 14 pages.
Corley, Dave, "The Selsius-LAN PBX", Oct. 30, 1997, 6 pages.
NetworkWorld, Inc., NetworkWorld Reprint, "PBX spin off takes IP plunge", Sep. 22, 1997, vol. 14, No. 58, 5 pages.
Zgliczynski, C., Selsius Systems™, "IP Telephony Appliances-Next Generation IP Telephony endpoints", 1998, 10 pages.
Droms, R., "Dynamic Host Configuration Protocol", Oct. 1993, 40 pages.
Wimer, W., "Clarifications and Extensions for the Bootstrap Protocol", Oct. 1993, 23 pages.
Efficient Networks, Inc., Product Data Sheet for Internal SpeedStream 3010, 1999, 2 pages.
Efficient Networks, Inc., Product Data Sheet for Internal SpeedStream 3020, 1999, 2 pages.
Efficient Networks, Inc., Product Data Sheet for Internal SpeedStream 3060, 1999, 2 pages.
Efficient Networks, Inc., Product Data Sheet for Standalone SpeedStream 4020 USB Modem, 1999, 2 pages.
Efficient Networks, Inc., Product Data Sheet for Standalone SpeedStream 4041 USB Modem, 1999, 2 pages.
Efficient Networks, Inc., Product Data Sheet for Standalone SpeedStream 4060 USB modem, 1999, 2 pages.
Efficient Networks, Inc., Product Data Sheet for Standalone SpeedStream 5010 Ethernet modem, 1999, 2 pages.
Efficient Networks, Inc., Product Data Sheet for SpeedStream Ethernet DSL modems, SpeedStream 5200 series, 2000, 2 pages.
Efficient Networks, Inc., Product Data Sheet for SpeedStream 5250 SDSL modem, 1999, 2 pages.
Efficient Networks, Inc., Product Data Sheet for SpeedStream5250, 1999, 2 pages.
Efficient Networks, Inc., Product Data Sheet for SpeedStream 5621 Ethernet DSL Router, 1999, 2 pages.
Efficient Networks, Inc., Product Datasheet for SpeedStream 5660 Ethernet DSL Router, 1999, 2 pages.
Efficient Networks, Datasheet for Business Class DSL Routers, 2000, 2 pages.
Efficient Networks, Inc., "SpeedStream 5260 ADSL LAN Modem Installation Guide", 11 pages, 2000.
Efficient Networks, Inc., "SpeedStream 5600 Series ADSL Router Installation Guide", 39 pages, 1999.
Efficient Networks, Inc., "SpeedStream 5861 ADSL Business Class Router Quick Start Guide", 47 pages, 2000.
Efficient Networks, Inc., Product Datasheet for Business Class VoDSL, 2 pages, 2000.
Efficient Networks, Inc., "SpeedStream® DSL USB Modem Installation Guide", 18 pages, 2000.
Aware, "Aware Announces Commercial Availability of the X200 ADSL Access Router at Networld+Interop '97", 3 pages, Oct. 7, 1997.
Aware Inc., Datasheet for x200 ADSL Access Router, 5 pages, Jan. 20, 1993.
3Com, "NETBuilder II® Ethernet 2-Port 10BASE-FL Module Installation Guide", Sep. 1993, 16 pages.
Flowpoint Cabletron Systems, FlowPoint FP2200 SDSL Router Customer Release Notes, Jun. 21, 1999, 5 pages.
Flowpoint Cabletron Systems, "FlowPoint™ Router 2200-12 SDSL Router Quick Start Guide", Mar. 1999, 48 pages.
2Wire, Inc., Datasheet for HomePortal™ 1000, 1999, 2 pages.
Proxim, Inc., Datasheet for Symphony Cordless Ethernet Bridge, 1999, 4 pages.
Pairgain Technologies, PairGain® Technologies HiGain® Doubler Unit Model HDU-451 Issue 1, Section 150-451-132-02, Revision 02, Nov. 13, 1997, 22 pages.
Pairgain Technologies, Inc., "HiGain Line Unit Engineering Services Technical Practice Manual", Dec. 22, 1997, 56 pages.
Verilink Corporation, "ConnecT1 DSU (Data Service Unit)", Jul. 28, 1992, 87 pages.
Verilink Corporation, "Verilink Connect1 DSU Data Service Unit Addendum 3 to User's Manual", Dec. 3, 1990, 72 pages.
Cisco, "EtherSwitch 1420 and EtherSwitch 1220 Reference Manual", 2001, 162 pages.
Selsius Systems Inc., "A Fundamental Shift in Telephony Networks, A White Paper", Mar. 1, 1998, 20 pages.
Selsius Systems, "Corporate Fact Sheet" and "System Overview", Aug. 26, 1998, 34 pages.
Selsius Systems, Inc., "Voice over LAN/WAN Infrastructure", 1997, 14 pages.
Wireless, Inc., "2.4 GHz ACCESS MicroLink™ Operations Manual", Nov. 1998, 107 pages.
Cayman Systems, Inc., Press Release for Cayman Systems ADSL 3220 Router With Alcatel's DynaMiTe ADSL Chipset, Jan. 11, 1999, 3 pages.
Cayman Systems, Inc., Datasheet for ADSL 3220 Router, 2000, 2 pages.
Cayman Systems, Inc., "Getting Started with the Cayman 3220-H", Jan. 2000, 4 pages.
Cayman Systems, Inc., Cayman 3220-H Series Gateways Manual, 2000, 4 pages.
Cayman Systems, Inc., "Getting Started with the Cayman 3220-H-W11", Oct. 2000, 4 pages.
Cervenka, D., "Building cablephone systems piece by piece: Manufacturers provide an update", CED: Communications Engineering & Design, Mar. 1996, 6 pages.
Pairgain Technologies, Inc., HiGain Line Unit Manual, Revision 01, Dec. 22, 1997, 56 pages.
Suranyi, Gabriel G., "The Need for Home Power: It Is Just Around the Corner", IEEE, Jul. 1997, 7 pages.
Verilink Corporation, Datasheet for Connect1 DSU, 1988, 12 pages.
ANSI/IEEE, "Local Area Networks, Carrier Sense, Multiple Access with Collision Detection", Dec. 1984, 146 pages.
Pairgain Technologies Inc., PairGain™ Technologies HiGain-2™ Remote Unit Model HRU-612 Manual, Revision 02, Aug. 21, 1996, 19 pages.
Cisco Systems, Inc., "Cisco 675 ADSL Router Installation and Operation Manual", Version 2.0.0, Aug. 1998, 118 pages.
Cisco Systems, Inc., Cisco 675 SOHO/Telecommuter ADSL Router Data Sheet, 1999, 3 pages.
Cisco Systems, Inc., Cisco 675e Small Office Home Office/Telecommuter ADSL Router Data Sheet, 1999, 3 pages.
Cisco Systems, Inc., Cisco 678 Small Office/Home Office/Telecommuter ADSL Router Data Sheet, 2000, 3 pages.
Cisco Systems, Inc., "Cisco Aironet 340 Series LAN Wireless Solutions", Mar. 20, 2000, 24 pages.
Cisco Systems, Inc., Cisco Aironet 340 Series Client Adapters and Access Points-In-Building Wireless Solutions Data Sheet, 2000, 7 pages.
Cisco Systems, Inc., "Quick Start for The Cisco ADSL 675 Router", 1998, 2 pages.
Cisco Systems, Inc., "Release Notes for Cisco Aironet 340 Series Access Points", Apr. 4, 2000, 8 pages.
American National Standards Institute, Inc., "American National Standards for Telecommunications—Network and Customer Installation Interfaces—Asymmetric Digital Subscriber Line (ADSL) Metallic Interface", Nov. 11, 1998, 264 pages.
AT&T, "ISDN Installation and Test Manual", Issue 3, Feb. 1993, 313 pages.
IEEE Computer Society, "IEEE Standards for Local and Metropolitan Area Networks: Supplement to Integrated Services (IS) LAN Interfact at the Medium Access Control (MAC) and Physical (PHY) Layers: Specification of ISLAN16-T", Feb. 16, 1996, 344 pages.
Cervenka, D., "When Will Cablephone Ring?", Communication Engineering & Design Magazine, Mar. 1995, 8 pages.
Cisco Systems, Inc., "Cisco 4000 Series", 1996, 37 pages.
David Systems, Inc., "David CO-Net System Administrator's Guide", 1991, 187 pages.
Stallings, W., "Local Networks Third Edition", 1990, 534 pages.
Dunsmore, B., et al., "Telecommunications Technologies Reference", Cisco Systems, May 2009, 640 pages.

(56) References Cited

OTHER PUBLICATIONS

The Institute of Electrical and Electronics Engineers, Inc., "IEEE Standards for Local and Metropolitan Area Networks: Supplement to Carrier Sense Multiple Access with Collision Detection (CSMA/CD) Access Method and Physical Layer Specifications. Media Access Control (MAC) Parameters, Physical Layer, Medium Attachment Units, and Repeater for 100 Mb/s Operation, Type 100BASE-T (Clauses 21-30)", 1996, 415 pages.

Correia, A., et al., "SnmpMan 1.1 Instructions", University of Lisbon Faculty of Sciences, Jun. 13, 1994, 3 pages.

Burroughs, RS, "A Point of Entry Interface for 2-Way Broadband Information Delivery", Panasonic Technologies, Inc., 1993 NCTA Technical Papers, pp. 52-61.

Haug, C., "DLC Technology Update", Telephony, Jun. 8, 1992, 4 pages.

Lyford, R., et al., "Telephony over cable: CISN and CLC-500", Communications Technology, Dec. 1993, 4 pages.

Best, A., "Preparing for the future: How much bandwidth and fiber is enough?", Communications Technology, Jan. 1994, 5 pages.

Pinkham, R., "Combining apples and oranges: The modern fiber/coax network—Part 2 of a four-part series", Telephony, Feb. 7, 1994, 5 pages.

Pinkham, R., "Combining apples and oranges: The modern fiber/coax network—Part 3 of a four-part series", Telephony, Feb. 21, 1994, 4 pages.

* cited by examiner

FIGURE 1 (PRIOR-ART)

FIGURE 2 (PRIOR-ART)

FIGURE 3 (PRIOR-ART)

FIGURE 4 (PRIOR-ART)

NETWORK COMBINING WIRED AND NON-WIRED SEGMENTS

CROSS-REFERENCE TO RELATED APPLICATION

This application is a divisional of U.S. application Ser. No. 11/128,229, filed on May 13, 2005, now U.S. Pat. No. 7,633,966, issued: Dec. 15, 2009; which is a continuation of U.S. application Ser. No. 10/998,015, filed on Nov. 29, 2004, now U.S. Pat. No. 7,933,297, issued: Apr. 26, 2011; which is a continuation of U.S. application Ser. No. 10/890,199, filed on Jul. 14, 2004; which is a continuation of U.S. application Ser. No. 09/552,564, filed on Apr. 19, 2000, now U.S. Pat. No. 6,842,459, issued: Jan. 11, 2005, the disclosures of which are incorporated herein by reference.

FIELD OF THE INVENTION

The present invention relates to the field of communication networks, and, more specifically, to the networking of devices within a building via combined wired and non-wired communication.

BACKGROUND OF THE INVENTION

There is a growing need for networking within the home. This need is driven by two major factors, the increasing use of multiple data devices and the emergence of broadband services in the home.

Lately there has been an expansion in the number of homes in the USA with multiple personal computers. In addition, connectivity and networking capabilities have been added to appliances, such as refrigerators and microwave ovens. Furthermore, there is a trend toward enabling data connectivity among various multimedia (audio and video) appliances such as TV's, VCR's, receivers, and speakers. The term "data unit" as used herein denotes any device capable of generating and/or receiving data. The networking of data units enables the sharing of files and applications as well as the sharing of common peripheral devices, along with other benefits.

Another driving force behind the need for home connectivity products is the growth in the number of on-line households. As high-speed connections to information and broadband entertainment sources soar, there is a growing need to share and distribute this access among appliances within the house. These broadband services are supplied mainly by three types of service providers:

1. Telco's, via xDSL connections (currently ADSL, to be followed by VDSL).
2. CATV. Currently via Cable-Modem, to be followed by digital Set-Top-Box.
3. Wireless connections, such as Satellite, LMDS, WLL, and others.

Communication within a home can be classified into two types: wired and non-wired.
These are covered below:

Wired Communication

Wired communication requires using at least two distinct electrical conductors. The wiring can be new wiring installed and dedicated for data communication within the home, such as installing structured wiring such as Category 5 type, used in Ethernet IEEE802 networks. However, the installation of a new wiring structure within a home is labor-intensive, complex, and expensive. Alternatively, existing home wiring, which was previously installed for a specific purpose, can be used for data communication without substantially affecting or degrading the original service. Existing wiring includes telephone wiring, power line wiring, and cable TV wiring. These are reviewed below.

For all wired configurations, the present invention relies upon electrically-conducting lines which may be pre-existing within a building, which have at least two distinct electrical conductors, and which are capable of transporting data communication signals. Furthermore, the present invention relies upon suitable outlets, to which the electrically-conducting lines are coupled, and which are capable of connecting to external devices.

Telephone Wiring

In-home telephone service usually employs two or four wires, and is accessed via telephone outlets into which the telephone sets are connected.

FIG. 1 shows the wiring configuration of a prior-art telephone system 10 for a residence or other building, wired with a telephone line 5. Residence telephone line 5 consists of single wire pair which connects to a junction-box 16, which in turn connects to a Public Switched Telephone Network (PSTN) 18 via a cable 17, terminating in a public switch 19, which establishes and enables telephony from one telephone to another. The term "analog telephony" as used herein denotes traditional analog low-frequency audio voice signals typically under 3 KHz, sometimes referred to as "POTS" ("Plain Old Telephone Service"), whereas the term "telephony" in general denotes any kind of telephone service, including digital service such as Integrated Services Digital Network (ISDN). The term "high-frequency" as used herein denotes any frequency substantially above such analog telephony audio frequencies, such as that used for data. ISDN typically uses frequencies not exceeding 100 KHz (typically the energy is concentrated around 40 Khz). The term "telephone line" as used herein denotes electrically-conducting lines which are intended primarily for the carrying and distribution of analog telephony, and includes, but is not limited to, such electrically-conducting lines which may be pre-existing within a building and which may currently provide analog telephony service. The term "telephone device" as used herein denotes, without limitation, any apparatus for telephony (including both analog telephony and ISDN), as well as any device using telephony signals, such as fax, voice-modem, and so forth.

Junction box 16 is used to separate the in-home circuitry from the PSTN and is used as a test facility for troubleshooting as well as for wiring new in the home. A plurality of telephones 13a and 13b connects to telephone lines 5 via a plurality of telephone outlets 11a, 11b, 11c, and 11d. Each outlet has a connector (often referred to as a "jack"), denoted in FIG. 1 as 12a, 12b, 12c, and 12d, respectively. In North-America, RJ-11 is commonly used. Each outlet may be connected to a telephone unit via a connector (often referred to as a "plug"), denoted in FIG. 1 (for the two telephone units 13a and 13b illustrated) as 14a and 14b, respectively. It is also important to note that lines 5a, 5b, 5c, 5d, and 5e are electrically the same paired conductors.

While network 10 exhibits serial or daisy-chained topology wherein the wiring is serialized from an outlet the next one only, other topologies such as star, tree or any arbitrary topology may also exist. However, the telephone wiring system within a residence is always composed of wired media: two or four copper wires, and several outlets which provides direct access for connecting to these wires.

There is a requirement for simultaneously using the existing telephone infrastructure for both telephone and data networking. In this way, the task of establishing a new local area network in a home or other building is simplified, because there would be no additional wires to install. U.S. Pat. No. 4,766,402 to Crane (hereinafter referred to as "Crane") teaches a way to form LAN over two-wire telephone lines, but without the telephone service.

As an another example, relevant prior-art in this field is disclosed in U.S. Pat. No. 5,896,443 to Dichter (hereinafter referred to as "Dichter"). Dichter suggests a method and apparatus for applying frequency domain/division multiplexing (FDM) technique for residential telephone wiring, enabling simultaneously carrying telephone and data communication signals. The bandwidth enabled by the wiring is split into a low-frequency band capable of carrying an analog telephony signal and a high-frequency band capable of carrying data communication signals. In such mechanism, the telephone service is not affected, while data communication capability is provided over existing telephone wiring within a home.

The concept of frequency domain/division multiplexing (FDM) is well-known in the art, and provides means of splitting the bandwidth carried by a wire into a low-frequency band capable of carrying an analog telephony signal and a high-frequency band capable of carrying data communication or other signals. Such a mechanism is described, for example, in U.S. Pat. No. 4,785,448 to Reichert et al. (hereinafter referred to as "Reichert"). Also widely used are xDSL systems, primarily Asymmetric Digital Subscriber Loop (ADSL) systems.

The Dichter network is illustrated in FIG. 2, which shows a network 20 serving both telephones and providing a local area network of data units. Data Terminal Equipment (DTE) units 24a, 24b, and 24c are connected to the local area network via Data Communication Equipment (DCE) units 23a, 23b, and 23c, respectively. Examples of Data Communication Equipment include modems, line drivers, line receivers, and transceivers (the term "transceiver" herein denotes a combined transmitter and receiver). DCE units 23a, 23b, and 23c are respectively connected to high pass filters (HPF) 22a, 22b, and 22c. The HPF's allow the DCE units access to the high-frequency band carried by telephone-line 5. In a first embodiment (not shown in FIG. 2), telephones 13a, 13b, and 13c are directly connected to telephone line 5 via connectors 14a, 14b, and 14c, respectively. However, in order to avoid interference to the data network caused by the telephones, in a second embodiment (shown in FIG. 2) low pass filters (LPF's) 21a, 21b, and 21c are added to telephones 13a, 13b, and 13c from telephone line 5. Furthermore, a low pass filter is also connected to Junction Box 16, in order to filter noises induced from or to the PSTN wiring 17. It is important to note that lines 5a, 5b, 5c, 5d, and 5e are electrically the same paired conductors.

Additional prior-art patents in this field can be found under US Class 379/093.08, which relates to carrying data over telephone wiring without any modifications made to the telephone wiring (e.g. wires and outlets). U.S. Pat. No. 5,841,360 and U.S. patent application Ser. Nos. 09/123,486 and 09/357, 379 to the present inventor are the first to suggest modifying the telephone wiring, by means of splitting the wiring into distinct segments, each of which connects two telephone outlets. In this way, the network is modified from 'bus' topology into multiple 'point-to-point' segments, enabling superior communication characteristics.

Part of such a network 30 is shown in FIG. 3, describing outlets 31a and 31b, substituting outlets 11 of FIGS. 1 and 2. The telephone wiring 5 is split into distinct segments 5a, 5b and 5c. Low-Pass Filter (LPF) and High-Pass Filters (HPF) are coupled to each wire segment end, in order to split between the telephony and the data signals. As shown in FIG. 3, LPF's 21b and 21c are attached to each end of wiring segment 5b. The LPF's are designed to allow passing of the telephony signals, and are connected together thus offering a continuous path for the telephony signals. Access to the telephony signals is made via connectors 12a and 12b in the outlets, into which telephone devices 13a and 13b are connected via connectors 14a and 14b respectively. Thus, the telephony service is fully retained. The data signals, carried in the high part of the spectrum, are accessed via HPF's 26a and 22b, coupled to each end of the telephone wire segment 5b. HPF's 22a and 26b are connected to the ends of the wire segments 5a and 5c respectively. Each HPF is connected to a modem 23 and 27, which transmit and receive data signals over the telephone wiring. Modems 23a, 27a, 23b, and 27b are connected to HPF's 22a, 26a, 22b and 26b respectively. Data units 24a and 24b are connected to the outlets 31a and 31b respectively, via a connector (not shown in the Figure) in the outlet. The data units are coupled via DTE interface in the outlet. Outlets 31a and 31b comprise DTE interfaces 29a and 29b respectively. The three data streams in each outlet, two from each modem and one from the DTE, are handled by an adapter 28a and an adapter 28b, which serve outlets 31a and 31b, respectively. While FIG. 3 describes an embodiment wherein all the components for the relevant functions are housed within the outlet, other embodiments are also possible, wherein only some of the components for these functions are contained within the outlet.

Power Lines

It is possible to transmit data over wiring used for distribution of electrical power within the home, which is normally at a frequency of 50 or 60 Hz. Access to the power is available via power outlets distributed around the house. Such wiring consists of two wires (phase and neutral) or three wires (phase, neutral, and ground).

FDM techniques, as well as others, are used for enabling data communication over power lines. Many prior-art patents in this field can be found in US Class 340/310.

Cable Television Lines

It is also possible to transmit data over wiring used for the distribution of television signals within the home. Such wiring usually is coaxial cable.

Both power line and cable television wiring systems resemble the telephone line structure described in FIG. 1. The wiring system is based on conductors, usually located in the walls, and access to these wires is obtained via dedicated outlets, each housing a connector connected directly to the wires. Common to all these systems, is the fact that the wiring was installed for a dedicated purpose (telephone, power, or cable TV signal distribution). Wherever one of these existing wiring systems is used for carrying data, it is desirable that the original service (telephony, power, or television signal distribution) be unaffected. Dedicated modems are used for carrying data over the media concurrently with the original service.

When using existing wiring, specific wired modems are normally required for communicating over the electrically-conducting lines, and access to the electrically-conducting lines is provided via the relevant outlets. Using electrically-conducting lines as the communication media allows for high bandwidth, and provides robust and cost-effective communication. In addition, communication over large distances is possible, which in most cases enables coverage of the whole house, thereby guaranteeing communication from any outlet to another within the house.

Such networks, however, require data units to be connected to the outlets, usually by means of a cable from the data unit to a suitable nearby outlet. This makes the connection complex and hard-to-use, requires the data unit to be in proximity to an appropriate outlet, and impairs mobility for some data units within the house.

Non-Wired Communication

Non-wired solutions for in-home data networking use waves propagated without an electrically-conducting medium. Three main techniques are commonly used:
1. Radio Frequency (RF). Transmission of data between data units can be accomplished with radio frequency electromagnetic signals. As an example, IEEE802.11 can be used.
2. Light. Transmission of data between data units can be accomplished with light in the visible or non-visible spectrum. Currently, the most popular is infrared (IR) based communication. Most such systems require 'line-of-sight' placement of the communicating data units.
3. Sound. Transmission of data between data units can be accomplished with sound waves, either in the audio spectrum (20-20,000 Hz), or inaudible spectrum (ultrasonic, above 20,000 Hz; or infrasonic, below 20 Hz).

It is noted that although light and radio waves are both electromagnetic phenomena, they occupy different parts of the electromagnetic spectrum and have significantly different characteristics for purposes of the present invention. Thus, light and radio waves are herein treated as distinct physical phenomena.

An example of a non-wired data network 40 is shown in FIG. 4. Two data units 41a and 41b are shown, into which non-wired transceivers 42a and 42b are respectively coupled. The non-wired transceivers 42a and 42b communicate over a space 43 without any electrically-conducting medium. If RF transmission is used, the transceivers are RF transceivers, and the communication over space 43 is based on the propagation of radio frequency electromagnetic waves. Similarly, in the case of light-based communication, transceivers 42a and 42b utilize light emitters (e.g. LEDs) and light detectors (e.g. photoelectric cell), and the communication over space 43 relies on the propagation of light. Likewise, in the case of sound-based communication over space 43, the transceivers use microphones and speakers, and the communication relies on the propagation of sound waves through the air in the space 43.

Since these solutions do not require any physical connection such as cable, they provide both ease-of-use and mobility. However, such non-wired solutions are effective over short distances only. Furthermore, most of the non-wired solutions cannot easily pass through walls and other such obstructions, owing to the attenuation to the signals. Hence, such techniques are suitable for communication within a single room, but are not suitable for communication between the rooms of a home or other building.

There is thus a widely recognized need for, and it would be highly advantageous to have, a means for implementing a data networking in-home between data units, wherein such data units can be networked within a home or other building, while providing mobility and ease of use. This goal is met by the present invention.

SUMMARY OF THE INVENTION

The present invention discloses a data communication network within a building having wired and non-wired segments. The wired segments are based on electrically-conducting lines installed within the building. In addition to supporting data communication, these electrically-conducting lines concurrently distribute a primary service other than the transport of data communication signals, such as telephone service, electrical power service, or cable television service, and may be pre-existing wires originally-installed to distribute the primary service. Dedicated outlets are used to enable direct access to the wiring. The present invention uses means for utilizing the electrically-conducting lines concurrently for both the transport of data communication signals and the primary service, without any interference between these two uses. The non-wired segments employ communication without electrically-conducting media, via waves propagated through open space, such as by light or radio waves, or by acoustic waves in air.

The wired and non-wired segments are combined by means of circuitry in one or more outlets. The coupling device is a module containing one port for coupling to the wired network using a specific wired modem. Another port of the device couples to the non-wired segment, using a non-wired modem. An adapter handles the data flow between the wired segment and the non-wired segment, and has provision for protocol conversion, if required.

The module coupling both segments, or any of the components of the module, can be fully integrated into the outlet, partially integrated into the outlet, or externally coupled to it.

Therefore, according to the present invention there is provided a local area network within a building for transporting data among a plurality of data units, the local area network including at least one wired segment and at least one non-wired segment, wherein the at least one wired segment includes: (a) at least one electrically-conducting line within the building, the electrically-conducting line having at least two conductors and operative to transport data communication signals; (b) at least two outlets, each operative for coupling to the electrically-conducting line; and (c) at least one wired modem coupled to the electrically-conducting line, operative to communicate over the electrically-conducting line; (d) and wherein the at least one non-wired segment is operative to communicating data without electrically-conducting media and includes at least one non-wired modem, wherein at least one of the outlets couples a wired segment to a non-wired segment, and wherein the at least one electrically-conducting line is furthermore operative for concurrently distributing a service other than the transport of data communication signals.

BRIEF DESCRIPTION OF THE DRAWINGS

The invention is herein described, by way of example only, with reference to the accompanying drawings, wherein.

DETAILED DESCRIPTION OF THE INVENTION

Figure 1:
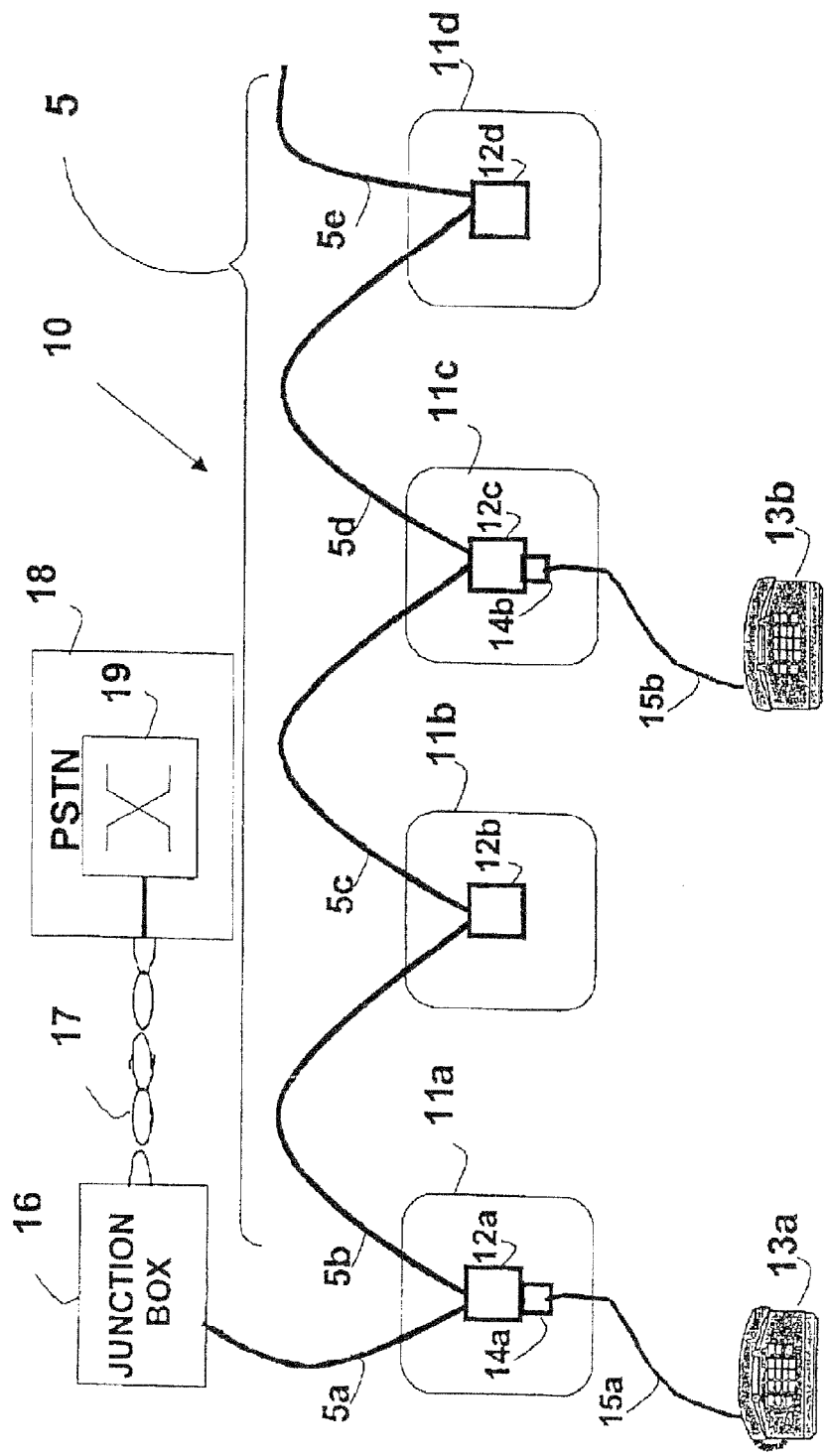
FIG. 1 shows a common prior art telephone line-wiring configuration for a residence or other building.
Figure 2:
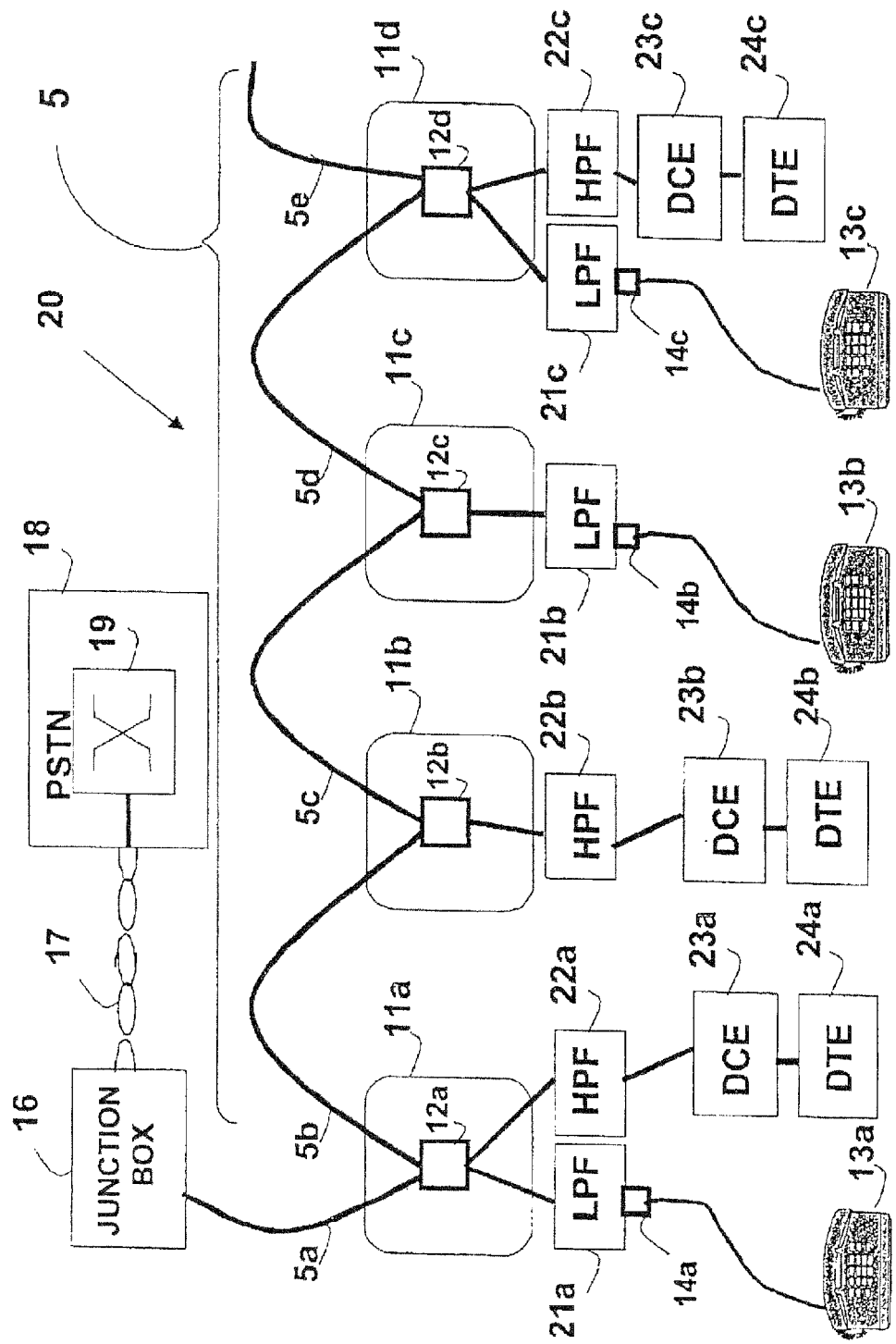
FIG. 2 shows a first prior art local area network based on telephone line wiring for a residence or other building.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components that are common to different embodiments or configurations.

Figure 5:
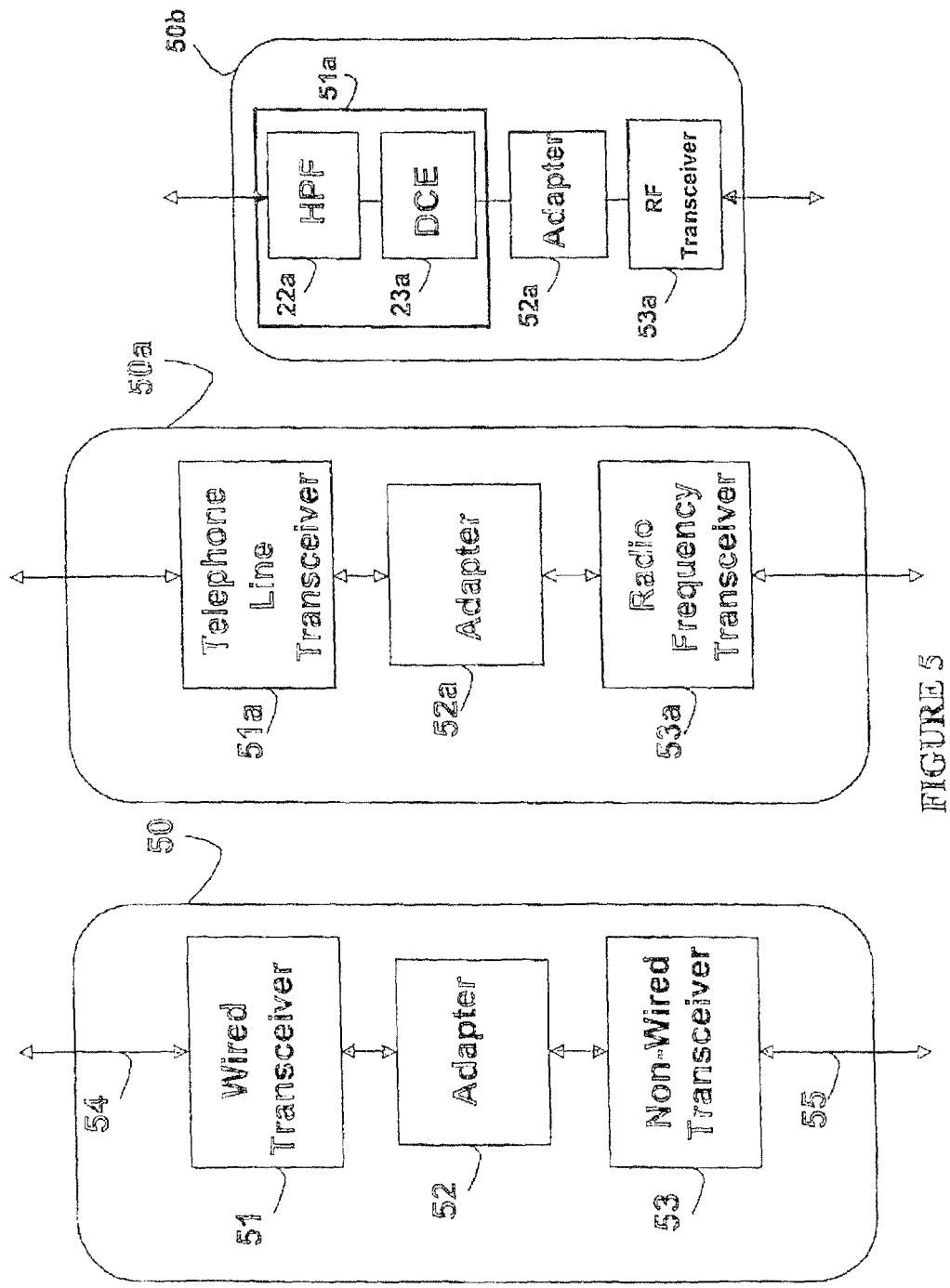
FIG. 5 shows modules according to the present invention.

The invention is based on a wired/non-wired network adapter module (hereinafter referred to as "module"). A functional description of such a module 50 is shown in FIG. 5. The module comprises a physical port 54 for connecting to the wired network. The communication with the wired network is carried by wired transceiver 51. Wired transceiver port 54 and transceiver 51 are dependent upon the type of wired network. Interfacing a telephone line-based network requires a telephone line transceiver, while connecting to a power line network requires a power line dedicated modem. Additionally, the connection to the wired network may require specific means in order to meet regulatory and safety requirements, as well as specific means for ensuring that the basic service (e.g. telephony service, power distribution) is not substantially degraded or affected.

The non-wired segment interfaces via a port 55. Port 55 communicates without an electrically conducting medium. Communication with this non-wired segment is handled by a non-wired modem/transceiver 53. The term "non-wired modem" herein denotes any device capable of data communication without requiring an electrically conducting medium. The data to and from the wired segment and the data to and from the non-wired segment are handled by a protocol adapter 52. Protocol adapter 52 may serve as a transparent unit, acting as a repeater/regenerator, dealing with the physical layer only of the OSI model. However, higher layers can also be handled by the protocol adapter 52. In such a case, the protocol adapter will function as a bridge, router, gateway or any other adaptation mechanism as required.

Other facilities of module 50 may contain logic, control, processing, storage, power-supply and other components not shown in FIG. 5. The communication supported by module 50 can be simplex (unidirectional, either from the wired towards the non-wired segment or vice-versa), half-duplex, or full duplex. A module 50a connects a telephone line network segment to an RF network segment. Module 50a employs a telephone line modem 51a as the wired network interface, a radio-frequency modem 53a as an interface to the non-wired network segment, and a protocol adapter 52a. A module 50b is an embodiment of the present invention, in which the telephone line transceiver can be implemented by a high-pass filter (HPF) 22a and data terminal equipment (DCE) 23a, as also used by Dichter as discussed previously.

Figure 6:
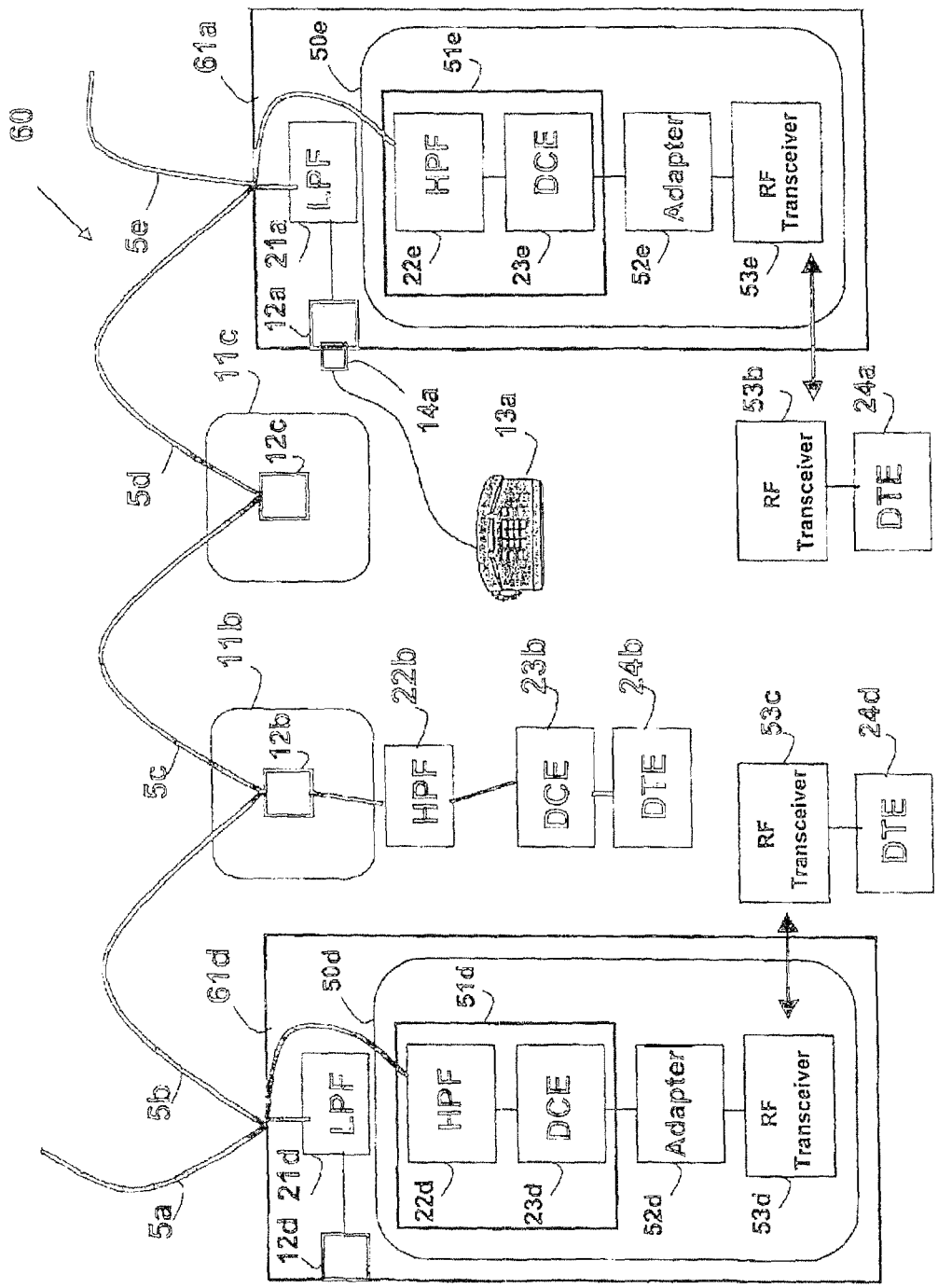
FIG. 6 shows a local area network according to the present invention, wherein telephone wiring used for the wired segment and radio-frequency communication for the non-wired segment.

FIG. 6 shows an embodiment of a network 60 according to the present invention that includes wired and non-wired segments. The wired segment is based on telephone wiring 5 within a building as described in FIG. 1. While outlets 11b and 11c are unchanged, outlets 11a and 11d are replaced by outlets 61d and 61a, respectively, containing modules 50d and 50e respectively. Basic telephone service is retained by employing low-pass filters (LPF) 21d and 21a in outlets 61d and 61a respectively. The LPF's are coupled to telephone connectors 12d and 12a respectively, enabling connection of telephone devices. This is illustrated by a telephone 13a connected by connector 14a to connector 12a in outlet 61a. A Dichter-type data communication network is established by connecting data terminal equipment (DTE) via a modem and HPF, as illustrated by DTE 24b connected to DCE 23b, which is coupled to HPF 22b, which is in turn directly coupled to telephone wiring 5 via connector 12b in outlet 11b.

The non-wired part of network 60 is based on radio frequency transmission, utilizing a pair of RF transceivers 53 (FIG. 5). As shown in FIG. 6, DTE's 24d and 24a are coupled to RF transceivers 53c and 53b, respectively. In turn, each such RF transceiver communicates with RF transceivers 53d and 53a, respectively, which are integrated within outlets 61d and 61a, respectively.

Integrating the wired and non-wired segments of the network is accomplished by modules 50d and 50e, each of which is illustrated by module 50c in FIG. 5. Modules 50d and 50e are integrated within outlets 61d and 61a, respectively. Each such module interfaces the wired segment of the network by a telephone modem. Each such modem contains a high-pass filter 22 and DCE 23, as described previously for a Dichter-type network. Interfacing to the non-wired segment of network 60 is performed via an RF transceiver, wherein modules 50d and 50e comprises RF transceivers 53d and 53e respectively. Protocols and data conversion between both segments are performed by adapter 52 (FIG. 5), wherein adapters 52d and 52e are integrated within modules 50d and 50e respectively.

Network 60 allows DTE's 24d, 24b and 24a to communicate among themselves. While DTE 24b is connected to the network via a wired connection, DTE's 24d and 24a can communicate in a non-wired manner. While FIG. 6 illustrates a single DTE connected by wires and two DTE's connected without wires, it is obvious that any number of DTEs of each type can be connected. Furthermore, while in network 60 each outlet supports a single wired or non-wired DTE connection, other implementations can also be supported. For example, an outlet can provide one or more wired connections simultaneously with one or more non-wired connections.

While FIG. 6 illustrates the case where module 50 is integrated in an outlet 61, embodiments of the present invention also include those wherein the module is external to the outlet. Similarly, selective parts of a module may be integrated within an outlet while other parts are external. In all cases, of course, appropriate electrical and mechanical connection between the module and the outlet are required.

A network outlet is physically similar in size, shape, and overall appearance to a standard outlet, so that a network outlet can be substituted for a standard outlet in the building wall. No changes are required in the overall telephone line layout or configuration.

Network 60 provides clear advantages over hitherto proposed networks. For example, DTEs (e.g. PC's) located in different rooms can interconnect without the need to use any wires. A radio-frequency transceiver in each DTE communicates with the nearest outlet, and the outlets communicate between rooms over the telephone wiring media.

Figure 3:
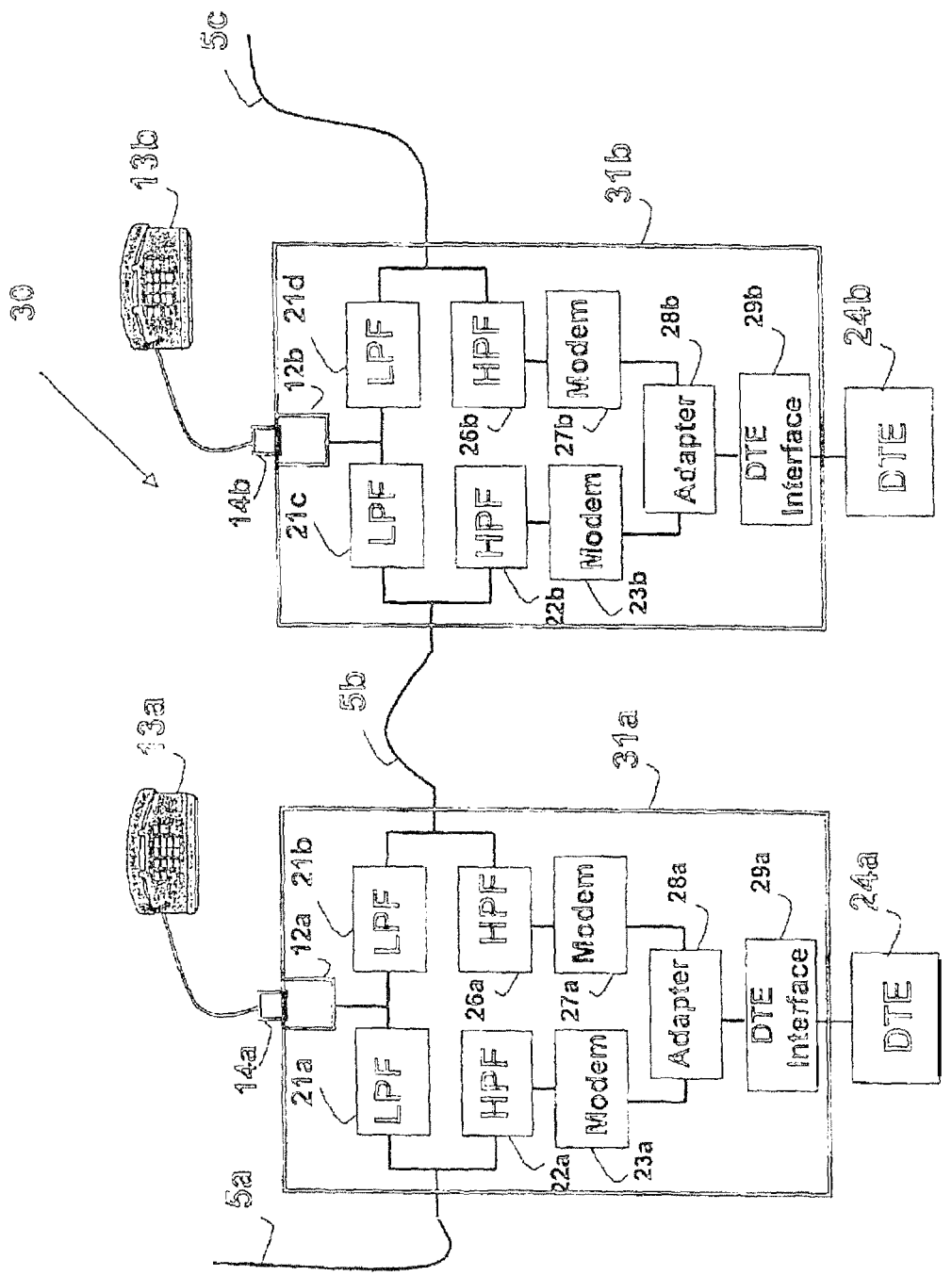
FIG. 3 shows a second prior art local area network based on telephone line wiring for a residence or other building.
Figure 4:
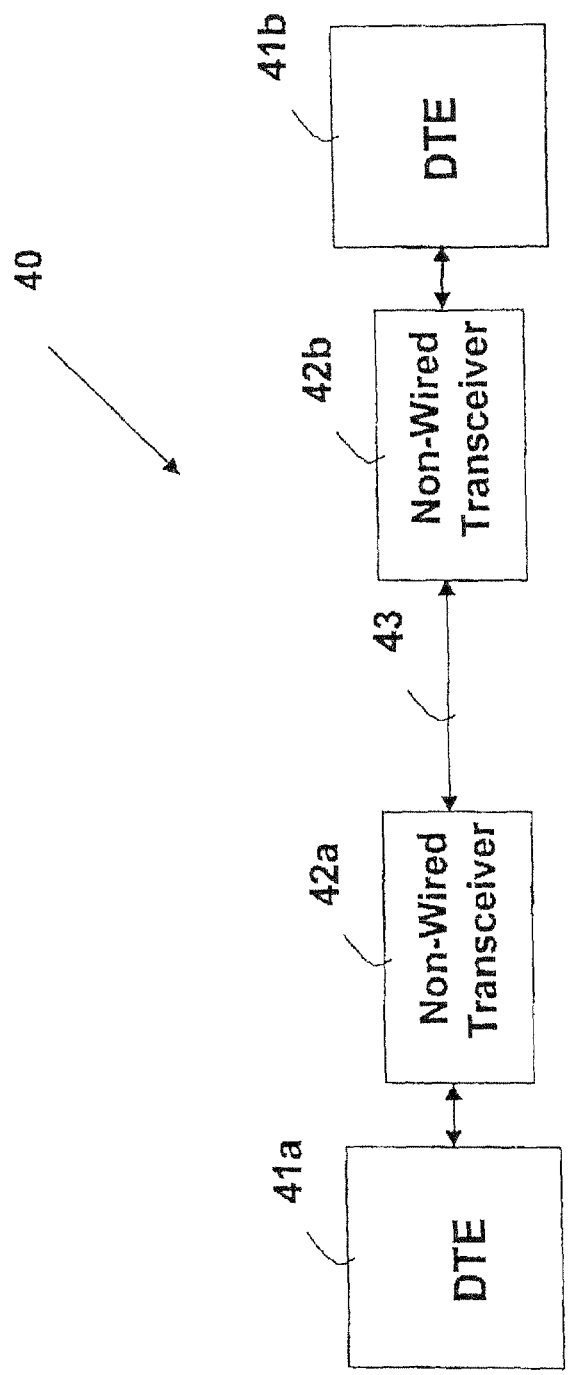
FIG. 4 shows a prior art non-wired communication network.
Figure 7:
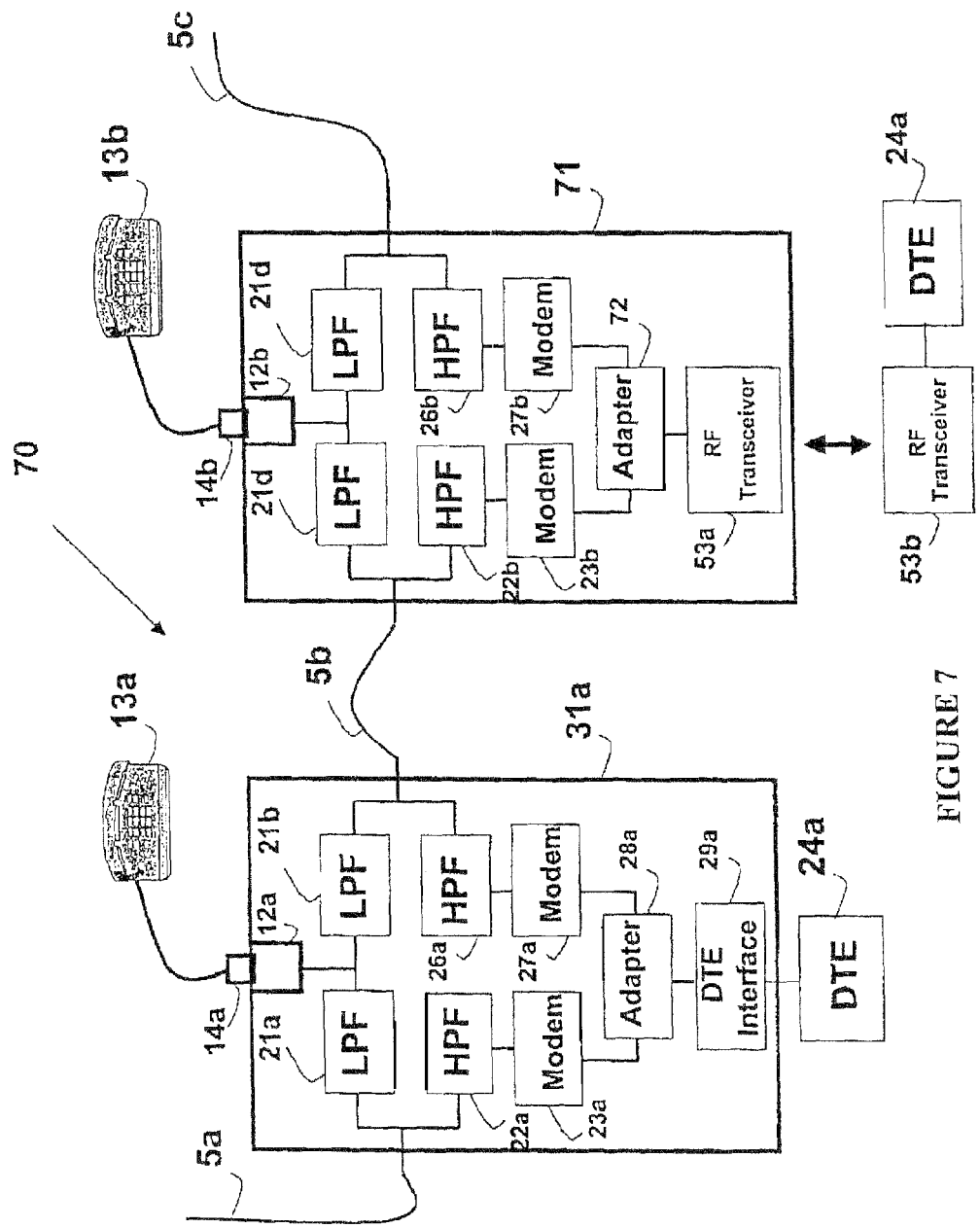
FIG. 7 shows a second embodiment of a local area network based on telephone lines as the wired segment and radio frequency communication for the non-wired segment.

The invention can equally well be applied to the prior art wired network illustrated in FIG. 3. FIG. 7 shows part of a network 70. Outlet 31a represents a prior-art network outlet. In order to interface to the non-wired network segments, an outlet 71 according to the present invention must be used. With the exception of RF transceiver 53a within outlet 71, which communicates with RF transceiver 53b connected to a DTE 24a, outlet 71 is similar to outlet 31a. In this embodiment, the module includes two telephone line modems 23b and 27b, a three-port adapter 72 (for the two wired ports and the single non-wired port), and RF transceiver 53a. The advantages offered by the prior-art topology apply also for this configuration.

While the present invention has been described above for the case where the wired media is based on a telephone line system and includes telephone wires and telephone outlets, the present invention can equally well be applied to other wired systems such as those based on power and cable television signal distribution. In the case of an electrical power distribution system, the electrical wires and outlets employed for power distribution in the house are used. Similarly, cable television wiring and outlets can also be used. In all cases, it may be necessary to retain the basic service for which the wiring systems were installed: telephony service, electrical power distribution, or television signals. This is usually achieved by adding the appropriate circuitry to separate the data communication network from the basic service, as well as to avoid interference of any kind between the two roles currently employing the same wiring. For example, the LPF's 21a, 21b, 21c, and 21d; and HPF's 22a, 22b, 26a, and 26b (FIG. 7) serve the role of separating the telephony service from the data communication network and vice-versa.

While the present invention has been described above for the case wherein the non-wired communication is accomplished by radio-frequency transmission, the present invention can be equally applied to other types of non-wired communication, such as:

1. Non-wired communication accomplished by other forms of electromagnetic transmission. Electromagnetic waves in various parts of the electromagnetic spectrum can be used for communication. For example, low-frequency electromagnetic radiation can be used to transmit audio-frequency signals over short distances without a carrier. Radio-frequency transmission is a special case of this general electromagnetic transmission. As noted previously, light is also a special case of electromagnetic radiation, but is herein treated separately because of the characteristics of light are distinctly different from those of electromagnetic transmission in other usable parts of the electromagnetic spectrum.
2. Non-wired communication accomplished by light. Either visible or non-visible light wavelength can be used for such transmission. As previously noted, currently, the most popular is infrared (IR) based communication. Most such systems require substantially 'line-of-sight' access.
3. Non-wired communication accomplished by sound. Either audible sound (20-20,000 Hz band), or inaudible sound (ultrasonic, above 20,000 Hz; or infrasonic, below 20 Hz).

In addition to the described data communication function, the network according to the present invention can also be used for control (e.g. home automation), sensing, audio, or video applications, and the communication can also utilize analog signals (herein denoted by the term "analog communication"). For example, a video signal can be transmitted in analog form via the network.

Upgrade Kit

Figure 8:
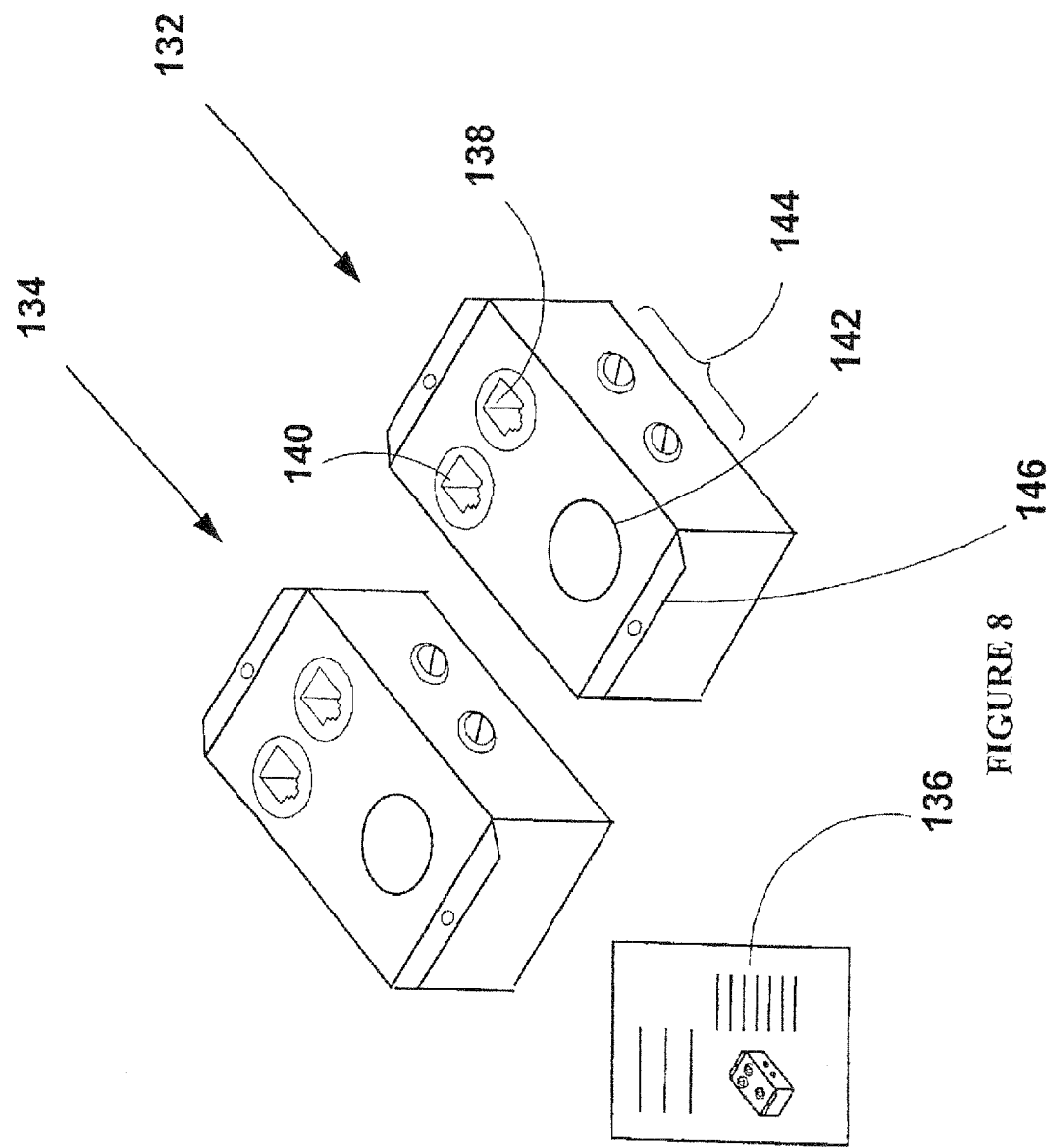
FIG. 8 shows a kit for upgrading existing electrically-conducting lines to support a network according to the present invention.

The present invention also contemplates a kit for upgrading existing electrically conducting lines to support a network as described above. FIG. 8 illustrates an embodiment of such a kit containing an outlet 132 and an outlet 134 and installation instructions 136. Outlet 132 has connection 144 for coupling to a wired segment and mounting points such as a flange 146 for installing in the building walls. Outlet 132 also has a jack 138 and a jack 140 for connecting to external devices via cables, and a transducer 142 for connecting to external data units via a non-wired segment. Within outlet 132 is a module according to the present invention, as previously described and illustrated in FIG. 5. In one embodiment, transducer 142 is a radio frequency transceiver. In another embodiment, transducer 142 is a combined light-emitting diode and photocell receiver. In still another embodiment, transducer 142 is a combined speaker and microphone. Likewise, in one embodiment, jack 138 is a telephone jack. In another embodiment, jack 138 is an electrical power socket. In still another embodiment, jack 138 is a cable television jack. In one embodiment, jack 140 is a data jack. The embodiment of the kit illustrated in FIG. 8 has two outlets, outlet 132 and outlet 134, which are illustrated as substantially identical. However, in another embodiment, the kit contains only outlet 132. In still another embodiment, outlet 134 does not contain a transducer. Other variations are also possible in different embodiments.

It will also be appreciated that the outlet and the adapter module may be provided as separate components for use in upgrading existing wiring of a building to support a local area network having at least one wired segment and at least one non-wired segment. They may likewise find independent use for further expanding a hybrid network that has previously been upgraded according to the invention. Such an outlet is provided with a first coupler for coupling the outlet to the at least one non-wired segment, and a second coupler for coupling the outlet to the existing wiring via an adapter module. The adapter module may be either fully or partially integrated within the outlet.

A method for upgrading existing electrically conducting lines within a building to support a network according to the present invention involves:
(a) providing a wired modem;
(b) providing a non-wired modem;
(c) providing an adapter for handling the data communications between a wired segment and a non-wired segment; and
(d) providing an outlet, and
(e) equipping the outlet with the wired modem, the non-wired modem, and the adapter.

While the invention has been described with respect to a limited number of embodiments, it will be appreciated that many variations, modifications and other applications of the invention may be made.

What is claimed:

1. A communication apparatus for adapting existing in-building telephone lines for data communication, said apparatus comprising a module electrically and mechanically attachable to a wall-mounted telephone outlet, said module comprising a housing containing:
   (a) a telephone modem configured for bidirectional digital data communication to and from telephone lines leading from the outlet in accordance with a first communications protocol;
   (b) an RF modem configured for bidirectional wireless digital data communication to and from a receiver inside an area of the building near the outlet in accordance with a second communications protocol; and
   (c) a protocol adapter coupling the telephone modem and the RF modem.

2. The apparatus according to claim 1, wherein said wireless communication is based on IEEE802.11 standard.

3. The apparatus according to claim 1, wherein said module is further connectable to a telephone unit, and said module further comprises:

a first telephone connector by which said module is attachable to the outlet, said telephone connector being connected to said telephone modem;

a low pass filter coupled to said telephone connector for passing only telephone signals; and a second telephone connector coupled to said low pass filter and connectable to the telephone unit, for coupling the telephone signals to the telephone unit.

4. The apparatus according to claim 1, wherein said module is further connectable to a wired data unit, and said module further comprises:

a data connector connectable to the wired data unit;

a data transceiver coupled between said data connector and said digital protocol adapter, for conducting standard-based bi-directional packet-based digital data communication with the wired data unit.

5. The apparatus according to claim 4, wherein said data connector and said data transceiver are operative to constitute a standard IEEE802.3 interface.

6. The apparatus according to claim 1, wherein said apparatus is part of one of a WLL network, a LMDS network and a satellite network.

7. The apparatus according to claim 1, wherein said telephone modem is further operative for conducting standard-based bi-directional packet-based digital data communication with two or more identical telephone modems coupled to other telephone outlets connected to the telephone lines.

8. The apparatus according to claim 1, wherein said RF modem is further operative for conducting standard-based bi-directional packet-based radio frequency digital data communication with two or more identical RF modems employing a wireless radio frequency digital data signal conforming to a standard-based wireless digital data protocol.

9. A communications apparatus for adapting existing in-building telephone lines for data communications comprising:

a unit mounted on an interior wall of a room and directly connected to the telephone lines, said unit containing:
  (a) a telephone modem configured for bidirectional digital data communication to and from the telephone lines in accordance with a first communications protocol;
  (b) an RF modem configured for bidirectional wireless digital data communication to and from a receiver inside the room in accordance with a second communications protocol;
  (c) a protocol adapter coupling the telephone modem and the RF modem; and
  (d) a standard telephone outlet.

10. The apparatus of claim 9 wherein said unit comprises the standard telephone outlet and a module containing said telephone modem, said RF modem and said protocol adapter, which module is external to and attached to said telephone outlet.

11. The apparatus of claim 9 wherein said telephone modem, said RF modem and said protocol adapter are integrated into said standard telephone outlet.

12. The apparatus of claim 9 wherein at least one of said telephone modem, said RF modem and said protocol adapter is integrated into said standard telephone outlet.

13. The apparatus according to claim 9, wherein said wireless communication is based on IEEE802.11 standard.

14. The apparatus according to claim 9, wherein said module is further connectable to a telephone unit, and said module further comprises:

a low pass filter coupled to said telephone connector for passing only Telephone signals carried by the telephone lines; and a second telephone connector coupled to said low pass filter and connectable to the telephone unit, for coupling the telephone signals to the telephone unit.

15. The apparatus according to claim 9, wherein said module is further connectable to a wired data unit, and said module further comprises:

a data connector connectable to a wired data unit;

a data transceiver coupled between said data connector and said protocol adapter, for conducting standard-based bi-directional packet-based digital data communication with the wired data unit.

16. The apparatus according to claim 15, wherein said data connector and said data transceiver are operative to constitute a standard IEEE802.3 interface.

17. The apparatus according to claim 9, wherein said apparatus is part of one of: a WLL network, a LMDS network and a satellite network.

18. The apparatus according to claim 9, wherein said telephone modem is further operative for conducting standard-based bi-directional packet-based digital data communication with two or more identical telephone modems coupled to other telephone outlets connected to the telephone lines.

19. The apparatus according to claim 9, wherein said RF modem is further operative for conducting standard-based bi-directional packet-based digital radio-frequency data communication with two or more identical RF modems employing a wireless digital data signal conforming to a standard-based wireless digital data protocol.

20. A method of adapting existing in-building telephone lines to conduct data communications comprising:
  (a) detaching an existing standard telephone outlet from an interior wall of a room of a building;
  (b) in place of the detached outlet, mounting a unit containing:
    (i) a telephone modem configured for bidirectional digital data communication to and from the telephone lines in accordance with a first communications protocol;
    (ii) an RF modem configured for bidirectional wireless digital data communication to and from a wireless receiver inside the room in accordance with a second communications protocol;
    (iii) a protocol adapter coupling the telephone modem and the RF modem; and
    (iv) a new standard telephone outlet; and
  (c) directly connecting the new standard telephone outlet and the telephone modem to the telephone lines.

21. A method of adapting existing in-building telephone lines for data communications comprising:
  (a) attaching, to a standard telephone outlet mounted on an interior wall of a room of a building, a unit containing:
    (i) a telephone modem configured for bidirectional digital data communication to and from telephone lines in accordance with a first communications protocol;
    (ii) an RF modem configured for bidirectional wireless digital data communication to and from a receiver inside the room in accordance with a second communications protocol; and
    (iii) a protocol adapter coupling the telephone modem and the RF modem;

wherein, when so attached, the telephone modem is electrically coupled to the telephone lines.

22. A communications system network in a building, comprising:

(a) a plurality of wall-mounted standard telephone outlets carrying a telephone signal to different rooms of the building, said outlets being wired together by building wiring carrying the telephone signal;

(b) a plurality of wireless receivers inside the building; and (c) a plurality of modules, each attached externally to, and supported by, one of said outlets, each of said modules containing:

(i) a telephone modem configured for bidirectional digital data communication to and from telephone lines leading from the outlet in accordance with a first communications protocol;

(ii) an RF modem configured for bidirectional wireless digital data communication to and from at least one of the receivers in accordance with a second communications protocol; and (iii) a protocol adapter coupling the telephone modem and the RF modem.

23. The network according to claim 22, wherein said wireless communication is based on IEEE802.11 standard.

24. The network according to claim 22, wherein at least one of said modules is further connectable to a telephone unit, and said module further comprises:

a low pass filter coupled to the outlet for passing only the telephone signal; and a telephone connector coupled to said low pass filter and connectable to the telephone unit, for coupling the telephone signal to the telephone unit.

25. The network according to claim 22, wherein at least one of the modules is further connectable to a wired data unit, and said module further comprises:

a data connector connectable to a wired data unit, a data transceiver coupled between said data connector and said protocol adapter, for conducting standard-based bi-directional packet-based digital data communication with the wired data unit.

26. The network according to claim 25, wherein said data connector and said data transceiver are operative to constitute a standard IEEE802.3 interface.

27. The network according to claim 22, wherein said network is part of one of: a WLL network, a LMS network and a satellite network.

28. The network according to claim 22, wherein said telephone modem is further operative for conducting standard-based bi-directional packet-based digital data communication with two or more identical telephone modems coupled to other electrical outlets connected to the building wiring.

29. The network according to claim 22, wherein said RF modem is further operative for conducting standard-based bi-directional packet-based radio frequency digital data communication with two or more identical RF modems employing a wireless digital data signal conforming to a standard-based wireless digital data protocol.

30. A method of conducting data communication over a network in a building, comprising:

(a) attaching, to each of a plurality of standard telephone outlets mounted on interior walls of first and second rooms of the building, a unit containing:

(i) a telephone modem configured for bidirectional digital data communication to and from telephone lines in accordance with a first communications protocol;

(ii) an RF modem configured for bidirectional wireless digital data communication to and from transceivers in accordance with a second communications protocol; and (iii) a protocol adapter coupling the telephone modem and the RF modem, said step of attaching causing the telephone modem to be electrically coupled to the telephone lines of the building;

(b) placing transceivers at select locations in rooms of the building in which the units are attached to outlets;

(c) wirelessly transmitting digital data from a transceiver in the first room;

(d) in response to wireless transmission in step (c), automatically causing the protocol adapter of a unit in the first room to convert the digital data from the first communications protocol to the second communications protocol and applying the converted data to the telephone modem of the same unit;

(e) in response to step (d), automatically transmitting the converted data through the telephone lines of the building to at least one of the units in the second room of the building;

(f) in response to step (e), automatically causing the protocol adapter of the unit in the second room to reconvert the digital data from the second communications protocol to the first communications protocol and to apply the reconverted data to the RF modem of the unit in the second room; and (g) in response to step (f), automatically causing the RF modem of the unit in the second room to transmit the reconverted data to a transceiver in the second room.

31. A communications system comprising:

a plurality of standard telephone outlets configured to carry telephone signal;

a plurality of non-wired receivers; and a plurality of modules, each attached to one of said outlets, each of said modules having:

a telephone modem configured for bidirectional digital data communication to and from telephone lines leading from the outlet in accordance with a first communications protocol;

an RF modem configured for bidirectional non-wired digital data communication to and from at least one of the receivers in accordance with a second communications protocol; and a protocol adapter coupling the telephone modem and the RF modem.

32. The communication system of claim 31, wherein said non-wired communication is based on IEEE802.11 standard.

33. The communication system of claim 31, wherein at least one of said modules further has:

a low pass filter coupled to the outlet for passing only the telephone signal; and a telephone connector coupled to said low pass filter and connectable to the telephone unit, for coupling the telephone signal to the telephone unit.

34. The communication system of claim 31, wherein at least one of the modules is further has:

a data connector connectable to a wired data unit, wherein a data transceiver is coupled between said data connector and said protocol adapter, said data transceiver is configured to conduct standard-based bi-directional packet-based digital data communication with the wired data unit.

35. The communication system of claim 34, wherein said data connector and said data transceiver are operative to constitute a standard IEEE802.3 interface.

36. The communication system of claim 35 being part of one of: a WLL network, an LMDS network and a satellite network.

37. The communication system of claim 35, wherein said telephone modem is further operative for conducting standard-based bi-directional packet-based digital data communication with two or more identical telephone modems.

38. The communication system of claim 35, wherein said RF modem is further operative for conducting standard-based bi-directional packet-based radio frequency digital data communication with two or more identical RF modems employing a non-wired digital data signal conforming to a standard-based digital data protocol.

39. A method of conducting data communication over a network using a unit comprising:
- a telephone modem configured for bidirectional digital data communication to and from a telephone line in accordance with a first communications protocol;
- an RF modem configured for bidirectional wireless digital data communication to and from transceivers in accordance with a second communications protocol; and
- a protocol adapter coupling the telephone modem and the RF modem for converting data between the first communications protocol and the second communications protocol, the method comprising:
- placing transceivers at select locations in which the units are attached to outlets;
- wirelessly transmitting digital data from a transceiver through non-wired medium;
- in response to non-wired transmission, causing the protocol adapter of the unit to convert the digital data from the first communications protocol to the second communications protocol and applying the converted data to the telephone modem of the unit;
- in response to the step of causing the protocol adapter, automatically transmitting the converted data through the telephone lines to at least one of other units;
- causing the protocol adapter of the other unit to reconvert the digital data from the second communications protocol to the first communications protocol and to apply the reconverted data to the RF modem of the other unit; and
- causing the RF modem of the other unit to transmit the reconverted data to the transceiver.

\* \* \* \* \*